United States Patent
Kikuchi et al.

(10) Patent No.: US 6,301,302 B1
(45) Date of Patent: Oct. 9, 2001

(54) MOVING PICTURE SEARCH SYSTEM CROSS REFERENCE TO RELATED APPLICATION

(75) Inventors: Yasuhiro Kikuchi, Yokohama; Shin Yamada; Akiyoshi Tanaka, both of Kawasaki, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/628,341

(22) Filed: Jul. 28, 2000

Related U.S. Application Data

(62) Division of application No. 08/976,013, filed on Nov. 21, 1997, now Pat. No. 6,219,382.

(30) Foreign Application Priority Data

Nov. 25, 1996 (JP) .................................................. 8-313267
Apr. 18, 1997 (JP) .................................................. 9-101429

(51) Int. Cl.[7] .................................................. H04N 7/12
(52) U.S. Cl. .............................. 375/240.16; 375/240.24; 348/699
(58) Field of Search .................. 375/240.16, 240.24; 348/700, 699, 416.1, 208; 382/107–108

(56) References Cited

U.S. PATENT DOCUMENTS

| | | | |
|---|---|---|---|
| 5,459,517 | * 10/1995 | Kunitake et al. | 348/416 |
| 5,642,239 | * 6/1997 | Nagai | 360/8 |
| 5,708,767 | * 1/1998 | Yeo et al. | 345/440 |
| 5,732,146 | * 3/1998 | Yamada et al. | 382/107 |
| 5,767,922 | * 6/1998 | Zabith et al. | 348/700 |
| 5,805,733 | * 9/1998 | Wang et al. | 382/232 |
| 5,828,782 | * 10/1998 | Sunakawa et al. | 382/173 |
| 5,844,607 | * 12/1998 | Gebler et al. | 348/390 |
| 5,867,277 | * 2/1999 | Melen et al. | 382/306 |
| 6,049,354 | * 4/2000 | Sekine et al. | 348/208 |
| 6,055,025 | * 4/2000 | Shahararay | 348/700 |
| 6,061,471 | * 5/2000 | Coleman, Jr. | 382/173 |

FOREIGN PATENT DOCUMENTS

| | | | |
|---|---|---|---|
| 4111181 | 4/1992 | (JP) | H04N/5/78 |
| 7192003 | 7/1995 | (JP) | G06F/17/30 |
| 8-251438 | * 6/1996 | (JP) | H04N/7/15 |
| 8-212231 | 8/1996 | (JP) | G06F/17/30 |

OTHER PUBLICATIONS

"Automatic Video Indexing And Full–Video Search For Object Appearances" by A. Nagasaka et al; Transactions of Information Processing Society of Japan, vol.33, No. 4; 1992; pp., 543–550 (w/English abstract).

* cited by examiner

*Primary Examiner*—Vu Le
(74) *Attorney, Agent, or Firm*—Connolly Bove Lodge & Hutz

(57) ABSTRACT

Every frame represented by a moving picture signal is divided into blocks. Calculation is made as to a number of pixels forming portions of a caption in each of the blocks. The calculated number of pixels is compared with a threshold value. When the calculated number of pixels is equal to or greater than the threshold value, it is decided that the related block is a caption-containing block. Detection is made as to a time interval related to the moving picture signal during which every frame represented by the moving picture signal has a caption-containing block. A 1-frame-corresponding segment of the moving picture signal is selected which represents a caption-added frame present in the detected time interval.

11 Claims, 24 Drawing Sheets

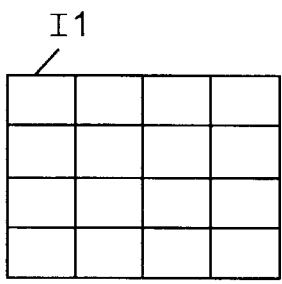
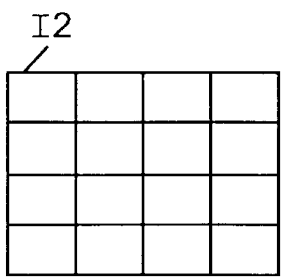
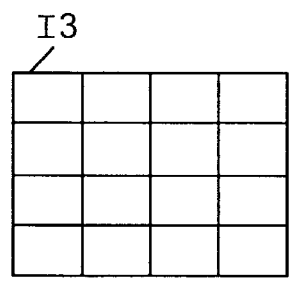
FIG. 11A  FIG. 11B  FIG. 11C
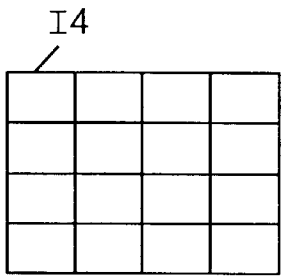
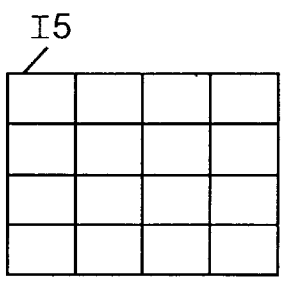
FIG. 11D  FIG. 11E
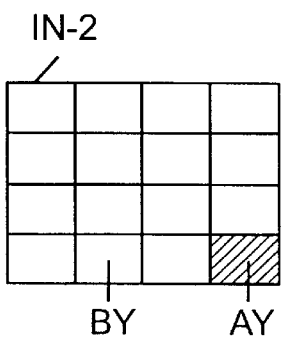
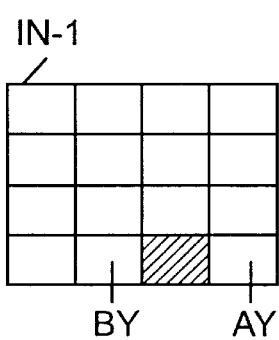
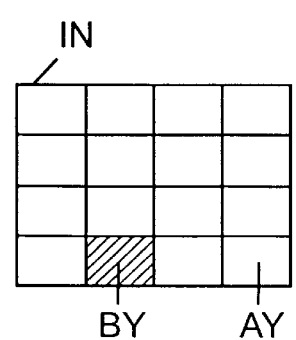
FIG. 12A  FIG. 12B  FIG. 12C

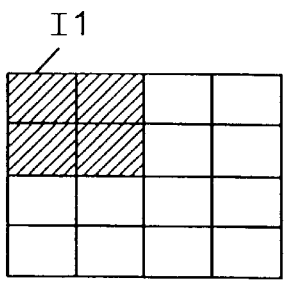
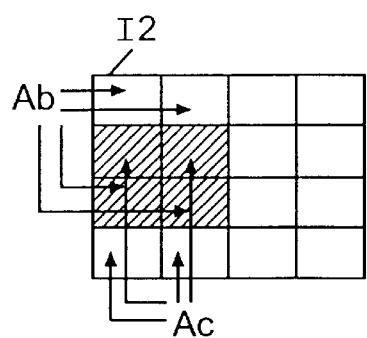
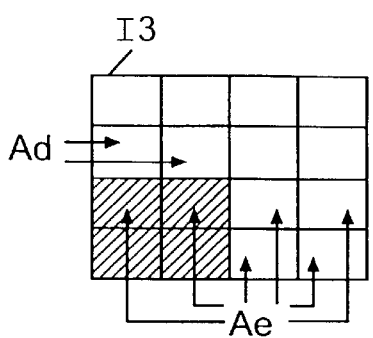
FIG. 13A　　FIG. 13B　　FIG. 13C
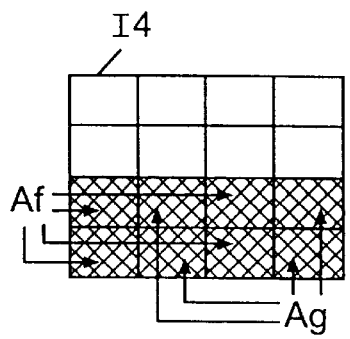
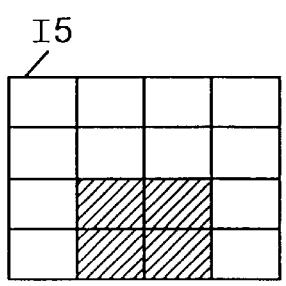
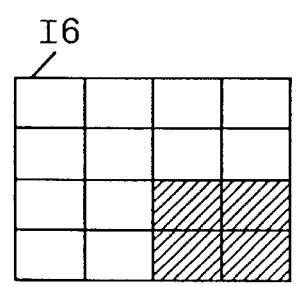
FIG. 13D　　FIG. 13E　　FIG. 13F
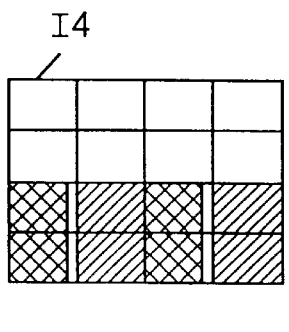
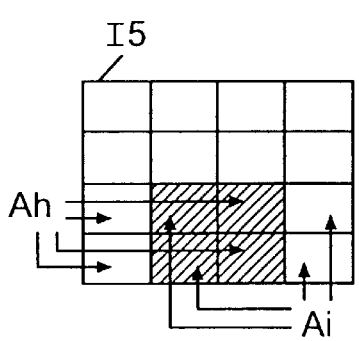
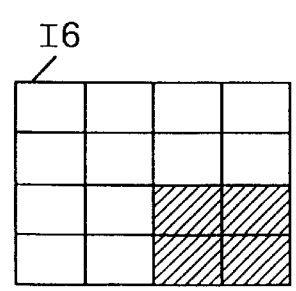
FIG. 14A　　FIG. 14B　　FIG. 14C

MOVING PICTURE SEARCH SYSTEM CROSS REFERENCE TO RELATED APPLICATION

CROSS REFERENCE TO RELATED APPLICATION

This application is a divisional of U.S. patent application Ser. No. 08/976,013 which was filed on Nov. 21, 1997 now U.S. Pat. No. 6,219,382.

BACKGROUND OF THE INVENTION

1. Field of the Invention

This invention relates to a system designed to search for a desired scene represented by a moving picture signal. This invention also relates to a system for detecting a change in scenes (a scene change) represented by a moving picture signal. Furthermore, this invention relates to a recording medium which stores a computer-related video-signal processing program.

2. Description of the Related Art

Japanese published unexamined patent application 7-192003 discloses a system designed to search for a desired scene represented by a moving picture signal. In the system of Japanese application 7-192003, each sequence of 1-frame-corresponding segments which represent caption-added pictures is extracted from the moving picture signal. Typical scenes related to the respective extracted sequences can be indicated on a display. The user can search the indicated scenes for a desired scene.

The system of Japanese application 7-192003 implements a process of discriminating caption-added pictures from caption-less pictures. The system of Japanese application 7-192003 uses the assumption that pixels corresponding to edges of caption characters tend to remain at same positions during a given number of successive frames. For every frame, the number of such pixels is detected. When the number of such pixel exceeds a threshold number, it is decided that the related frame represents a caption-added picture. Otherwise, it is decided that the related frame represents a caption-less picture. The result of this decision tends to be adversely affected by noise in the moving picture signal.

According to a known method of detecting a change in scenes (a scene change) represented by a moving picture signal, every frame related to the moving picture signal is divided into a set of blocks having equal sizes. Detection is made as to differences (variations) in luminance or color between equal-position blocks in two successive frames. A given number of smaller differences are selected from among the detected differences. An inter-frame variation is calculated on the basis of the summation of the smaller differences. When the inter-frame variation exceeds a threshold value, it is decided that a scene change occurs between the two successive frames.

Japanese published unexamined patent application 4-111181 discloses a method of detecting a change point in a moving picture. According to the method in Japanese application 4-111181, every frame related to the moving picture is divided into a set of blocks having equal sizes. Color-related feature quantities are calculated for the respective blocks. Calculation is given of differences (variations) in color-related feature quantity between equal-position blocks in two successive frames. Blocks related to differences greater than a threshold value are regarded as effective-change blocks. A correlation coefficient for the last two frames is calculated on the basis of the number of the effective-change blocks. In addition, calculation is made as to the rate of a change between the present correlation coefficient and the immediately preceding correlation coefficient. When the calculated change rate exceeds a prescribed value, it is decided that a change point occurs in the moving picture.

SUMMARY OF THE INVENTION

It is a first object of this invention to provide an improved apparatus designed to search for a desired scene represented by a moving picture signal.

It is a second object of this invention to provide an improved method of searching for a desired scene represented by a moving picture signal.

It is a third object of this invention to provide an improved apparatus for detecting a change in scenes (a scene change) represented by a moving picture signal.

It is a fourth object of this invention to provide an improved method of detecting a change in scenes (a scene change) represented by a moving picture signal.

It is a fifth object of this invention to provide a recording medium which stores an improved video-signal processing program.

A first aspect of this invention provides a moving picture search apparatus comprising first means for dividing every frame represented by a moving picture signal into blocks; second means for calculating a number of pixels forming portions of a caption in each of the blocks; third means for comparing the number of pixels which is calculated by the second means with a threshold value; fourth means for, when the calculated number of pixels is equal to or greater than the threshold value, deciding that the related block is a caption-containing block; fifth means for detecting a time interval related to the moving picture signal during which every frame represented by the moving picture signal has a caption-containing block decided by the fourth means; and sixth means for selecting a 1-frame-corresponding segment of the moving picture signal which represents a caption-added frame present in the time interval detected by the fifth means.

A second aspect of this invention is based on the first aspect thereof, and provides a moving picture search apparatus wherein the second means comprises means for detecting a luminance level of each of pixels composing a block, means for comparing the detected luminance level with a threshold level, and means for, when the detected luminance level is equal to or greater than the threshold level, deciding that the related pixel forms a portion of a caption.

A third aspect of this invention is based on the first aspect thereof, and provides a moving picture search apparatus wherein the second means comprises means for detecting a luminance level of each of pixels composing a block, means for comparing the detected luminance level with a threshold level, means for calculating a difference between the detected luminance level of each of pixels and the detected luminance level of a neighboring pixel, means for comparing the calculated difference with a threshold difference, and means for, when the detected luminance level is equal to or greater than the threshold level and the calculated difference is equal to or greater than the threshold difference, deciding that the related pixel forms a portion of a caption.

A fourth aspect of this invention is based on the first aspect thereof, and provides a moving picture search apparatus wherein the second means comprises means for detecting a color of each of pixels composing a block, means for comparing the detected color with a reference color range, and means for, when the detected color is in the reference color range, deciding that the related pixel forms a portion of a caption.

A fifth aspect of this invention is based on the first aspect thereof, and provides a moving picture search apparatus wherein the second means comprises means for detecting a color of each of pixels composing a block, means for comparing the detected color with a reference color range, means for calculating a difference between the detected color of each of pixels and the detected color of a neighboring pixel, means for comparing the calculated difference with a reference difference, and means for, when the detected color is in the reference color range and the calculated difference is in the reference difference, deciding that the related pixel forms a portion of a caption.

A sixth aspect of this invention is based on the first aspect thereof, and provides a moving picture search apparatus wherein the fourth means comprises means for comparing the calculated number of pixels in a block in a present frame with a second threshold value, means for comparing the calculated number of pixels in the block in a previous frame with the second threshold value, means for calculating an absolute value of a difference between the calculated number of pixels in the block in the present frame and the calculated number of pixels in the block in the previous frame, means for comparing the calculated absolute value of the difference with a third threshold value, and means for, when both the calculated number of pixels in the block in the present frame and the calculated number of pixels in the block in the previous frame are equal to or greater than the second threshold value and the calculated absolute value of the difference is equal to or smaller than the third threshold value, deciding that the related block is a caption-containing block.

A seventh aspect of this invention is based on the sixth aspect thereof, and provides a moving picture search apparatus further comprising means for deciding whether or not caption-containing blocks decided by the fourth means are successive along one of a horizontal direction and a vertical direction in a predetermined range; means for deciding whether or not caption-containing blocks of a same position which are decided by the fourth means are successive in at least a given number of frames; means for, when the caption-containing blocks decided by the fourth means are successive along one of the horizontal direction and the vertical direction in the predetermined range and the caption-containing blocks of the same position which are decided by the fourth means are successive in at least the given number of frames, deciding that the related area is a caption area; means for detecting a second time interval during which every frame represented by the moving picture signal has a caption area; and means for selecting a 1-frame-corresponding segment of the moving picture signal which represents a caption-containing frame present in the second time interval.

An eighth aspect of this invention is based on the seventh aspect thereof, and provides a moving picture search apparatus further comprising means for dividing every frame represented by the moving picture signal into zones; means for calculating a number of frames having caption areas for each of the zones related to all the selected 1-frame-corresponding segments of the moving picture signal; means for detecting a maximum number among the calculated numbers for the respective zones; and means for selecting one of the 1-frame-corresponding segments of the moving picture signal which relates to the maximum number as a typical frame.

A ninth aspect of this invention is based on the seventh aspect thereof, and provides a moving picture search apparatus further comprising means for designating one of the zones; and means for selecting one of the 1-frame-corresponding segments of the moving picture signal which represents a caption-added frame having a caption area in the designed zone as a typical frame.

A tenth aspect of this invention provides a method comprising the steps of a) dividing every frame represented by a moving picture signal into blocks; b) calculating a number of pixels forming portions of a caption in each of the blocks; c) comparing the number of pixels which is calculated by the step b) with a threshold value; d) when the calculated number of pixels is equal to or greater than the threshold value, deciding that the related block is a caption-containing block; e) detecting a time interval related to the moving picture signal during which every frame represented by the moving picture signal has a caption-containing block decided by the step d); and f) selecting a 1-frame-corresponding segment of the moving picture signal which represents a caption-added frame present in the time interval detected by the step e).

An eleventh aspect of this invention provides a method of detecting a change in scenes represented by a moving picture signal, comprising the steps of selecting first, second, and third frames from among frames represented by the moving picture signal; dividing each of the first, second, and third frames into blocks; detecting changes in each of the blocks among the first, second, and third frames; and detecting a scene change in response to the detected changes in each of the blocks.

A twelfth aspect of this invention is based on the eleventh aspect thereof, and provides a method wherein the changes in each of the blocks are evaluated on the basis of similarities.

A thirteenth aspect of this invention provides a method of detecting a change in scenes represented by a moving picture signal, comprising the steps of selecting first, second, and third frames from among frames represented by the moving picture signal; dividing each of the first, second, and third frames into blocks; detecting similarities in each of the blocks among the first, second, and third frames; deciding typical similarities in response to the detected similarities; deciding whether each of the blocks is effective or ineffective regarding a scene change in response to the typical similarities and the detected similarities; calculating a mean similarity among the typical similarities in effective blocks; and detecting a scene change in response to the calculated mean similarity.

A fourteenth aspect of this invention is based on the thirteenth aspect thereof, and provides a method wherein the similarities in each of the blocks between the first and second frames are used as the typical similarities, and the decision as to whether each of the blocks is effective or ineffective is implemented in response to the similarities in each of the blocks between the second and third frames.

A fifteenth aspect of this invention is based on the thirteenth aspect thereof, and provides a method wherein the similarities in each of the blocks between the first and third frames are used as the typical similarities and it is decided that the related blocks are effective when the similarities in each of the blocks between the first and third frames are equal to or greater than a threshold value, and otherwise the similarities in each of the blocks between the first and second frames are used as the typical similarities.

A sixteenth aspect of this invention is based on the thirteenth aspect thereof, and provides a method wherein the similarities in each of the blocks between the first and second frames are used as the typical similarities, and blocks related to motion of an object in a picture are detected in response to the typical similarities and the similarities in each of the blocks between the second and third frames, and wherein the typical similarities in the motion-related blocks are replaced by the similarities in each of the blocks between the second and third frames.

A seventeenth aspect of this invention provides a method of detecting a change in scenes represented by a moving picture signal, comprising the steps of selecting first, second, third, and fourth frames from among frames represented by the moving picture signal; dividing each of the first, second, third, and fourth frames into blocks; detecting similarities in each of the blocks among the first, second, third, and fourth frames; deciding typical similarities in response to the detected similarities; deciding whether each of the blocks is effective or ineffective regarding a scene change in response to the typical similarities and the detected similarities; calculating a mean similarity among the typical similarities in effective blocks; and detecting a scene change in response to the calculated mean similarity.

An eighteenth aspect of this invention is based on the seventeenth aspect thereof, and provides a method wherein the similarities in each of the blocks between the second and third frames are used as the typical similarities, and the decision as to whether each of the blocks is effective or ineffective is implemented in response to the similarities in each of the blocks between the third and fourth frames.

A nineteenth aspect of this invention is based on the seventeenth aspect thereof, and provides a method wherein when the similarities in each of the blocks between the first and third frames are equal to or greater than a threshold value or the similarities in each of the blocks between the second and fourth frames are equal to or greater than the threshold value, the similarities are used as the typical similarities and it is decided that the related blocks are effective, and wherein otherwise the similarities in each of the blocks between the second and third frames are used as the typical similarities.

A twentieth aspect of this invention is based on the twelfth aspect thereof, and provides a method wherein the similarities are calculated from one set among a set of color histograms, a set of luminance histograms, and a set of luminance values.

A twenty-first aspect of this invention is based on the fifteenth aspect thereof, and provides a method wherein a mean value is calculated which is among the similarities in each of the blocks between the first and second frames and the similarities in each of the blocks between the second and third frames, and the mean value is used as the threshold value.

A twenty-second aspect of this invention is based on the thirteenth aspect thereof, and provides a method wherein when a number of the effective blocks is smaller than a reference number, it is decided that the first and second frames relate to a same scene.

A twenty-third aspect of this invention provides an apparatus for detecting a change in scenes represented by a moving picture signal, comprising means for selecting first and second frames from among frames represented by the moving picture signal; means for dividing each of the first and second frames into blocks; means for calculating similarities in each of the blocks among the first and second frames; and means for detecting a scene change of the second frame from the first frame in response to the calculated similarities.

A twenty-fourth aspect of this invention is based on the twenty-third aspect thereof, and provides an apparatus further comprising means for selecting a third frame from among the frames represented by the moving picture signal; means for calculating similarities in each of the blocks among the second and third frames; means for calculating similarities in each of the blocks among the first and third frames; means for calculating correlations in each of the blocks among the first, second, and third frames on the basis of the calculated similarities in each of the blocks among the first and second frames, the calculated similarities in each of the blocks among the second and third frames, and the calculated similarities in each of the blocks among the first and third frames; means for deciding whether each of the blocks is effective or ineffective with respect to a scene change in response to the calculated similarities in each of the blocks among the first and second frames, the calculated similarities in each of the blocks among the second and third frames, and the calculated similarities in each of the blocks among the first and third frames; means for calculating a sum of the correlations in the effective blocks; means for calculating a total number of the effective blocks; means for calculating an evaluation value equal to the sum of the correlations in the effective blocks which is divided by the total number of the effective blocks; means for comparing the calculated evaluation value with a threshold value; and means for deciding that a scene change occurs when the calculated evaluation value is smaller than the threshold value.

A twenty-fifth aspect of this invention provides a recording medium which stores a computer-related program including the steps of selecting first, second, and third frames from among frames represented by a moving picture signal; dividing each of the first, second, and third frames into blocks; detecting changes in each of the blocks among the first, second, and third frames; and detecting a scene change in response to the detected changes in each of the blocks.

A twenty-sixth aspect of this invention provides a recording medium which stores a computer-related program including the steps of selecting first, second, third, and fourth frames from among frames represented by a moving picture signal; dividing each of the first, second, third, and fourth frames into blocks; detecting similarities in each of the blocks among the first, second, third, and fourth frames; deciding typical similarities in response to the detected similarities; deciding whether each of the blocks is effective or ineffective regarding a scene change in response to the typical similarities and the detected similarities; calculating a mean similarity among the typical similarities in effective blocks; and detecting a scene change in response to the calculated mean similarity.

BRIEF DESCRIPTION OF THE DRAWINGS

FIG. 11 is a diagram of a set of pictures represented by a video signal.

FIG. 12 is a diagram of a set of pictures represented by a video signal.

FIG. 13 is a diagram of a set of pictures represented by a video signal.

FIG. 14 is a diagram of a set of pictures represented by a video signal.

DESCRIPTION OF THE PREFERRED EMBODIMENTS

A prior-art system designed to search for a desired scene represented by a moving picture signal will be explained hereinafter for a better understanding of this invention.

Figure 1:
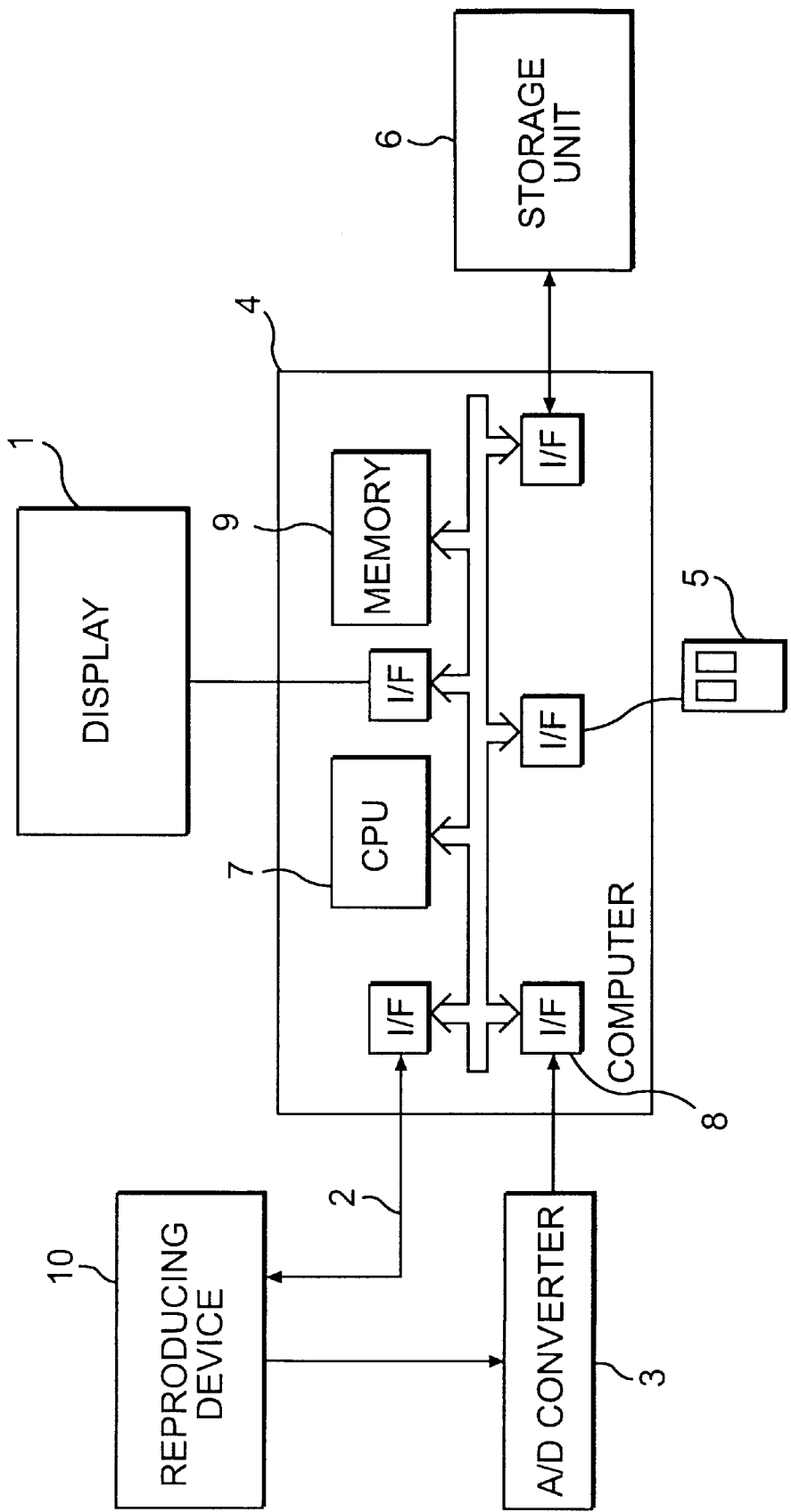
FIG. 1 is a block diagram of a prior-art search system.

FIG. 1 shows a prior-art system disclosed in Japanese published unexamined patent application 7-192003. With reference to FIG. 1, the prior-art system includes a display 1 for indicating an output signal of a computer 4. Instructions can be inputted into the computer 4 via a pointing device 5. A moving-picture reproducing device 10 is, for example, an optical disc drive or a video deck.

In the prior-art system of FIG. 1, an analog video signal outputted from the moving-picture reproducing device 10 is changed by an A/D converter 3 into digital video data. The digital video data is fed from the A/D converter 3 to the computer 4. In the computer 4, the digital video data is fed to a memory 9 via an interface 8, and is processed by a CPU 7 according to a program stored in the memory 9.

Serial numbers (referred to as frame order numbers) are assigned to respective frames represented by a moving picture signal handled by the moving-picture reproducing device 10. When the computer 4 informs the moving-picture reproducing device 10 of the order number of a desired frame via a control line 2, the moving-picture reproducing device 10 outputs a video signal representing the desired frame. The computer 4 can store various information pieces into an external storage unit 6.

Figure 2:
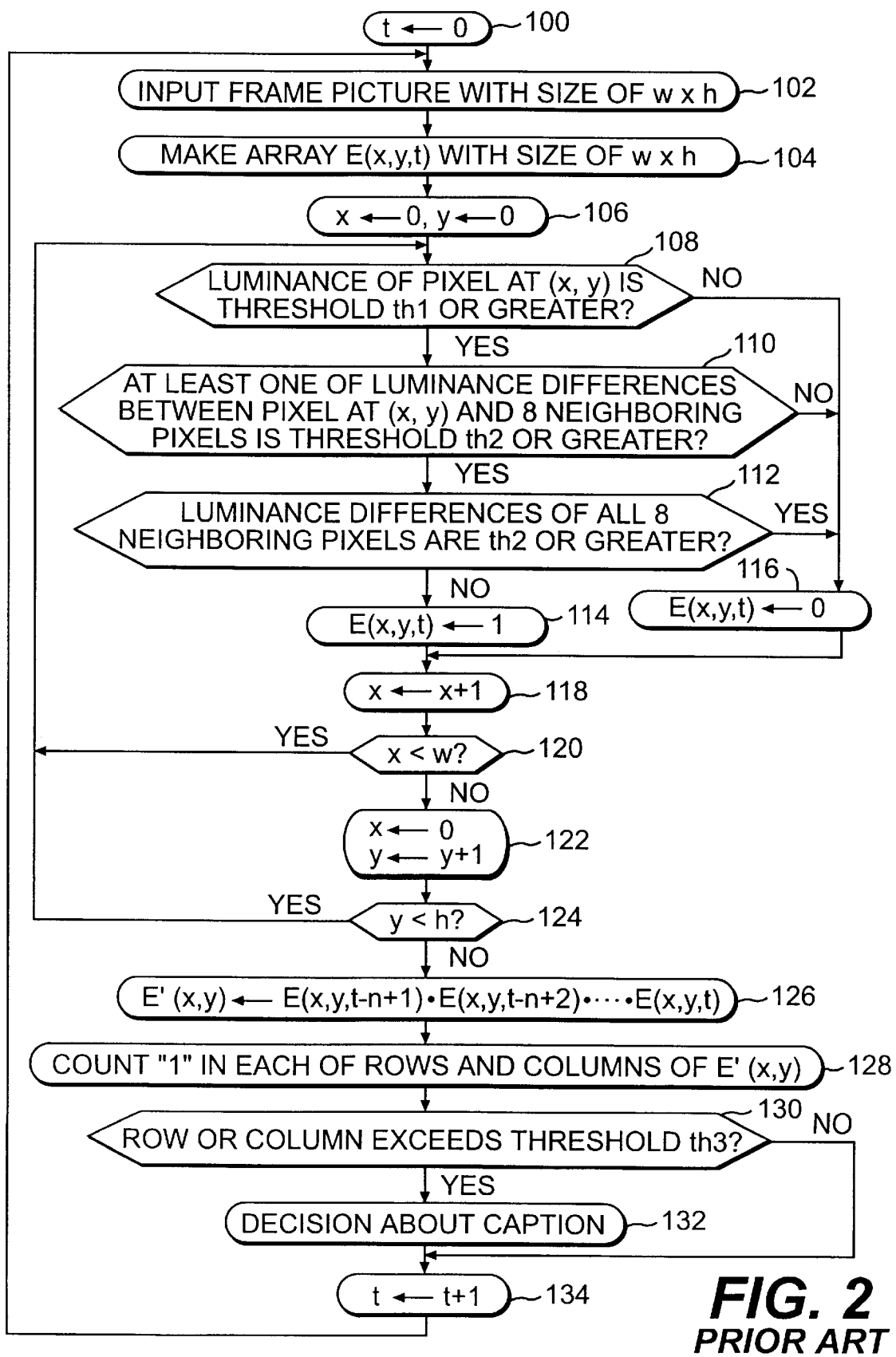
FIG. 2 is a flowchart of a prior-art program related to a computer in FIG. 1.

FIG. 2 is a flowchart of a program related to the computer 4 in the prior-art system of FIG. 1. With reference to FIG. 2, a first step 100 of the program initializes a variable "t" to "0". The variable "t" indicates time. The time "t" is substantially equivalent to a frame order number. After the step 100, the program advances to a step 102.

The step 102 controls the moving-picture reproducing device 10 to reproduce a moving-picture signal. The step 102 stores a 1-frame-corresponding segment of the output signal of the A/D converter 3 into the memory 9 as a digital picture having a size of w×h and relating to the time point "t".

A step 104 following the step 102 prepares a three-dimensional array E(x, y, t) having a size of w×h with respect to the time point "t".

A step 106 following the step 104 initializes variables "x" and "y" to "0". The variable "x" indicates a horizontal position of a pixel of interest. The variable "y" indicates a vertical position of the pixel of interest. After the step 106, the program advances to a step 108.

For every pixel of the digital picture in the memory 9, the step 108 and subsequent steps 110–124 implement a decision as to whether or not the pixel forms a part of a caption. Specifically, the step 108 compares the luminance level (the tone level) of the pixel of interest with a threshold level th1. When the luminance level is equal to or higher than the threshold level th1, the program advances from the step 108 to a step 110. When the luminance level is lower than the threshold level th1, it is decided that the pixel of interest does not relate to a caption. In this case, the program advances from the step 108 to a step 116.

The step 110 calculates the differences in luminance level between the pixel of interest and the eight neighboring pixels around the pixel of interest. The step 110 compares the calculated differences with a threshold level th2. When at least one of the differences is equal to or higher than the threshold level th2, the program advances from the step 110 to a step 112. Otherwise, the program advances from the step 110 to the step 116.

The step 112 decides whether or not all the eight differences exceed the threshold level th2. When all the eight differences exceed the threshold level th2, it is decided that the pixel of interest agrees with an isolated point contaminated by noise. Thus, it is decided that the pixel of interest does not relate to a caption. In this case, the program advances from the step 112 to the step 116. When at least one of the eight differences does not exceed the threshold level th2, it is decided that the pixel of interest forms a part of a caption. In this case, the program advances from the step 112 to a step 114.

The step 114 places "1" into a data area of the array E which corresponds to the pixel of interest. The "1" data area indicates that the pixel of interest forms a part of a caption. After the step 114, the program advances to a step 118.

The step 116 places "0" into a data area of the array E which corresponds to the pixel of interest. The "0" data area indicates that the pixel of interest does not relate to a caption. After the step 116, the program advances to the step 118.

The step 118 increments the horizontal position value "x" of the pixel of interest by "1". A step 120 following the step 118 decides whether or not the horizontal position value "x" is smaller than the horizontal boundary value "w". When the horizontal position value "x" is smaller than the horizontal boundary value "w", the program returns from the step 120 to the step 108. Otherwise, the program advances from the step 120 to a step 122.

The step 122 resets the horizontal position value "x" to "0". In addition, the step 122 increments the vertical position value "y" of the pixel of interest by "1". A step 124 following the step 122 decides whether or not the vertical position value "y" is smaller than the vertical boundary value "h". When the vertical position value "y" is smaller than the vertical boundary value "h", the program returns from the step 124 to the step 108. Otherwise, the program advances from the step 124 to a step 126.

The step 126 decides whether or not a character remains at a same position for a given length of time. Specifically, the step 126 generates a two-dimensional array E'(x, y), corresponding to "n" successive frames, by implementing AND operation among "n" successive three-dimensional arrays E(x, y, t−n+1), E(x, y, t−n+2), ..., and E(x, y, t). For every pixel, the step 126 compares same-position (same-pixel) data segments in the arrays E(x, y, t−n+1), E(x, y, t−n+2), ..., and E(x, y, t). When all the data segments are "1", the step 126 places "1" into a corresponding portion of the array E'(x, y). When at least one of the data segments is "0", the step 126 places "0" into a corresponding portion of the array E'(x, y).

A step 128 following the step 126 counts the number of "1" in every column of the array E'(x, y), and generates a horizontal frequency histogram Hx(i) where "i" denotes a horizontal position. Also, the step 128 counts the number of "1" in every row of the array E'(x, y), and generates a vertical frequency histogram Hy(i) where "i" denotes a vertical position.

A step 130 subsequent to the step 128 decides whether or not the frequency or the frequencies in the histograms Hx(i) and Hy(i) are present which exceed a threshold value th3. When the frequency or the frequencies in the histograms Hx(i) and Hy(i) are present which exceed the threshold value th3, the program advances from the step 130 to a block 132. Otherwise, the program jumps from the step 130 to a step 134.

The block 132 decides that a caption appears at a position corresponding to each frequency in the histograms Hx(i) and Hy(i) which exceeds the threshold value th3. This decision about a caption relates to a frame which precedes the latest frame by "n" frames. After the block 132, the program advances to the step 134.

The step 134 increments the time (the frame order number) "t" by "1". After the step 134, the program returns to the step 102.

Figure 3:
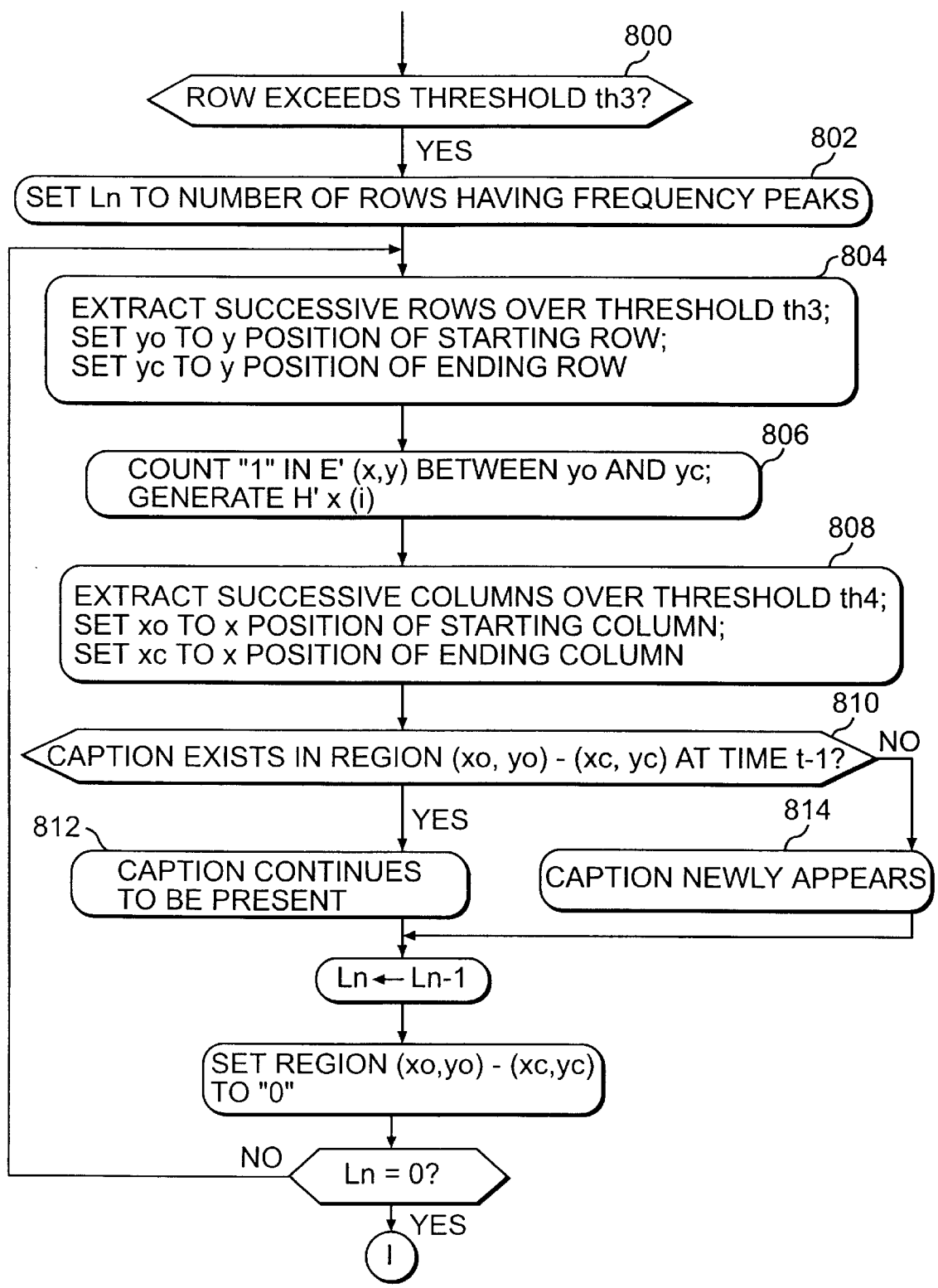
FIG. 3 is a flowchart of a first half of a caption decision block in FIG. 2.
Figure 4:
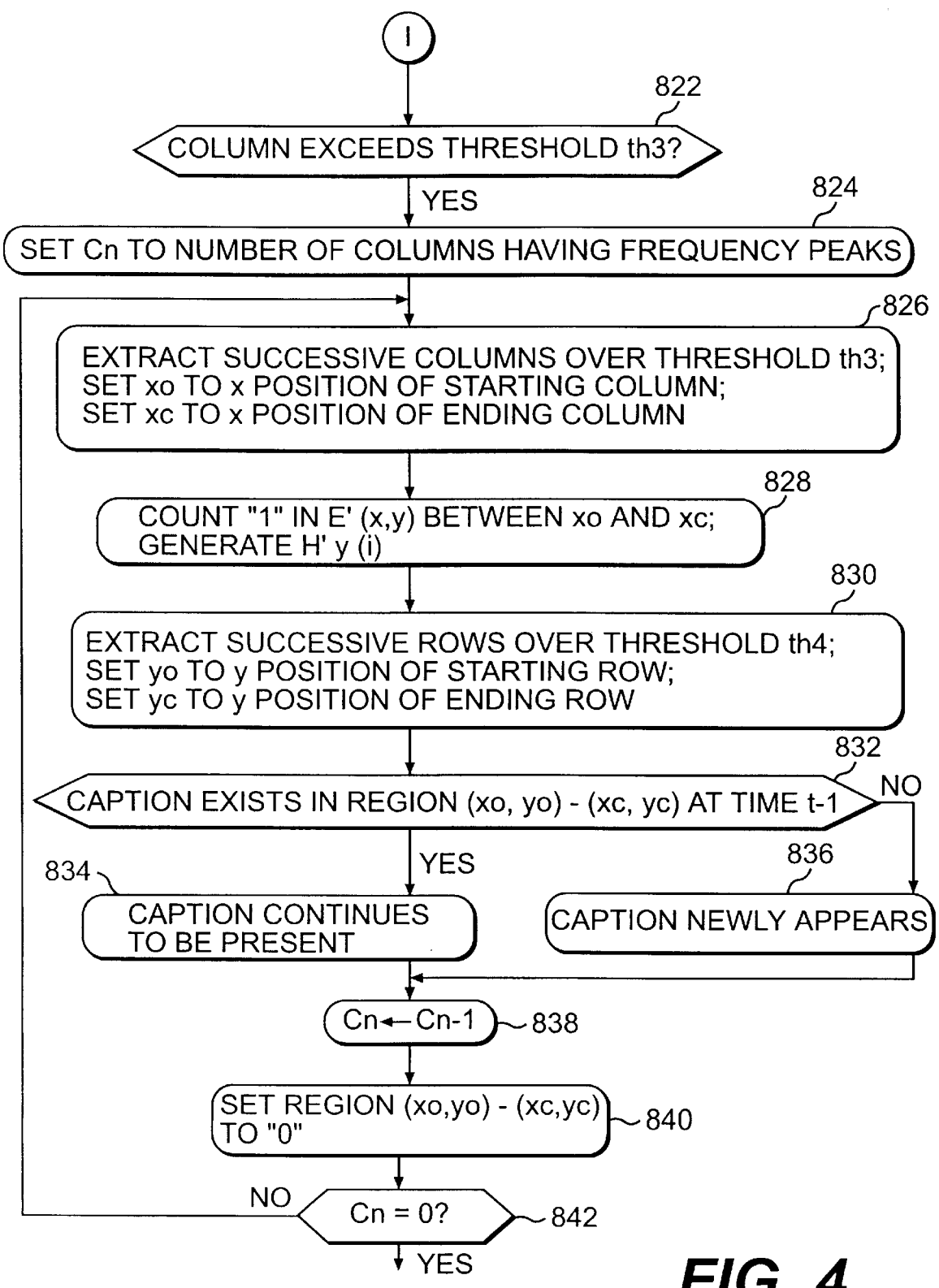
FIG. 4 is a flowchart of a second half of the caption decision block in FIG. 2.

FIGS. 3 and 4 show the details of the caption decision block 132. With reference to FIGS. 3 and 4, a first step 800 of the block 132 refers to the frequency histograms Hx(i) and Hy(i), and thereby decides whether or not there are rows having the frequencies which exceed the threshold value th3. When there are rows having the frequencies which exceed the threshold value th3, the program advances from the step 800 to a step 802.

The step 802 extracts a histogram portion having a succession of rows with the frequencies which exceed the threshold value th3. In the case where there are plural rows having peak frequencies over the threshold value th3, and where rows between the peak-frequency rows have insufficient frequencies only, it is decided that a plurality of captions are present. In this case, the step 802 calculates the number of captions, and sets the calculated caption number to the variable Ln.

For each of the captions, subsequent steps 804–820 are executed. The number Ln is used as a loop counter.

The step 804 detects a histogram portion having a succession of rows with the frequencies which exceed the threshold value th3. The step 804 detects the spatial interval of the histogram portion. The step 804 sets the variable "yo" to the vertical position of the starting row in the spatial interval of the histogram portion. The step 804 sets the variable "ye" to the vertical position of the ending row in the spatial interval of the histogram portion.

The step 806 following the step 804 counts the number of "1" in a portion of the array E'(x, y) in which the vertical position value "y" varies from the value "yo" to the value "yc". Thereby, the step 806 generates a horizontal frequency histogram H'x(i) where "i" denotes a horizontal position.

Regarding the horizontal frequency histogram H'x(i), the step 808 subsequent to the step 806 detects a histogram portion having a succession of columns with the frequencies which exceed a threshold value th4. The step 808 detects the spatial interval of the histogram portion. The step 808 sets the variable "xo" to the horizontal position of the starting column in the spatial interval of the histogram portion. The step 808 sets the variable "xc" to the horizontal position of the ending column in the spatial interval of the histogram portion. The rectangular area defined by the opposite corner positions (xo, yo) and (xc, yc) is regarded as an area in which a related caption is present.

The step 810 following the step 808 decides whether or not a caption is present in the rectangular area defined by the opposite corner positions (xo, yo) and (xc, yc) at the time "t−1". When a caption is present in the rectangular area at the time "t−1", the program advances from the step 810 to the step 812. Otherwise, the program advances from the step 810 to the step 814.

The step 812 decides that the caption has been present since a previous moment. After the step 812, the program advances to the step 816.

The step 814 decides that the caption newly appears. As the starting moment of the caption, the step 814 stores the moment (the frame order number) which precedes the present time by "n" frames. After the step 814, the program advances to the step 816.

The step 816 decrements the number Ln by "1". After the step 816, the program advances to the step 818.

The step 818 resets all the data pieces in the rectangular area in the array E'(x, y), which is defined by the opposite corner positions (xo, yo) and (xc, yc), to "0".

The step 820 following the step 818 decides whether or not the number Ln is equal to "0". When the number Ln is equal to "0", the program advances from the step 820 to a step 822. Otherwise, the program returns from the step 820 to the step 804.

The step 822 refers to the frequency histograms Hx(i) and Hy(i), and thereby decides whether or not there are columns having the frequencies which exceed the threshold value th3. When there are columns having the frequencies which exceed the threshold value th3, the program advances from the step 822 to a step 824.

The step 824 extracts a histogram portion having a succession of columns with the frequencies which exceed the threshold value th3. In the case where there are plural columns having peak frequencies over the threshold value th3, and where columns between the peak-frequency columns have insufficient frequencies only, it is decided that a plurality of captions are present. In this case, the step 824 calculates the number of captions, and sets the calculated caption number to the variable Cn.

For each of the captions, subsequent steps 826–842 are executed. The number Cn is used as a loop counter.

The step 826 detects a histogram portion having a succession of columns with the frequencies which exceed the threshold value th3. The step 826 detects the spatial interval of the histogram portion. The step 826 sets the variable "xo" to the horizontal position of the starting column in the spatial interval of the histogram portion. The step 826 sets the variable "xc" to the horizontal position of the ending column in the spatial interval of the histogram portion.

The step 828 following the step 826 counts the number of "1" in a portion of the array E'(x, y) in which the horizontal position value "x" varies from the value "xo" to the value "xc". Thereby, the step 828 generates a vertical frequency histogram H'y(i) where "i" denotes a vertical position.

Regarding the vertical frequency histogram H'y(i), the step 830 subsequent to the step 828 detects a histogram portion having a succession of rows with the frequencies which exceed a threshold value th4. The step 830 detects the spatial interval of the histogram portion. The step 830 sets the variable "yo" to the vertical position of the starting row in the spatial interval of the histogram portion. The step 830 sets the variable "yc" to the vertical position of the ending row in the spatial interval of the histogram portion. The rectangular area defined by the opposite corner positions (xo, yo) and (xc, yc) is regarded as an area in which a related caption is present.

The step 832 following the step 830 decides whether or not a caption is present in the rectangular area defined by the opposite corner positions (xo, yo) and (xc, yc) at the time "t−1". When a caption is present in the rectangular area at the time "t−1", the program advances from the step 832 to the step 834. Otherwise, the program advances from the step 832 to the step 836.

The step 834 decides that the caption has been present since a previous moment. After the step 834, the program advances to the step 838.

The step 836 decides that the caption newly appears. As the starting moment of the caption, the step 836 stores the moment (the frame order number) which precedes the present time by "n" frames. After the step 836, the program advances to the step 838.

The step 838 decrements the number Cn by "1". After the step 838, the program advances to the step 840.

The step 840 resets all the data pieces in the rectangular area in the array E'(x, y), which is defined by the opposite corner positions (xo, yo) and (xc, yc), to "0".

The step 842 following the step 840 decides whether or not the number Ln is equal to "0". When the number Ln is equal to "0", the program advances from the step 842 to the step 134 of FIG. 2. Otherwise, the program returns from the step 842 to the step 826.

Basic Embodiments

According to a first basic embodiment of this invention, a moving picture search apparatus includes first means for dividing every frame represented by a moving picture signal into blocks; second means for calculating a number of pixels forming portions of a caption in each of the blocks; third means for comparing the number of pixels which is calculated by the second means with a threshold value; fourth means for, when the calculated number of pixels is equal to or greater than the threshold value, deciding that the related block is a caption-containing block; fifth means for detecting a time interval related to the moving picture signal during which every frame represented by the moving picture signal has a caption-containing block decided by the fourth means; and sixth means for selecting a 1-frame-corresponding segment of the moving picture signal which represents a caption-added frame present in the time interval detected by the fifth means.

A second basic embodiment of this invention is based on the first basic embodiment thereof. In the moving picture search apparatus of the second basic embodiment, the second means comprises means for detecting a luminance level of each of pixels composing a block, means for comparing the detected luminance level with a threshold level, and means for, when the detected luminance level is equal to or greater than the threshold level, deciding that the related pixel forms a portion of a caption.

A third basic embodiment of this invention is based on the first basic embodiment thereof. In the moving picture search apparatus of the third basic embodiment, the second means comprises means for detecting a luminance level of each of pixels composing a block, means for comparing the detected luminance level with a threshold level, means for calculating a difference between the detected luminance level of each of pixels and the detected luminance level of a neighboring pixel, means for comparing the calculated difference with a threshold difference, and means for, when the detected luminance level is equal to or greater than the threshold level and the calculated difference is equal to or greater than the threshold difference, deciding that the related pixel forms a portion of a caption.

A fourth basic embodiment of this invention is based on the first basic embodiment thereof. In the moving picture search apparatus of the fourth basic embodiment, the second means comprises means for detecting a color of each of pixels composing a block, means for comparing the detected color with a reference color range, and means for, when the detected color is in the reference color range, deciding that the related pixel forms a portion of a caption.

A fifth basic embodiment of this invention is based on the first basic embodiment thereof. In the moving picture search apparatus of the fifth basic embodiment, the second means comprises means for detecting a color of each of pixels composing a block, means for comparing the detected color with a reference color range, means for calculating a difference between the detected color of each of pixels and the detected color of a neighboring pixel, means for comparing the calculated difference with a reference difference, and means for, when the detected color is in the reference color range and the calculated difference is in the reference difference, deciding that the related pixel forms a portion of a caption.

A sixth basic embodiment of this invention is based on the first basic embodiment thereof. In the moving picture search apparatus of the sixth basic embodiment, the fourth means comprises means for comparing the calculated number of pixels in a block in a present frame with a second threshold value, means for comparing the calculated number of pixels in the block in a previous frame with the second threshold value, means for calculating an absolute value of a difference between the calculated number of pixels in the block in the present frame and the calculated number of pixels in the block in the previous frame, means for comparing the calculated absolute value of the difference with a third threshold value, and means for, when both the calculated number of pixels in the block in the present frame and the calculated number of pixels in the block in the previous frame are equal to or greater than the second threshold value and the calculated absolute value of the difference is equal to or smaller than the third threshold value, deciding that the related block is a caption-containing block.

A seventh basic embodiment of this invention is based on the sixth basic embodiment thereof. The moving picture search apparatus of the seventh basic embodiment further comprises means for deciding whether or not caption-containing blocks decided by the fourth means are successive along one of a horizontal direction and a vertical direction in a predetermined range; means for deciding whether or not caption-containing blocks of a same position which are decided by the fourth means are successive in at least a given number of frames; means for, when the caption-containing blocks decided by the fourth means are successive along one of the horizontal direction and the vertical direction in the predetermined range and the caption-containing blocks of the same position which are decided by the fourth means are successive in at least the given number of frames, deciding that the related area is a caption area; means for detecting a second time interval during which every frame represented by the moving picture signal has a caption area; and means for selecting a 1-frame-corresponding segment of the moving picture signal which represents a caption-containing frame present in the second time interval.

An eighth basic embodiment of this invention is based on the seventh basic embodiment thereof. The moving picture search apparatus of the eighth basic embodiment further comprises means for dividing every frame represented by the moving picture signal into zones; means for calculating a number of frames having caption areas for each of the zones related to all the selected 1-frame-corresponding segments of the moving picture signal; means for detecting a maximum number among the calculated numbers for the respective zones; and means for selecting one of the 1-frame-corresponding segments of the moving picture signal which relates to the maximum number as a typical frame.

A ninth basic embodiment of this invention is based on the seventh basic embodiment thereof. The moving picture search apparatus of the ninth basic embodiment further comprises means for designating one of the zones; and means for selecting one of the 1-frame-corresponding segments of the moving picture signal which represents a caption-added frame having a caption area in the designed zone as a typical frame.

According to a tenth basic embodiment of this invention, a method includes the steps of a) dividing every frame represented by a moving picture signal into blocks; b) calculating a number of pixels forming portions of a caption in each of the blocks; c) comparing the number of pixels which is calculated by the step b) with a threshold value; d) when the calculated number of pixels is equal to or greater than the threshold value, deciding that the related block is a caption-containing block; e) detecting a time interval related to the moving picture signal during which every frame represented by the moving picture signal has a caption-containing block decided by the step d); and f) selecting a 1-frame-corresponding segment of the moving picture signal which represents a caption-added frame present in the time interval detected by the step e).

According to an eleventh basic embodiment of this invention, a method of detecting a change in scenes represented by a moving picture signal includes the steps of selecting first, second, and third frames from among frames represented by the moving picture signal; dividing each of the first, second, and third frames into blocks; detecting changes in each of the blocks among the first, second, and third frames; and detecting a scene change in response to the detected changes in each of the blocks.

A twelfth basic embodiment of this invention is based on the eleventh basic embodiment thereof. In the method according to the twelfth basic embodiment, the changes in each of the blocks are evaluated on the basis of similarities.

According to a thirteenth basic embodiment of this invention, a method of detecting a change in scenes represented by a moving picture signal includes the steps of selecting first, second, and third frames from among frames represented by the moving picture signal; dividing each of the first, second, and third frames into blocks; detecting similarities in each of the blocks among the first, second, and third frames; deciding typical similarities in response to the detected similarities; deciding whether each of the blocks is effective or ineffective regarding a scene change in response to the typical similarities and the detected similarities; calculating a mean similarity among the typical similarities in effective blocks; and detecting a scene change in response to the calculated mean similarity.

A fourteenth basic embodiment of this invention is based on the thirteenth basic embodiment thereof. In the method according to the fourteenth basic embodiment, the similarities in each of the blocks between the first and second frames are used as the typical similarities, and the decision as to whether each of the blocks is effective or ineffective is implemented in response to the similarities in each of the blocks between the second and third frames.

A fifteenth basic embodiment of this invention is based on the thirteenth basic embodiment thereof. In the method according to the fifteenth basic embodiment, the similarities in each of the blocks between the first and third frames are used as the typical similarities and it is decided that the related blocks are effective when the similarities in each of the blocks between the first and third frames are equal to or greater than a threshold value, and otherwise the similarities in each of the blocks between the first and second frames are used as the typical similarities.

A sixteenth basic embodiment of this invention is based on the thirteenth basic embodiment thereof. In the method according to the sixteenth basic embodiment, the similarities in each of the blocks between the first and second frames are used as the typical similarities, and blocks related to motion of an object in a picture are detected in response to the typical similarities and the similarities in each of the blocks between the second and third frames. In the method according to the sixteenth basic embodiment, the typical similarities in the motion-related blocks are replaced by the similarities in each of the blocks between the second and third frames.

According to a seventeenth basic embodiment of this invention, a method of detecting a change in scenes represented by a moving picture signal includes the steps of selecting first, second, third, and fourth frames from among frames represented by the moving picture signal; dividing each of the first, second, third, and fourth frames into blocks; detecting similarities in each of the blocks among the first, second, third, and fourth frames; deciding typical similarities in response to the detected similarities; deciding whether each of the blocks is effective or ineffective regarding a scene change in response to the typical similarities and the detected similarities; calculating a mean similarity among the typical similarities in effective blocks; and detecting a scene change in response to the calculated mean similarity.

An eighteenth basic embodiment of this invention is based on the seventeenth basic embodiment thereof. In the method according to the eighteenth basic embodiment, the similarities in each of the blocks between the second and third frames are used as the typical similarities, and the decision as to whether each of the blocks is effective or ineffective is implemented in response to the similarities in each of the blocks between the third and fourth frames.

A nineteenth basic embodiment of this invention is based on the seventeenth basic embodiment thereof. In the method according to the nineteenth basic embodiment, when the similarities in each of the blocks between the first and third frames are equal to or greater than a threshold value or the similarities in each of the blocks between the second and fourth frames are equal to or greater than the threshold value, the similarities are used as the typical similarities and it is decided that the related blocks are effective. In the method according to the nineteenth basic embodiment, in other cases, the similarities in each of the blocks between the second and third frames are used as the typical similarities.

A twentieth basic embodiment of this invention is based on the twelfth basic embodiment thereof. In the method according to the twentieth basic embodiment, the similarities are calculated from one set among a set of color histograms, a set of luminance histograms, and a set of luminance values.

A twenty-first basic embodiment of this invention is based on the fifteenth basic embodiment thereof. In the method according to the twenty-first basic embodiment, a mean value is calculated which is among the similarities in each of the blocks between the first and second frames and the similarities in each of the blocks between the second and third frames, and the mean value is used as the threshold value.

A twenty-second basic embodiment of this invention is based on the thirteenth basic embodiment thereof. In the method according to the twenty-second basic embodiment, when a number of the effective blocks is smaller than a reference number, it is decided that the first and second frames relate to a same scene.

According to a twenty-third basic embodiment of this invention, an apparatus for detecting a change in scenes represented by a moving picture signal includes means for selecting first and second frames from among frames represented by the moving picture signal; means for dividing each of the first and second frames into blocks; means for calculating similarities in each of the blocks among the first and second frames; and means for detecting a scene change of the second frame from the first frame in response to the calculated similarities.

A twenty-fourth basic embodiment of this invention is based on the twenty-third basic embodiment thereof. The apparatus of the twenty-fourth basic embodiment further includes means for selecting a third frame from among the frames represented by the moving picture signal; means for calculating similarities in each of the blocks among the second and third frames; means for calculating similarities in each of the blocks among the first and third frames; means for calculating correlations in each of the blocks among the first, second, and third frames on the basis of the calculated similarities in each of the blocks among the first and second frames, the calculated similarities in each of the blocks among the second and third frames, and the calculated similarities in each of the blocks among the first and third frames; means for deciding whether each of the blocks is effective or ineffective with respect to a scene change in response to the calculated similarities in each of the blocks among the first and second frames, the calculated similarities in each of the blocks among the second and third frames, and the calculated similarities in each of the blocks among the first and third frames; means for calculating a sum of the correlations in the effective blocks; means for calculating a total number of the effective blocks; means for calculating an evaluation value equal to the sum of the correlations in the effective blocks which is divided by the total number of the effective blocks; means for comparing the calculated evaluation value with a threshold value; and means for deciding that a scene change occurs when the calculated evaluation value is smaller than the threshold value.

According to a twenty-fifth basic embodiment of this invention, a recording medium stores a computer-related program including the steps of selecting first, second, and third frames from among frames represented by a moving picture signal; dividing each of the first, second, and third frames into blocks; detecting changes in each of the blocks among the first, second, and third frames; and detecting a scene change in response to the detected changes in each of the blocks.

According to a twenty-sixth basic embodiment of this invention, a recording medium stores a computer-related program including the steps of selecting first, second, third, and fourth frames from among frames represented by a moving picture signal; dividing each of the first, second, third, and fourth frames into blocks; detecting similarities in each of the blocks among the first, second, third, and fourth frames; deciding typical similarities in response to the detected similarities; deciding whether each of the blocks is effective or ineffective regarding a scene change in response to the typical similarities and the detected similarities; calculating a mean similarity among the typical similarities in effective blocks; and detecting a scene change in response to the calculated mean similarity.

First Embodiment

Figure 5:
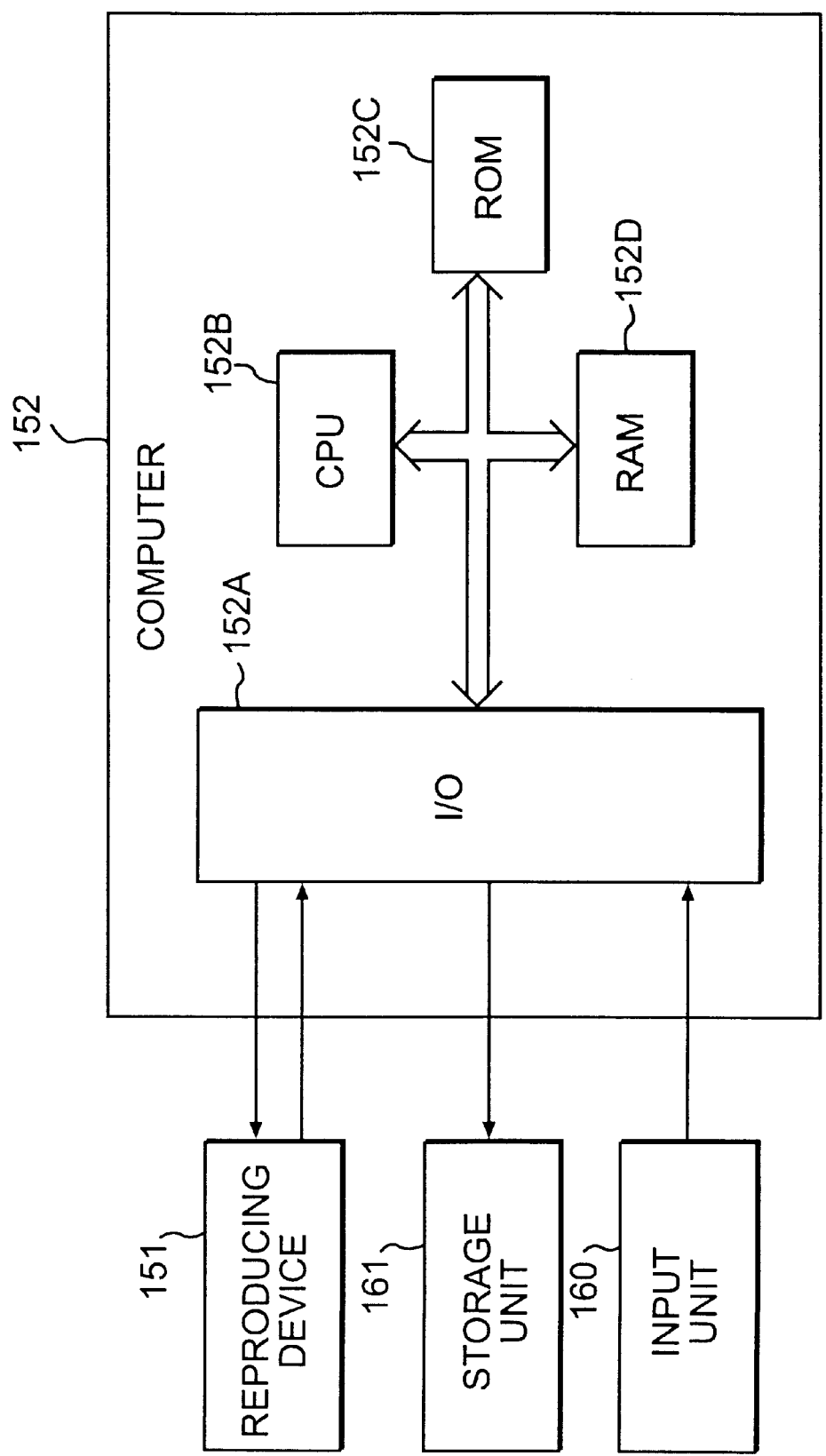
FIG. 5 is a block diagram of a scene-change detection system according to a first embodiment of this invention.

With reference to FIG. 5, a scene-change detection system includes a video signal reproducing device 151 such as an optical disc drive or a video deck. The video signal reproducing device 151 is connected to a computer 152. The video signal reproducing device 151 outputs a digital video signal to the computer 152. The video signal reproducing device 151 may output an analog video signal to the computer 152.

The computer 152 includes a combination of an input/output port (an interface) 152A, a CPU 152B, a ROM 152C, and a RAM 152D. The input/output port 152A receives the output signal of the video signal reproducing device 151. In the case where the output signal of the video signal reproducing device 151 is of the analog type, the input/output port 152A includes an A/D converter operating on the output signal of the video signal reproducing device 151. The computer 152 processes the output signal of the video signal reproducing device 151 according to a program (a video-signal processing program) stored in the ROM 152C.

It should be noted that the computer 152 may be replaced by a digital signal processor or a similar device.

The input/output port 152A of the computer 152 is connected to a storage unit 161. The computer 152 stores a processing-resultant signal into the storage unit 161. The storage unit 161 includes, for example, the combination of a hard disc and its drive or the combination of a floppy disc and its drive.

The input/output port 152A of the computer 152 is connected to a manually-operated input unit 160. When a start signal is inputted into the computer 152 by operating the input unit 160, the computer 152 starts operation of the video signal reproducing device 151.

Figure 6:
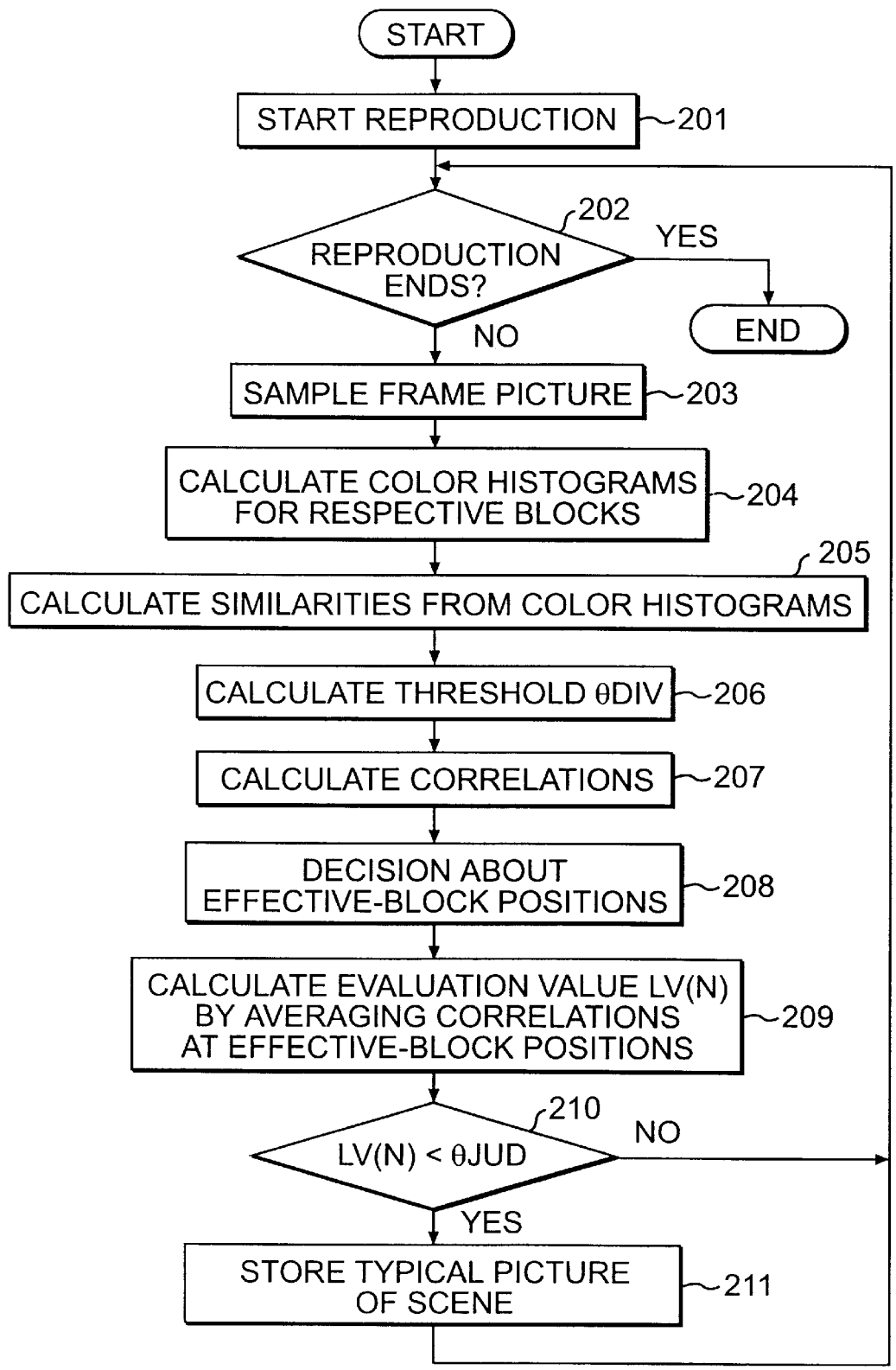
FIG. 6 is a flowchart of a video-signal processing program related to a computer in FIG. 5.

As previously indicated, the computer 152 operates in accordance with a video-signal processing program. FIG. 6 is a flowchart of the program. The program in FIG. 6 is started in response to a start signal inputted via the input unit 160.

As shown in FIG. 6, a first step 201 of the program starts operation of the video signal reproducing device 151. Accordingly, the video signal reproducing device 151 starts to reproduce a video signal at a normal speed or a high speed. After the step 201, the program advances to a step 202.

The step 202 decides whether or not the reproduction of the video signal is finished by referring to the output signal of the video signal reproducing device 151 or by referring to an operating condition signal fed from the video signal reproducing device 151. When it is decided that the reproduction of the video signal is finished, the program exits from the step 202 and then the current execution cycle of the program ends. Otherwise, the program advances from the step 202 to a step 203.

The step 203 stores a 1-frame-corresponding segment IN of the input video signal (the output signal of the video signal reproducing device 151) into the RAM 152D, where "N" denotes a natural number representative of a frame order number (a frame identification number) assigned to the present 1-frame-corresponding signal segment IN. In other words, the step 203 samples the 1-frame-corresponding segment IN of the input video signal (the output signal of the video signal reproducing device 151). As will be made clear later, the step 203 is iteratively executed. The 1-frame-corresponding segments I1, . . . , IN, . . . of the input video signal which are sampled by the step 203 are temporally spaced by irregular intervals or equal intervals corresponding to "n" frames. Here, "n" denotes a predetermined natural number.

A step 204 following the step 203 divides the 1-frame-corresponding signal segment IN into portions corresponding to equal-size blocks composing one frame. The step 204 processes 1-pixel-corresponding sections of the portions of the signal segment IN, and thereby calculates color histograms H(c, N, k) for the respective blocks in a known way. Here, "c" denotes a natural number equal to or smaller than 64 which indicates a color number, and "N" denotes the frame order number and "k" denotes a natural number which varies from 1 to 16 and which indicates a block-position number (or a block-identification number). Thus, k=1, 2, 3, . . . , 16.

A step 205 subsequent to the step 204 compares the two preceding histograms H(c, N−1, k) and H(c, N−2, k), and thereby calculates similarities BVF(N, k) according to the following equation.

$$BVF(N, k) = 1.0 - \sum_{c=1}^{64} \frac{\{H(c, N-2, k) - H(c, N-1, k)\}^2}{H(c, N-1, k) \cdot A}$$

where "A" denotes a predetermined constant for similarity adjustment. The similarities BVF(N, k) are forward with respect to the frame N−1. In addition, the step 205 compares the present histogram H(c, N, k) and the immediately preceding histogram H(c, N−1, k), and thereby calculates similarities BVL(N, k) according to the following equation.

$$BVL(N, k) = 1.0 - \sum_{c=1}^{64} \frac{\{H(c, N-1, k) - H(c, N, k)\}^2}{H(c, N, k) \cdot A}$$

The similarities BVL(N, k) are backward with respect to the frame N−1. Furthermore, the step 205 compares the present histogram H(c, N, k) and the second immediately preceding histogram H(c, N−2, k), and thereby calculates similarities BVC(N, k) according to the following equation.

$$BVC(N, k) = 1.0 - \sum_{c=1}^{64} \frac{\{H(c, N-2, k) - H(c, N, k)\}^2}{H(c, N, k) \cdot A}$$

The similarities BVC(N, k) are before and behind (forward and backward) with respect to the frame N−1. Generally, the similarities tend to be great in the case where two frames related to the similarities represent a same scene. On the other hand, the similarities tend to be small in the case where two frames related to the similarities are temporally located at opposite sides of a scene-change point respectively. The maximum value of each of the similarities is equal to 1.0.

A step 206 following the step 205 calculates the sum of the forward similarities BVF(N, k) and the backward similarities BVL(N, k). Then, the step 206 divides the calculated sum by sixteen to calculate a mean value (an average value) among the forward similarities BVF(N, k) and the backward similarities BVL(N, k). The step 206 sets a threshold value θDIV to the calculated mean value. In other words, the step 206 calculates the threshold value θDIV according to the following equation.

$$\theta DIV = \left\{ \sum_{k=1}^{16} BVF(N, k) + \sum_{k=1}^{16} BVL(N, k) \right\} \Big/ 32$$

A step 207 subsequent to the step 206 initializes correlation values (or typical similarities) CV(k) assigned to the respective block positions "k". Specifically, the step 207 sets the correlation values CV(k) to the forward similarities BVF(N, k) respectively.

A step 208 following the step 207 decides effective-block positions among the block positions "k" on the basis of the forward similarities BVF(N, k) and the backward similarities BVL(N, k). A block position corresponding to a forward similarity BVF equal to or greater than the threshold value θDIV is judged to be an effective-block position. In addition, a block position corresponding to a backward similarity BVL equal to or greater than the threshold value θDIV is judged to be an effective-block position. Other block positions are judged to be ineffective-block positions.

A step 209 subsequent to the step 208 calculates the sum of the correlation values CV assigned to the effective-block positions. The step 209 divides the calculated sum by the number of the effective-block positions. The step 209 sets the result of the division as an evaluation value LV(N).

A step 210 compares the evaluation value LV(N) with a threshold value θJUD. When the evaluation value LV(N) is smaller than the threshold value θJUD, it is decided that a scene change occurs. In this case, the program advances from the step 210 to a step 211. When the evaluation value LV(N) is equal to or greater than the threshold value θJUD, it is decided that a scene change does not occur. In this case, the program returns from the step 210 to the step 202.

The step 211 stores the 1-frame-corresponding segment IN of the video signal into the storage unit 161 as an indication of a typical picture. After the step 211, the program returns to the step 202.

Final information stored in the storage unit 161 (final information stored in, for example, a hard disc or a floppy disc) represents pictures which occur immediately after scene changes respectively. Accordingly, the final information in the storage unit 161 can be used as a scene-search index with respect to the video signal stored in a recording medium on which the video signal reproducing device 151 operates.

Figure 7:
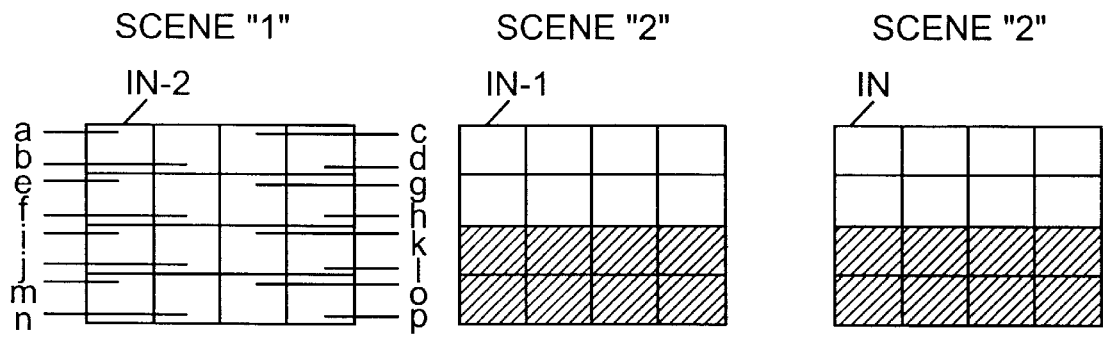
FIG. 7 is a diagram of a set of scenes represented by a video signal.

FIG. 7 shows an example of scenes (pictures) represented by the three 1-frame-corresponding segments IN-2, IN-2, and IN of the video signal respectively. According to the example in FIG. 7, a scene "2" represented by the 1-frame-corresponding segment IN-1 of the video signal differs from a scene "1" represented by the 1-frame-corresponding segment IN-2 of the video signal. In addition, the scene "2" is also represented by the 1-frame-corresponding segment IN of the video signal. In FIG. 7, the sixteen blocks are sequentially denoted by the characters "a", "b", "c", "d", "e", "f", "g", "h", "i", "j", "k", "l", "m", "n", "o", and "p", respectively.

Figure 8:
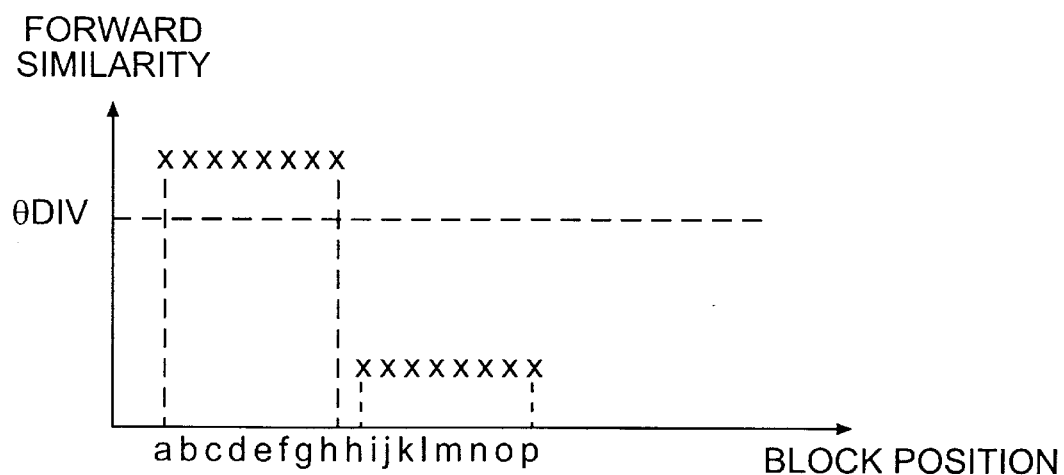
FIG. 8 is a diagram of a relation between forward similarity and block position.
Figure 9:
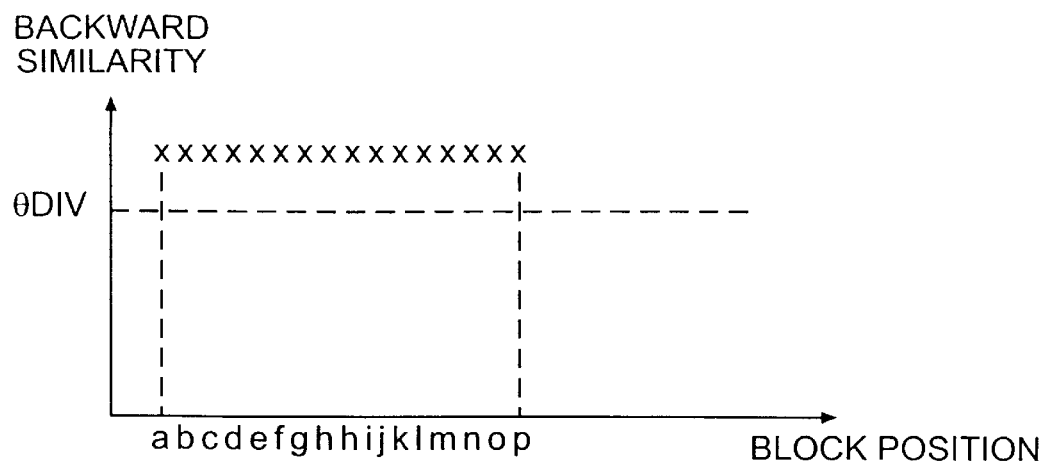
FIG. 9 is a diagram of a relation between backward similarity and block position.
Figure 10A:
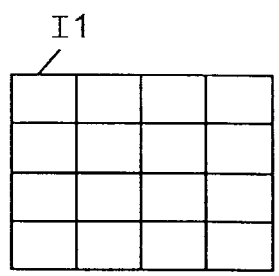
FIG. 10 is a diagram of a set of pictures represented by a video signal.
Figure 10B:
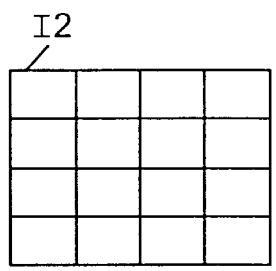
Figure 10C:
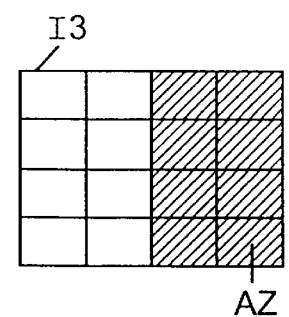
Figure 10D:
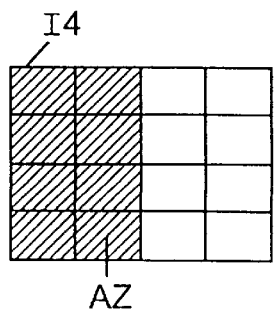
Figure 10E:
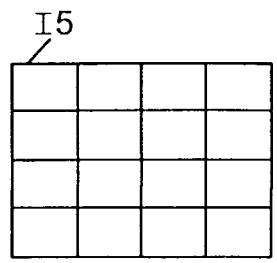

As shown in FIG. 7, the upper half of the scene "2" is equal to the upper half of the scene "1" while the lower half of the scene "2" differs from the lower half of the scene "1". In this case, as shown in FIG. 8, the forward similarities corresponding to the upper blocks "a", "b", "c", "d", "e", "f", "g", and "h" are great while the forward similarities corresponding to the lower blocks "i", "j", "k", "l", "m", "n", "o", and "p" are small. On the other hand, as shown in FIG. 9, all the backward similarities are great.

As previously indicated, the threshold value θDIV is equal to the mean value (the average value) among the forward similarities and the backward similarities. Thus, as shown in FIG. 8, the forward similarities corresponding to the upper blocks "a", "b", "c", "d", "e", "f", "g", and "h" exceed the threshold value θDIV while the forward similarities corresponding to the lower blocks "i", "j", "k", "l", "m", "n", "o", and "p" are smaller than the threshold value θDIV. On the other hand, as shown in FIG. 9, all the backward similarities exceed the threshold value θDIV. Accordingly, all the blocks "a", "b", "c", "d", "e", "f", "g", "h", "i", "j", "k", "l", "m", "n", "o", and "p" are used as effective blocks, and the forward similarities corresponding to all the block positions are selected as effective correlation values respectively. The evaluation value LV(N) is calculated on the basis of the correlation values corresponding to all the block positions. Therefore, it is possible to detect a scene change of the type as shown in FIG. 7.

Second Embodiment

A second embodiment of this invention is similar to the first embodiment thereof except for the following design changes. In the second embodiment of this invention, the step 211 subjects the 1-frame-corresponding segment IN of the video signal to a process of reducing or contracting the related picture. The step 211 stores the process-resultant 1-frame-corresponding segment IN' of the video signal into the storage unit 161 as an indication of a typical picture.

Third Embodiment

A third embodiment of this invention is similar to the first embodiment thereof except for the following design changes. In the third embodiment of this invention, the threshold value θDIV uses a preset fixed value. Thus, the step 206 (see FIG. 6) is omitted from the third embodiment. After the preset fixed value is set as the threshold value ODWV, adjustment may be implemented so that the number of effective-block positions will be equal to or greater than a half of the total number of the block positions.

Fourth Embodiment

A fourth embodiment of this invention is similar to the first embodiment thereof except for the following design changes. In the fourth embodiment of this invention, the step 204 calculates luminance histograms for the respective blocks in a known way, and the step 205 calculates similarities on the basis of the luminance histograms.

It should be noted that the luminance histograms may be replaced by luminance values or luminance levels.

Fifth Embodiment

A fifth embodiment of this invention is similar to the first embodiment thereof except for the following design changes. In the fifth embodiment of this invention, the step 207 compares the before-and-behind similarities BVC(N, k) with a threshold value θJUD1. The threshold value θJUD1 is equal to or different from the threshold value θJUD. For every block position corresponding to a before-and-behind similarity BVC equal to or greater than the threshold value θJUD1, the step 207 sets the related correlation value to the before-and-behind similarity BVC. For every block position corresponding to a before-and-behind similarity BVC smaller than the threshold value θJUD1, the step 207 sets the related correlation value to the corresponding forward similarity BVF.

In the step 208, a block position corresponding to a before-and-behind similarity BVC is judged to be an effective-block position.

Sixth Embodiment

A sixth embodiment of this invention is similar to the first embodiment thereof except for the following design changes. In the sixth embodiment of this invention, the step 207 compares the before-and-behind similarities BVC(N, k) with a threshold value θDIV1. The threshold value θDIV1 is equal to or different from the threshold value θDIV. For every block position corresponding to a before-and-behind similarity BVC equal to or greater than the threshold value θDIV1, the step 207 sets the related correlation value to the before-and-behind similarity BVC. For every block position corresponding to a before-and-behind similarity BVC smaller than the threshold value θDIV1, the step 207 sets the related correlation value to the corresponding forward similarity BVF.

In the step 208, a block position corresponding to a before-and-behind similarity BVC is judged to be an effective-block position.

Seventh Embodiment

A seventh embodiment of this invention is similar to the first embodiment thereof except for the following design changes. In the seventh embodiment of this invention, the step 207 compares the forward similarities BVF(N, k), the backward similarities BVL(N, k), and the before-and-behind similarities BVC(N, k) with a threshold value θJUD1 to decide whether or not the following three conditions are simultaneously satisfied.

$$BVF(N, k) < \theta JUD1$$

$$BVL(N, k) < \theta JUD1$$

$$BVC(N, k) \geq \theta JUD1$$

The threshold value θJUD1 is equal to or different from the threshold value θJUD. When the above-indicated three conditions are simultaneously satisfied, the step 207 sets the related correlation value to the before-and-behind similarity BVC. When the above-indicated three conditions are not simultaneously satisfied, the step 207 sets the related correlation value to the corresponding forward similarity BVF.

In the step 208, a block position corresponding to a before-and-behind similarity BVC is judged to be an effective-block position.

Eighth Embodiment

An eighth embodiment of this invention is similar to the first embodiment thereof except for the following design changes. In the eighth embodiment of this invention, the step 207 compares the before-and-behind similarities BVC(N, k) and the before-and-behind similarities BVC(N−1, k) with a threshold value θJUD1. The threshold value θJUD1 is equal to or different from the threshold value θJUD. For every block position corresponding to a before-and-behind similarity BVC(N) or BVC(N−1) equal to or greater than the threshold value θJUD, the step 207 sets the related correlation value to the before-and-behind similarity BVC(N) or BVC(N−1). For every block position corresponding to a before-and-behind similarity BVC(N) or BVC(N−1) smaller than the threshold value θJUD1, the step 207 sets the related correlation value to the corresponding forward similarity BVF.

In the step 208, a block position corresponding to a before-and-behind similarity BVC(N) or BVC(N−1) is judged to be an effective-block position.

Every block position related to a correlation value set to a before-and-behind similarity BVC(N) or BVC(N−1) will be referred to as a before-and-behind similarity block position. The before-and-behind similarity block positions mean the positions of blocks subjected to a flash-like change between pictures represented by the 1-frame-corresponding segments IN−2 and IN−1 of the video signal.

FIG. 10 shows an example of scenes (pictures) represented by the five 1-frame-corresponding segments I1, I2, I3, I4, and I5 of the video signal respectively. According to the example in FIG. 10, the image of an object AZ having an area equal to a half of the 1-frame area horizontally moves across the 1-frame area. With reference to FIG. 10, in the scenes represented by the 1-frame-corresponding segments I3 and I4 of the video signal, the positions of blocks at which the image of the object AZ are located agree with before-and-behind similarity block positions. Thus, the scenes represented by the five 1-frame-corresponding segments I1, I2, I3, I4, and I5 of the video signal in FIG. 10 are handled as still scenes shown in FIG. 11. Accordingly, it is possible to prevent such movement of the image of an object from being detected as a scene change.

Ninth Embodiment

A ninth embodiment of this invention is similar to the first embodiment thereof except for design changes explained later.

In the ninth embodiment of this invention, forward similarity block positions mean block positions "k" related to forward similarities BVF(N, k) and backward similarities BVL(N, k) which satisfy the following conditions.

$$BVF(N, k) \geq \theta DIV1$$

$$BVL(N, k) < \theta DIV1$$

where θDIV1 denotes a threshold value equal to or different from the threshold value θDIV.

Backward similarity block positions mean block positions "k" related to forward similarities BVF(N, k) and backward similarities BVL(N, k) which satisfy the following conditions.

$$BVF(N, k) < \theta DIV1$$

$$BVL(N, k) \geq \theta DIV1$$

where θDIV1 denotes a threshold value equal to or different from the threshold value θDIV.

FIG. 12 shows an example of scenes (pictures) represented by the three 1-frame-corresponding segments IN−2, IN−1, and IN of the video signal respectively. According to the example in FIG. 12, the image of an object having an area equal to a 1-block area horizontally moves relative to the 1-frame area. With reference to FIG. 12, the block position AY which positionally coincides with the image of the object in the scene represented by the 1-frame-corresponding segment IN−2 of the video signal becomes a backward similarity block position. On the other hand, the block position BY which positionally coincides with the image of the object in the scene represented by the 1-frame-corresponding segment IN of the video signal becomes a forward similarity block position. Motion of the image of the object can be detected by investigating the forward similarity block position and the backward similarity block position related to the 1-frame-corresponding segments IN−2 and IN of the video signal.

In the case where only motion of the image of an object between blocks occurs, the number of forward similarity block positions and the number of backward similarity block positions are equal to each other. According to the ninth embodiment, when a movement destination remains in the 1-frame area, the step 207 decides that the related movement agrees with normal motion. In addition, the step 207 uses a backward similarity (or backward similarities) as a correlation value (or correlation values).

Generally, the number of forward similarity block positions and the number of backward similarity block positions are different from each other in the case where the image of an object moves out of the 1-frame area, in the case where the image of an object goes behind the image of another object, or in the case where a scene change occurs.

It is assumed that the number of backward similarity block positions is greater than the number of forward similarity block positions. A backward similarity block position or backward similarity block positions among the previously-indicated backward similarity block positions which correspond to an excess over the number of the previously-indicated forward similarity block positions are not regarded by the step 207 as a motion-related block position or motion-related block positions. For such a backward similarity block position or backward similarity block positions, the step 207 uses a related forward similarity or related forward similarities as a correlation value or correlation values.

The number of forward similarity block positions is denoted by NBF while the number of backward similarity block positions is denoted by NBL. It is preferable that when the number NBF is equal to or greater than the number NBL, correlation values corresponding to the backward similarity block positions are replaced by backward similarities BVL(N, k). It is also preferable that when the number NBF is smaller than the number NBL, correlation values corresponding to the backward similarity block positions, the number of which is equal to the number NBF, are replaced by backward similarities BVL(N, k).

FIG. 13 shows an example of scenes (pictures) represented by the five 1-frame-corresponding segments I1, I2, I3, I4, I5, and I6 of the video signal respectively. In FIG. 13, the hatched regions denote the images of an object. Regarding a succession of the scenes represented by the 1-frame-corresponding segments I1, I2, and I3 of the video signal, there are four backward similarity block positions Ab and four forward similarity block positions Ac. In this case, since the correlation values related to the backward similarity block positions Ab are set to the corresponding backward similarities respectively, the evaluation value LV(3) is equal to 1.0. Regarding a succession of the scenes represented by the 1-frame-corresponding segments I2, I3, and I4 of the video signal, there are two backward similarity block positions Ad and six forward similarity block positions Ae. In this case, since the backward similarities are used as the correlation values related to all the backward similarity block positions Ad respectively, the evaluation value LV(4) is equal to 1.0. Regarding a succession of the scenes represented by the 1-frame-corresponding segments I3, I4, and I5 of the video signal, four block positions Af are ineffective-block positions while four block positions Ag are before-and-behind similarity block positions. In this case, the evaluation value LV(4) is equal to 1.0. The scenes represented by the 1-frame-corresponding segments I3, I4, and I5 of the video signal in FIG. 13 are handled as scenes shown in FIG. 14. For a succession of the scenes represented by the 1-frame-corresponding segments I4, I5, and I6 of the video signal in FIG. 13, signal processing is implemented which is similar to signal processing with respect to a succession of the scenes represented by the 1-frame-corresponding segments I4, I5, and I6 of the video signal in FIG. 14. In this case, four block positions Ah are backward similarity block positions while four block positions Ai are forward similarity block positions. Since the correlation values related to the backward similarity block positions Ah are set to the corresponding backward similarities respectively, the evaluation value LV(6) is equal to 1.0.

As previously explained, for the scenes (pictures) represented by the five 1-frame-corresponding segments I1, I2, I3, I4, I5, and I6 of the video signal in FIG. 13, the evaluation values LV(3), LV(4), LV(5), and LV(6) are equal to the maximum value, that is, 1.0. Therefore, it is possible to suppress over-detection or excessive detection of scene changes. In the case where time intervals between 1-frame-corresponding segments I1, I2, . . . , and IN of the video signal are equal to about one second, during a slow scene change such as a dissolve, all the forward similarities, the backward similarities, and the before-and-behind similarities are small. Accordingly, it is possible to detect a slow scene change such as a dissolve.

Tenth Embodiment

A tenth embodiment of this invention is similar to the first embodiment thereof except for the following design changes. In the tenth embodiment of this invention, the step 205 compares the elements (the frequency members) of the histogram H(c, N−2, k) with a threshold value θh. The step 205 detects the elements (the frequency members) of the histogram H(c, N−2, k) which meet the following condition.

$$H(c, N-2, k) > \theta h$$

The step 205 generates a modified histogram H'(c, N−2, k) composed of the histogram elements which meet the above-indicated condition. The step 205 calculates the sum AV(N−2, k) of the elements (the frequency members) of the histogram H'(c, N−2, k) while the color number "c" is changed from 1 to 64. Similarly, the step 205 calculates the sum AV(N−1, k).

The step 205 compares the elements (the frequency members) of the histograms H(c, N−2, k) and H(c, N−1, k) with the threshold value θh. The step 205 detects the elements (the frequency members) of the histograms H(c, N−2, k) and H(c, N−1, k) which meet the following conditions.

$$H(c, N-2, k) > \theta h$$

$$H(c, N-1, k) > \theta h$$

The step 205 generates modified histograms HC(c, N−2, k) and HC(c, N−1, k) composed of the histogram elements which meet the above-indicated conditions. The step 205 calculates the sum AC(N−2, k) of the elements (the frequency members) of the histogram HC(c, N−2, k) while the color number "c" is changed from 1 to 64. The step 205 calculates the sum AC(N−1, k) of the elements (the frequency members) of the histogram HC(c, N−1, k) while the color number "c" is changed from 1 to 64. The step 205 divides the sum AC(N−2, k) by the sum AV(N−2, k). The step 205 divides the sum AC(N−1, k) by the sum AV(N−1, k). The step 205 compares the division result "AC(N−2, k)/AV(N−2, k)" and the division result "AC(N−1, k)/AV(N−1, k)". The step 205 sets the forward similarities BVF(N, k) to "AC(N−2, k)/AV(N−2, k)" in the case where the division results are in the following relation.

$$AC(N-2, k)/AV(N-2, k) < AC(N-1, k)/AV(N-1, k)$$

The step 205 sets the forward similarities BVF(N, k) to "AC(N−1, k)/AV(N−1, k)" in the case where the division results are in the following relation.

$$AC(N-2, k)/AV(N-2, k) \geq AC(N-1, k)/AV(N-1, k)$$

It should be noted that the backward similarities BVL(N, 1), . . . , and BVL(N, 16), and the before-and-behind similarities BVC(N, 1), . . . , and BVC(N, 16) may be calculated on the basis of the sums AV(N−1, k), AV(N, k), AC(N−1, k), and AC(N, k) in similar ways.

Eleventh Embodiment

Figure 15:
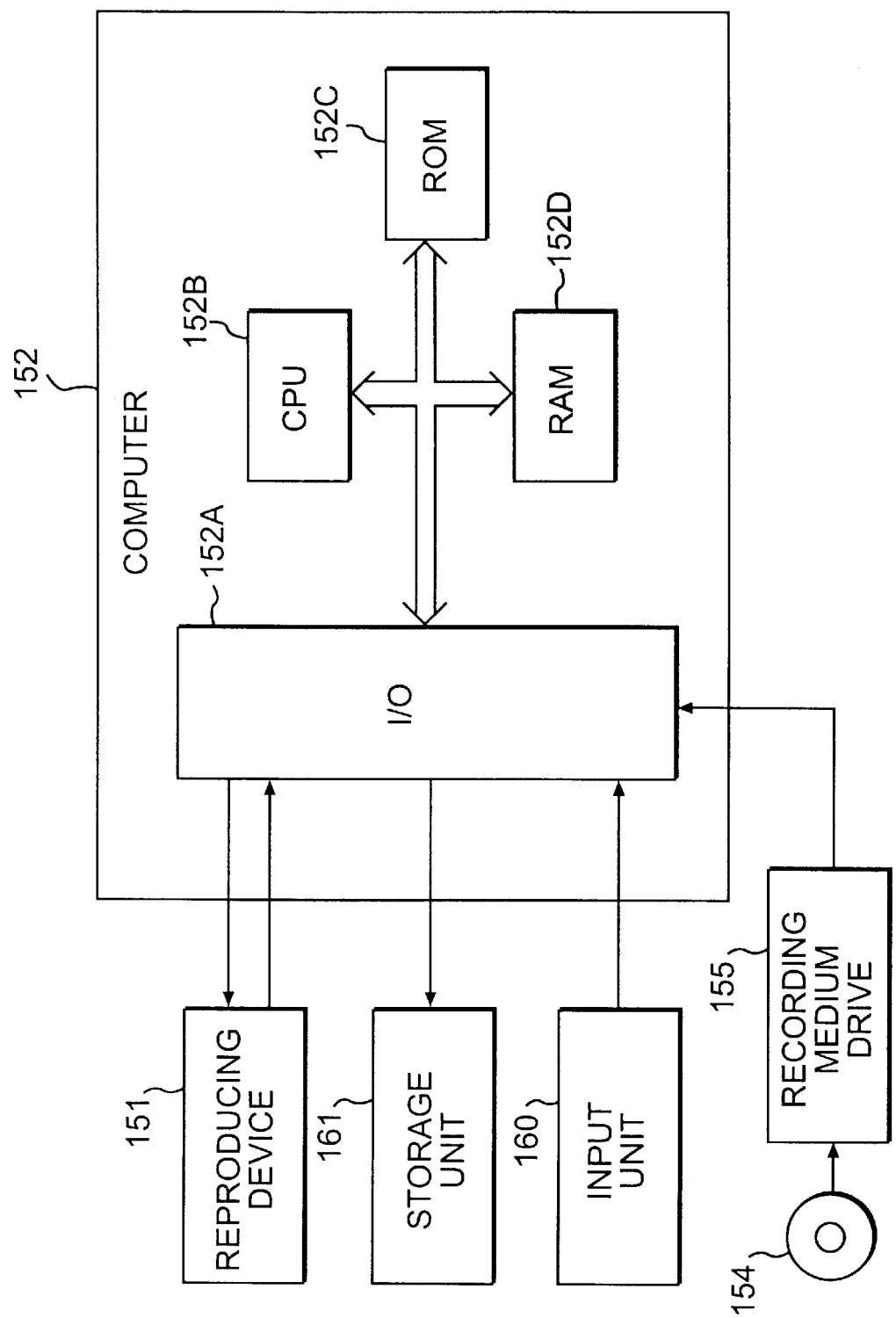
FIG. 15 is a block diagram of a scene-change detection system according to an eleventh embodiment of this invention.

FIG. 15 shows an eleventh embodiment of this invention which is similar to the first embodiment thereof except for the following design changes. In the embodiment of FIG. 15, information of the video-signal processing program (shown in FIG. 6) is stored in a recording medium 154 such as a floppy disc or an optical disc.

As shown in FIG. 15, a drive 155 for the recording medium 154 is connected to the input/output port 152A of the computer 152. Before the computer 152 is started to process the output signal of the video signal reproducing device 151, the recording-medium drive 155 is activated to read out the information of the video-signal processing program from the recording medium 154. The recording-medium drive 155 feeds the information of the video-signal processing program to the computer 152. The information of the video-signal processing program is stored into the RAM 152D within the computer 152. Then, the computer 152 processes the output signal of the video signal reproducing device 151 according to the video-signal processing program in the RAM 152D.

Twelfth Embodiment

Figure 16:
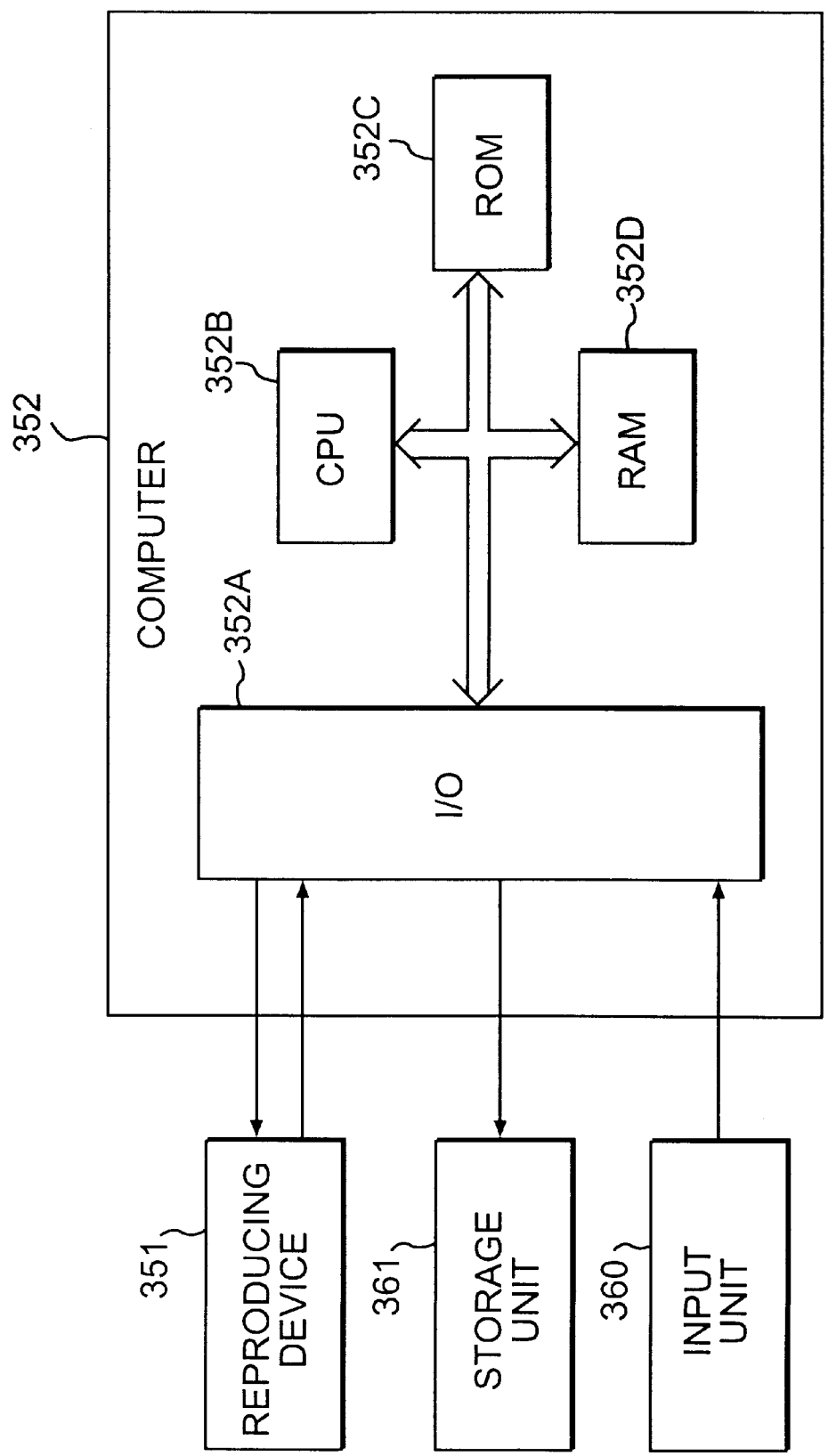
FIG. 16 is a block diagram of a scene-change detection system according to a twelfth embodiment of this invention.

With reference to FIG. 16, a scene-change detection system includes a video signal reproducing device 351 such as an optical disc drive or a video deck. The video signal reproducing device 351 decodes or expands a compression-resultant digital video signal to recover an original digital video signal. The video signal reproducing device 351 is connected to a computer 352. The video signal reproducing device 351 outputs the recovered digital video signal to the computer 352. The video signal reproducing device 351 may output an analog video signal to the computer 352.

The computer 352 includes a combination of an input/output port (an interface) 352A, a CPU 352B, a ROM 352C, and a RAM 352D. The input/output port 352A receives the output signal of the video signal reproducing device 351. In the case where the output signal of the video signal reproducing device 351 is of the analog type, the input/output port 352A includes an A/D converter operating on the output signal of the video signal reproducing device 351. The computer 352 processes the output signal of the video signal reproducing device 351 according to a program (a video signal processing program) stored in the ROM 352C. In addition, the computer 352 controls the video signal reproducing device 351 according to the program.

It should be noted that the computer 352 may be replaced by a digital signal processor or a similar device.

The input/output port 352A of the computer 352 is connected to a storage unit 361. The computer 352 stores a processing-resultant signal into the storage unit 361. The storage unit 361 includes, for example, the combination of a hard disc and its drive or the combination of a floppy disc and its drive.

The input/output port 352A of the computer 352 is connected to a manually-operated input unit 360. When a start signal is inputted into the computer 352 by operating the input unit 360, the computer 352 starts operation of the video signal reproducing device 351.

Figure 17:
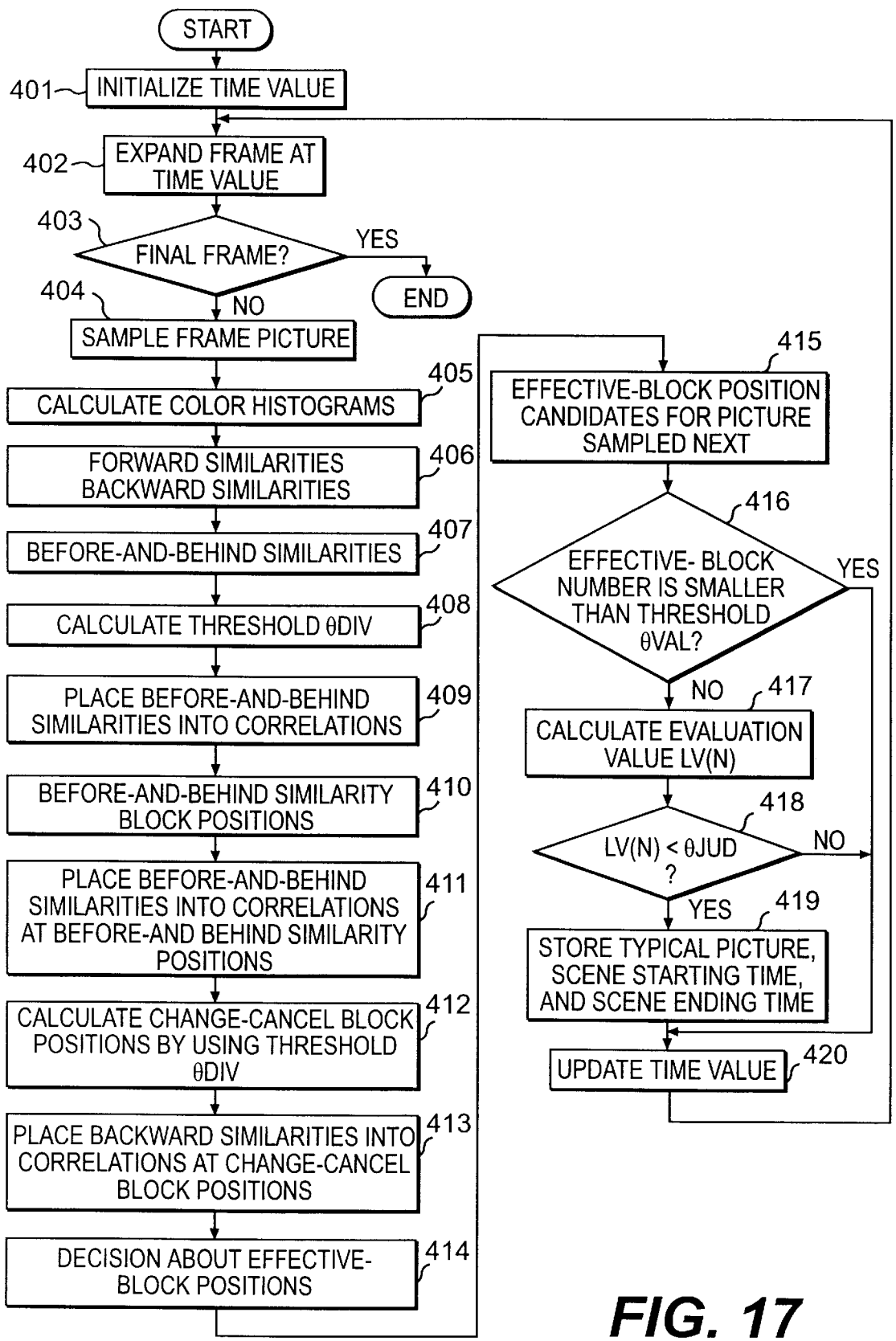
FIG. 17 is a flowchart of a video-signal processing program related to a computer in FIG. 16.

As previously indicated, the computer 352 operates in accordance with a video-signal processing program. FIG. 17 is a flowchart of the program. The program in FIG. 17 is started in response to a start signal inputted via the input unit 360.

As shown in FIG. 17. a first step 401 of the program initializes a time-representing value to "0". The time-representing value indicates a designated time point corresponding to a designated frame represented by the compression-resultant signal processed by the video signal reproducing device 351. The time-representing value being "0" corresponds to a first frame represented by the compression-resultant signal. After the step 401, the program advances to a step 402.

The step 402 controls the video signal reproducing device 351 to decode or expand a segment of the compression-resultant video signal which represents a frame designated by the time-representing value. Therefore, the video signal reproducing device 351 outputs a video signal segment to the computer 352 which represents the designated frame.

A step 403 following the step 402 compares the time-representing value with a given value corresponding to a final frame represented by the compression-resultant video signal. When the time-representing value is greater than the given value, the program exits from the step 403 and then the current execution cycle of the program ends. Otherwise, the program advances from the step 403 to a step 404.

The step 404 stores a 1-frame-corresponding segment IN of the input video signal (the output signal of the video signal reproducing device 351) into the RAM 352D, where "N" denotes a natural number representative of a frame order number (a frame identification number) assigned to the present 1-frame-corresponding signal segment IN. In this way, the video signal segment IN representing the frame designated by the time-representing value is stored in the RAM 352D. In other words, the 1-frame-corresponding segment IN of the input video signal (the output signal of the video signal reproducing device 351) is sampled.

A step 405 following the step 404 divides the 1-frame-corresponding signal segment IN into portions corresponding to equal-size blocks composing one frame. The step 405 processes 1-pixel-corresponding sections of the portions of the signal segment IN, and thereby calculates color histograms H(c, N, k) for the respective blocks in a known way. Here, "c" denotes a natural number equal to or smaller than 64 which indicates a color number, and "N" denotes the frame order number and "k" denotes a natural number which varies from 1 to 16 and which indicates a block-position number (or a block-identification number). Thus, k=1, 2, 3, . . . , 16.

A step 406 subsequent to the step 405 compares the two preceding histograms H(c, N−1, k) and H(c, N−2, k), and thereby calculates similarities BVF(N, k) according to the following equation.

$$BVF(N, k) = 1.0 - \sum_{c=1}^{64} \frac{\{H(c, N-2, k) - H(c, N-1, k)\}^2}{H(c, N-1, k) \cdot A}$$

where "A" denotes a predetermined constant for similarity adjustment. The similarities BVF(N, k) are forward with respect to the frame N−1. In addition, the step 406 compares the present histogram H(c, N, k) and the immediately preceding histogram H(c, N−1, k). and thereby calculates similarities BVL(N, k) according to the following equation.

$$BVL(N, k) = 1.0 - \sum_{c=1}^{64} \frac{\{H(c, N-1, k) - H(c, N, k)\}^2}{H(c, N, k) \cdot A}$$

The similarities BVL(N, k) are backward with respect to the frame N−1.

A step 407 following the step 406 detects block positions (before-and-behind similarity block position candidates "km") related to froward similarities BVF(N, k) and backward similarities BVL(N, k) which satisfy the following conditions.

$BVF(N, k) < \theta JUD$ $BVL(N, k) < \theta JUD$ where θJUD denotes a threshold value. For the before-and-behind similarity block position candidates "km", the step 407 compares the present histogram H(c, N, k) and the second immediately preceding histogram H(c, N−2, k), and thereby calculates similarities BVC(N, k) according to the following equation.

$$BVC(N, k) = 1.0 - \sum_{c=1}^{64} \frac{\{H(c, N-2, k) - H(c, N, k)\}^2}{H(c, N, k) \cdot A}$$

The similarities BVC(N, k) are before and behind (forward and backward) with respect to the frame N−1.

A step 408 subsequent to the step 407 calculates the sum of the forward similarities BVF(N, k) and the backward similarities BVL(N, k). Then, the step 408 divides the calculated sum by sixteen to calculate a mean value (an average value) among the forward similarities BVF(N, k) and the backward similarities BVL(N, k). The step 408 sets a threshold value θDIV to the calculated mean value. In other words, the step 408 calculates the threshold value θDIV according to the following equation.

$$\theta DIV = \left\{ \sum_{k=1}^{16} BVF(N, k) + \sum_{k=1}^{16} BVL(N, k) \right\} / 32$$

A step 409 following the step 408 initializes correlation values (or typical similarities) CV(k) assigned to the respective block positions "k". Specifically, the step 409 sets the correlation values CV(k) to the forward similarities BVF(N, k) respectively.

A step 410 subsequent to the step 409 selects block positions (before-and-behind similarity block positions) from among block positions "k1m" contained in both the before-and-behind similarity block position candidates "km" and effective-block position candidates "k1". The selected block positions relate to before-and-behind similarities BVC(N, k1m) equal to or greater than the threshold value θJUD. The effective-block position candidates "k1" use block positions except before-and-behind similarity block positions regarding the 1-frame-corresponding signal segment IN−1 which has been previously sampled. The effective-block position candidates "k1" are decided by previous execution of a step 415 which will be explained later.

A step 411 following the step 410 corrects the correlation values CV(k) into correction-resultant correlation values CV1(k). Specifically, for the before-and-behind similarity block positions, the step 411 sets the related correlation values CV to the before-and-behind similarities BVC.

A step 412 subsequent to the step 411 selects backward similarity block positions from among block positions "k'1" in the effective-block position candidates "k1" except the before-and-behind similarity block positions. The backward similarity block positions relate to forward similarities BVF(N, k'1) and backward similarities BVL(N, k'1) which have the following relations with the threshold value θDIV.

$BVF(N, k'1) < \theta DIV$ $BVL(N, k'1) \geq \theta DIV$

In addition, the step 412 selects forward similarity block positions from among the block positions "k'1" in the effective-block position candidates "k1" except the before-and-behind similarity block positions. The forward similarity block positions relate to forward similarities BVF(N, k'1) and backward similarities BVL(N, k'1) which have the following relations with the threshold value θDIV.

$BVF(N, k'1) \geq \theta DIV$ $BVL(N, k'1) < \theta DIV$

Furthermore, the step 412 calculates the number of the forward similarity block positions and the number of the backward similarity block positions. The step 412 compares the two calculated numbers with each other. The step 412 selects a smaller number out of the two numbers as a change cancel block number. The step 412 arranges the backward similarity block positions according to the block position number. Then, the step 412 selects successive backward similarity block positions, which start from the backward similarity block position having the smallest block position number, out of the arrangement of the backward similarity block positions. The number of the selected backward similarity block positions is equal to the change cancel block number. The step 412 sets the selected backward similarity block positions as change cancel block positions.

A step 413 following the step 412 corrects the correlation values CV1(k) into correction-resultant correlation values CV2(k). Specifically, for the change cancel block positions, the step 413 sets the related correlation values CV1 to the backward similarities BVL.

A step 414 subsequent to the step 413 selects block positions from among the effective-block position candidates "k1" as ineffective-block positions. The ineffective-block positions relate to forward similarities BVF(N, k), backward similarities BVL(N, k), and before-and-behind similarities BVC(N, k1) which have the following relations with the threshold values θDIV and θJUD.

$BVF(N, k) < \theta DIV$ $BVL(N, k) < \theta DIV$ $BVC(N, k1) < \theta JUD$

The step 414 sets the effective-block position candidates except the ineffective-block positions as effective-block positions. The step 414 sets block positions other than the effective-block position candidates as ineffective-block positions.

A step 415 following the step 414 sets block positions except the before-and-behind similarity block positions as effective-block position candidates for a 1-frame-corresponding signal segment IN+1 which will be sampled next.

A step 416 subsequent to the step 415 calculates the number of the effective-block positions. The step 416 compares the calculated number of the effective-block positions with a threshold value θVAL. When the number of the effective-block positions is smaller than the threshold value θVAL, the step 416 sets all the block positions as ineffective-block positions and then the program jumps from the step 416 to a step 420. When the number of the effective-block positions is equal to or greater than the threshold value θVAL, the program advances from the step 416 to a step 417.

The step 417 calculates the sum of the correlation values CV2 assigned to the effective-block positions. The step 417 divides the calculated sum by the number of the effective-block positions. The step 417 sets the result of the division as an evaluation value LV(N).

A step 418 following the step 417 compares the evaluation value LV(N) with the threshold value θJUD. When the evaluation value LV(N) is smaller than the threshold value θJUD, it is decided that a scene change occurs. In this case, the program advances from the step 418 to a step 419. When the evaluation value LV(N) is equal to or greater than the threshold value θJUD, it is decided that a scene change does not occur. In this case, the program jumps from the step 418 to the step 420.

The step 419 stores the 1-frame-corresponding segment IN of the video signal into the storage unit 361 as an indication of a typical picture of the present scene. The step 419 retrieves information of the immediately-preceding time-representing value which corresponds to the 1-frame-corresponding segment IN−1 of the video signal. The step 419 stores the information of the immediately-preceding time-representing value into the storage unit 361 as an indication of a starting moment of the present scene. The step 419 retrieves information of the second immediately-preceding time-representing value which corresponds to the 1-frame-corresponding segment IN−2 of the video signal. The step 419 stores the information of the second immediately-preceding time-representing value into the storage unit 361 as an indication of an ending moment of the immediately-preceding scene. After the step 419, the program advances to the step 420.

The step 420 updates the time-representing value. For example, the step 420 sets the time-representing value to the product of a predetermined reproduction speed and a time lapse from the start of the scene change detecting process. After the step 420, the program returns to the step 402.

Final information stored in the storage unit 361 (final information stored in, for example, a hard disc or a floppy disc) represents typical pictures of different scenes respectively. In addition, the final information stored in the storage unit 361 represents the starting moment and the ending moment of each of the different scenes. Accordingly. the final information in the storage unit 361 can be used as a scene-search index with respect to the video signal stored in a recording medium on which the video signal reproducing device 351 operates.

As understood from the previously explanation, before-and-behind similarity block positions are removed from effective-block positions for the 1-frame-corresponding segment of the video signal which will be sampled next. Thereby, it is possible to suppress over-detection or excessive detection with respect to motions such as shown in FIGS. 10 and 13. On the other hand, it is possible to detect a general scene change and also a slow scene change such as a dissolve.

Thirteenth Embodiment

A thirteenth embodiment of this invention is similar to the twelfth embodiment thereof except for the following design changes. In the thirteenth embodiment of this invention, the step 419 stores information of the order number of the starting frame in the present scene into the storage unit 361 as an indication of a starting moment of the present scene. Also, the step 419 stores information of the order number of the ending frame in the present scene into the storage unit 361 as an indication of an ending moment of the present scene.

Fourteenth Embodiment

A fourteenth embodiment of this invention is similar to the twelfth embodiment thereof except for the following design changes. In the fourteenth embodiment of this invention, the step 419 stores information of the number of bytes in a portion of the compression-resultant video signal between the start of the compression-resultant video signal and the start of the present scene into the storage unit 361 as an indication of a starting moment of the present scene. Also, the step 419 stores information of the number of bytes in a portion of the compression-resultant video signal between the start of the compression-resultant video signal and the end of the present scene into the storage unit 361 as an indication of an ending moment of the present scene.

Fifteenth Embodiment

A fifteenth embodiment of this invention is similar to the twelfth embodiment thereof except for the following design changes. In the fifteenth embodiment of this invention, the step 419 stores information of the number of bytes in a portion of the compression-resultant video signal between the start of the compression-resultant video signal and the time position of the typical picture of the present scene into the storage unit 361 as an indication of a time position of the present scene.

Sixteenth Embodiment

Figure 18:
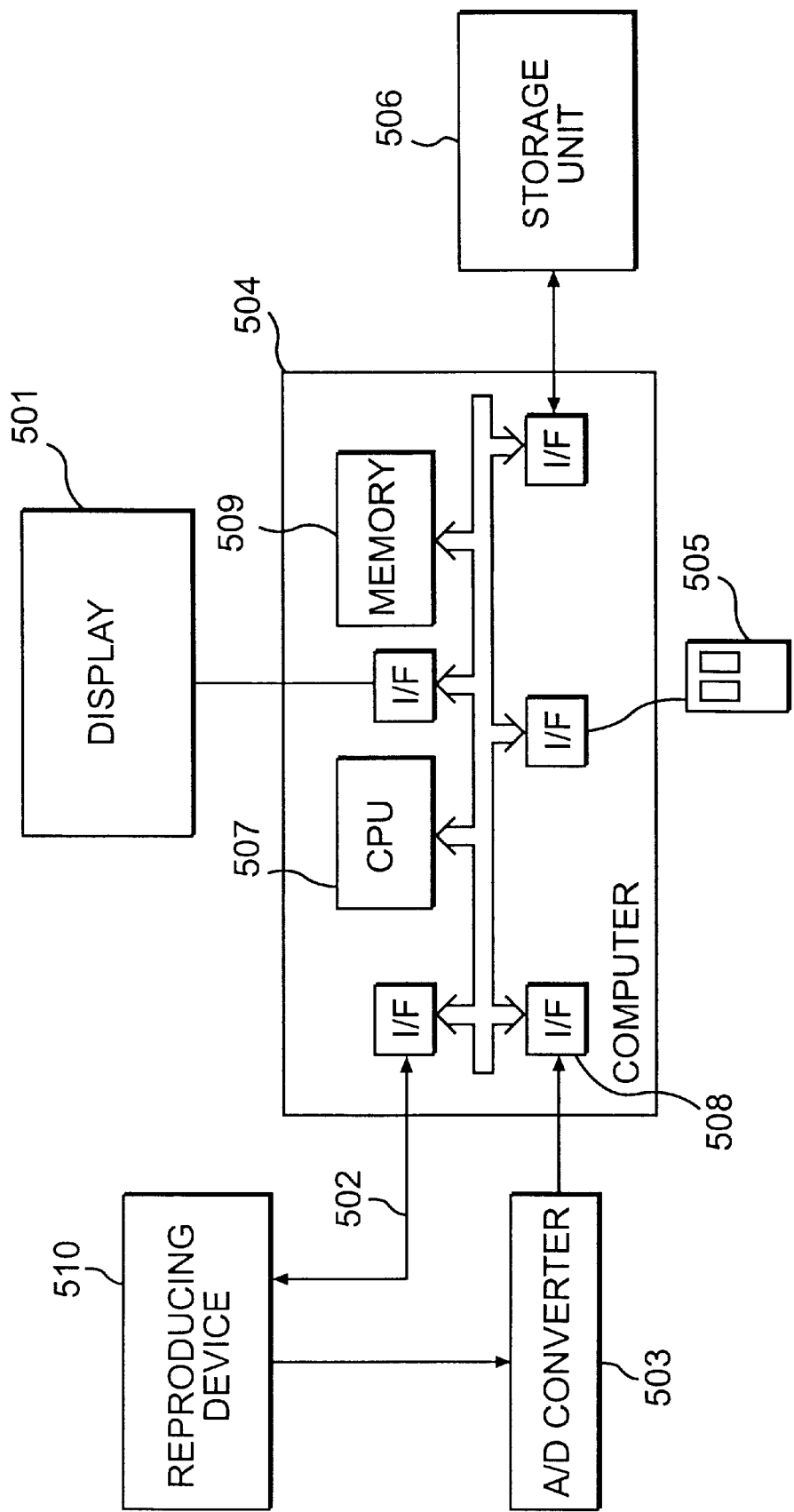
FIG. 18 is a block diagram of a moving-picture search system according to a sixteenth embodiment of this invention.

With reference to FIG. 18, a moving-picture search system includes a display 501 for indicating an output signal of a computer 504. Instructions can be inputted into the computer 504 via a pointing device 505. A moving-picture reproducing device 510 is, for example, an optical disc drive or a video deck.

An analog video signal outputted from the moving-picture reproducing device 510 is changed by an A/D converter 503 into digital video data. The digital video data is fed from the A/D converter 503 to the computer 504. In the computer 504, the digital video data is fed to a memory 509 via an interface 508, and is processed by a CPU 507 according to a program (a video-data processing program) stored in the memory 509.

Serial numbers (referred to as frame order numbers) are assigned to respective frames represented by a moving picture signal handled by the moving-picture reproducing device 510. When the computer 504 informs the moving-picture reproducing device 510 of the order number of a desired frame via a control line 502, the moving-picture reproducing device 510 outputs a video signal representing the desired frame. The computer 504 can store various information pieces into an external storage unit 506.

Figure 19:
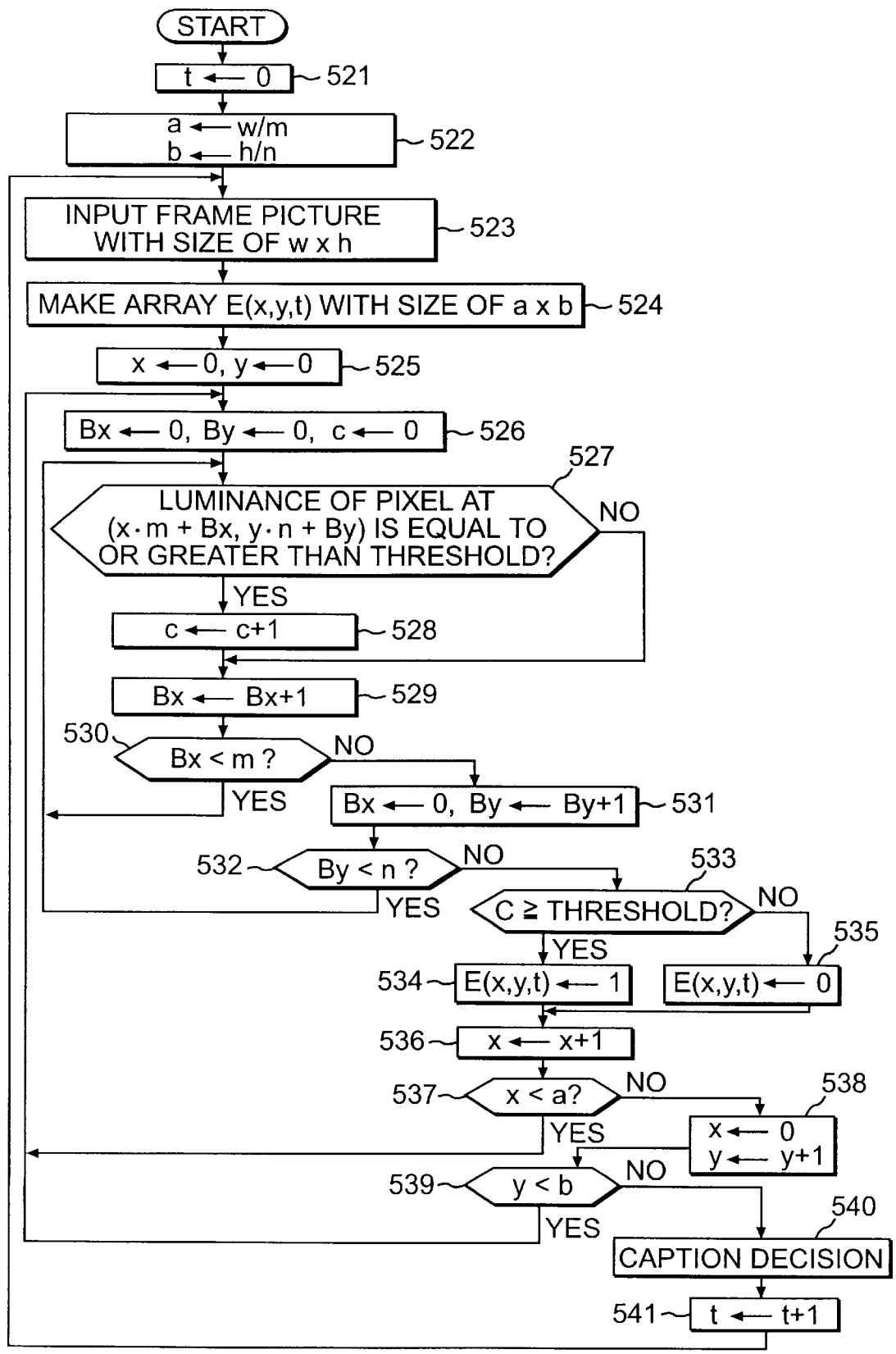
FIG. 19 is a flowchart of a video-signal processing program related to a computer in FIG. 18.

FIG. 19 is a flowchart of the program (the video-data processing program) related to the computer 504. As shown in FIG. 19, a first step 521 of the program initializes a variable "t" to "0". The variable "t" indicates time. The time "t" is substantially equivalent to a frame order number.

A step 522 following the step 521 initializes values "a" and "b" to "w/m" and "h/n" respectively. Every frame is divided into equal-size blocks each having "m" by "n" pixels. The character "w" indicates the total number of pixels in a horizontal direction with respect to one frame. The character "h" indicates the total number of pixels in a vertical direction with respect to one frame. Accordingly, the value "a" represents the total number of blocks in a horizontal direction with respect to one frame. The value "b" represents the total number of blocks in a vertical direction with respect to one frame. After the step 522, the program advances to a step 523.

The step 523 controls the moving-picture reproducing device 510 (see FIG. 18) to reproduce a moving-picture signal. The step 523 stores a 1-frame-corresponding segment of the output signal of the A/D converter 503 (see FIG. 18) into the memory 509 (see FIG. 18) as a digital picture having a size of w×h and relating to the time point "t". In other words, the step 523 samples a 1-frame-corresponding segment of the digital moving-picture signal (the output signal of the A/D converter 503) which corresponds to the frame order number "t".

A step 524 following the step 523 prepares a three-dimensional array E(x, y, t) having a size of a×b with respect to the time point "t".

A step 525 subsequent to the step 524 resets or initializes variables "x" and "y" to "0". The variable "x" indicates a horizontal position of a block of interest. The variable "y" indicates a vertical position of the block of interest. After the step 525, the program advances to a step 526.

The step 526 resets or initializes variables "Bx", "By", and "c" to "0". The variable "Bx" indicates a horizontal position of a pixel of interest within a block. The variable "By" indicates a vertical position of the pixel of interest within a block. The variable "c" is used to count pixels forming parts of a caption in a block. After the step 526, the program advances to a step 527.

The step 527 compares the luminance level (the tone level) of a pixel of interest with a first threshold value. The location of the pixel of interest is expressed as "(x·m+Bx, y·n+By)". When the luminance level of the pixel of interest is equal to or higher than the first threshold value, it is decided that the pixel of interest forms a part of a caption. In this case, the program advances from the step 527 to a step 528. When the luminance level of the pixel of interest is lower than the first threshold value, it is decided that the pixel of interest does not relate to a caption. In this case, the program jumps from the step 527 to a step 529.

The step 528 increments the value "c" by "1". After the step 528, the program advances to the step 529. The step 529 increments the value "Bx" by "1". After the step 529, the program advances to a step 530.

The step 530 compares the value "Bx" with the value "m".

When the value "Bx" is smaller than the value "m", the program returns from the step 530 to the step 527. Otherwise, the program advances from the step 530 to a step 531.

The step 531 resets the value "Bx" to "0". In addition, step 531 increments the value "By" by "1". After the step 531, the program advances to a step 532.

The step 532 compares the value "By" with the value "n". When the value "By" is smaller than the value "n", the program returns from the step 532 to the step 527. Otherwise, the program advances from the step 532 to a step 533.

The step 533 refers to the value "c" which indicates the total number of pixels forming parts of a caption in a block. The step 533 compares the value "c" with a second threshold value to decide whether or not the block of interest contains at least a part of a caption. When the value "c" is equal to or greater than the second threshold value, that is, when it is decided that the block of interest contains at least a part of a caption, the program advances from the step 533 to a step 534. When the value "c" is smaller than the second threshold value, that is, when it is decided that the block of interest does not relate to a caption, the program advances from the step 533 to a step 535.

The step 534 sets the value E(x, y, t) to "1" as an indication of the presence of a caption in the block of interest. On the other hand, the step 535 sets the value E(x, y, t) to "0" as an indication of the absence of a caption from the block of interest.

A step 536 following the steps 534 and 535 increments the value "x" by "1". After the step 536, the program advances to a step 537.

The step 537 compares the value "x" with the value "a". When the value "x" is smaller than the value "a", the program returns from the step 537 to the step 526. Otherwise, the program advances from the step 537 to a step 538.

The step 538 resets the value "x" to "0". In addition, the step 538 increments the value "y" by "1". After the step 538, the program advances to a step 539.

The step 539 compares the value "y" with the value "b". When the value "y" is smaller than the value "b", the program returns from the step 539 to the step 526. Otherwise, the program advances from the step 539 to a block 540.

The block 540 implements a decision as to the appearance and the disappearance of a caption. After the block 540, the program advances to a step 541.

The step 541 increments the value "t" by "1". After the step 541, the program returns to the step 523.

Figure 20:
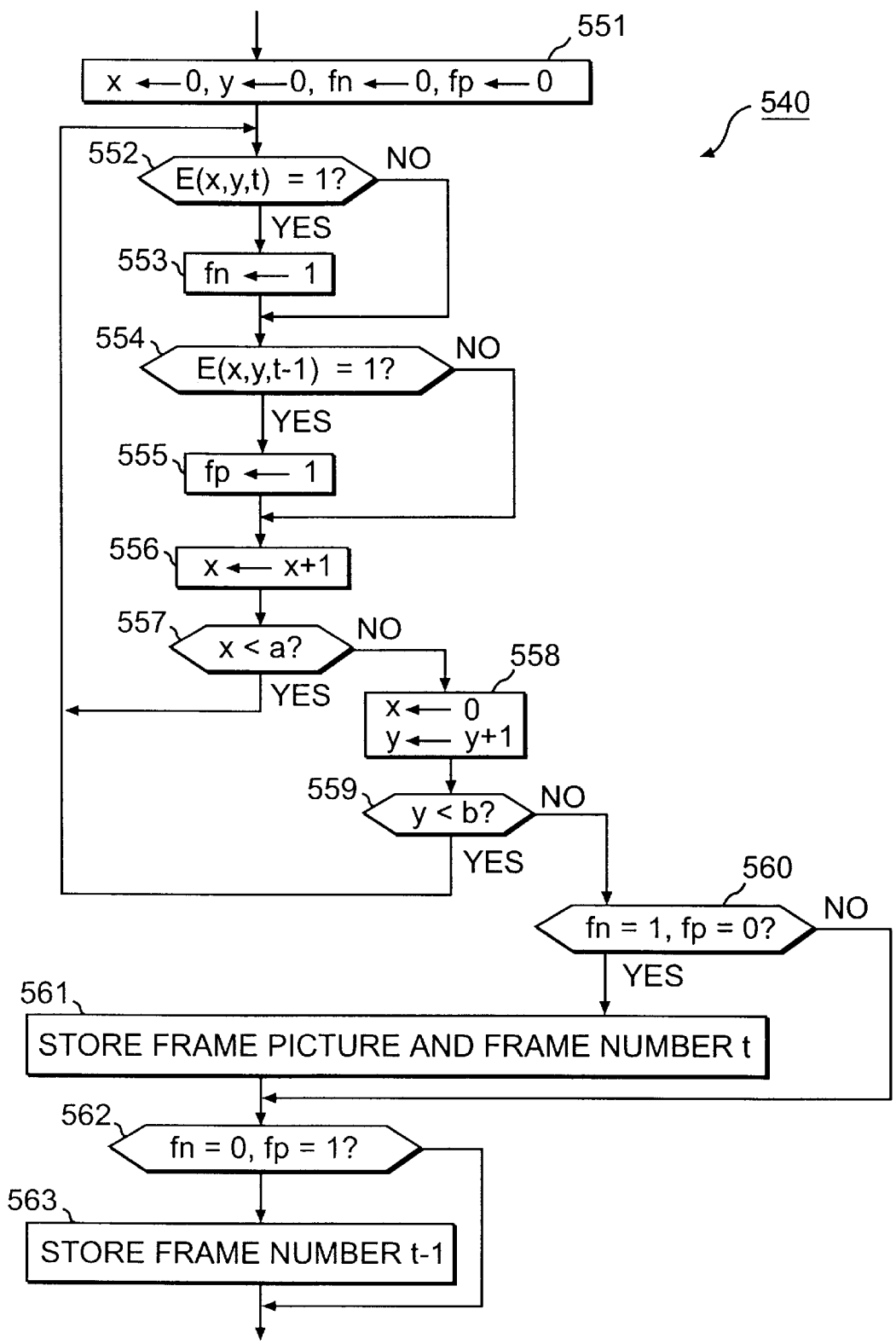
FIG. 20 is a flowchart of a caption decision block in FIG. 19.

As shown in FIG. 20, a first step 551 in the block 540 resets the values "x" and "y" to "0". In addition, the step 551 initializes flags "fn" and "fp" to "0". After the step 551, the program advances to a step 552.

The step 552 decides whether or not the value E(x, y, t) is equal to "1". When the value E(x, y, t) is equal to "1", the program advances from the step 552 to a step 553. Otherwise, the program jumps from the step 552 to a step 554.

The step 553 sets the flag "fn" to "1" as an indication of the presence of a caption in the present frame having the order number "t". After the step 553, the program advances to the step 554.

The step 554 retrieves the value E(x, y, t−1) related to the previous frame having the order number "t−1". The step 554 decides whether or not the value E(x, y, t−1) is equal to "1". When the value E(x, y, t−1) is equal to "1", the program advances from the step 554 to a step 555. Otherwise, the program jumps from the step 554 to a step 556.

The step 555 sets the flag "fp" to "1" as an indication of the presence of a caption in the previous frame having the order number "t−1". After the step 555, the program advances to the step 556.

The step 556 increments the value "x" by "1". After the step 556, the program advances to a step 557.

The step 557 compares the value "x" with the value "a". When the value "x" is smaller than the value "a", the program returns from the step 557 to the step 552. Otherwise, the program advances from the step 557 to a step 558.

The step 558 resets the value "x" to "0". In addition, the step 558 increments the value "y" by "1". After the step 558, the program advances to a step 559.

The step 559 compares the value "y" with the value "b". When the value "y" is smaller than the value "b", the program returns from the step 559 to the step 552. Otherwise, the program advances from the step 559 to a step 560.

The step 560 decides whether or not the flags "fn" and "fp" are equal to "1" and "0" respectively, that is, whether or not a caption exists in the present frame with an order number of "t" while a caption is absent from the previous frame with an order number of "t−1". In other words, the step 560 decides whether or not a caption newly appears in the present frame. When the flags "fn" and "fp" are equal to "1" and "0" respectively, that is, when a caption newly appears in the present frame, the program advances from the step 560 to a step 561. Otherwise, the program jumps from the step 560 to a step 562.

The step 561 stores the 1-frame-corresponding segment of the digital moving-picture signal which corresponds to the frame order number "t" into the external storage unit 506. In addition, the step 561 stores information of the frame order number "t" into the external storage unit 506. Accordingly, 1-frame-corresponding segments of the digital moving-picture signal which have time positions equal to respective moments of appearances of captions are stored into the external storage unit 506. After the step 561, the program advances to the step 562.

The step 562 decides whether or not the flags "fn" and "fp" are equal to "0" and "1" respectively, that is, whether or not a caption is absent from the present frame with an order number of "t" while a caption exists in the previous frame with an order number of "t−1". In other words, the step 562 decides whether or not a caption disappears from the present frame. When the flags "fn" and "fp" are equal to "0" and "1" respectively, that is, when a caption disappears from the present frame, the program advances from the step 562 to a step 563. Otherwise, the program jumps from the step 562 to the step 541 in FIG. 19.

The step 563 stores the 1-frame-corresponding segment of the digital moving-picture signal which corresponds to the frame order number "t−1" into the external storage unit 506. In addition, the step 561 stores information of the frame order number "t−1" into the external storage unit 506. Accordingly, 1-frame-corresponding segments of the digital moving-picture signal which have time positions immediately before respective disappearances of captions are stored into the external storage unit 506. After the step 563, the program advances to the step 541 in FIG. 19.

It is preferable that only one 1-frame-corresponding segment of the digital moving-picture signal is stored by the step 561 into the external storage unit 506 per set of successive similar scenes.

The computer 504 implements a search process according to a search program stored in the memory 509. During the search process, the computer 504 controls the display 501 so that a search picture will be indicated on the display 501.

Figure 27:
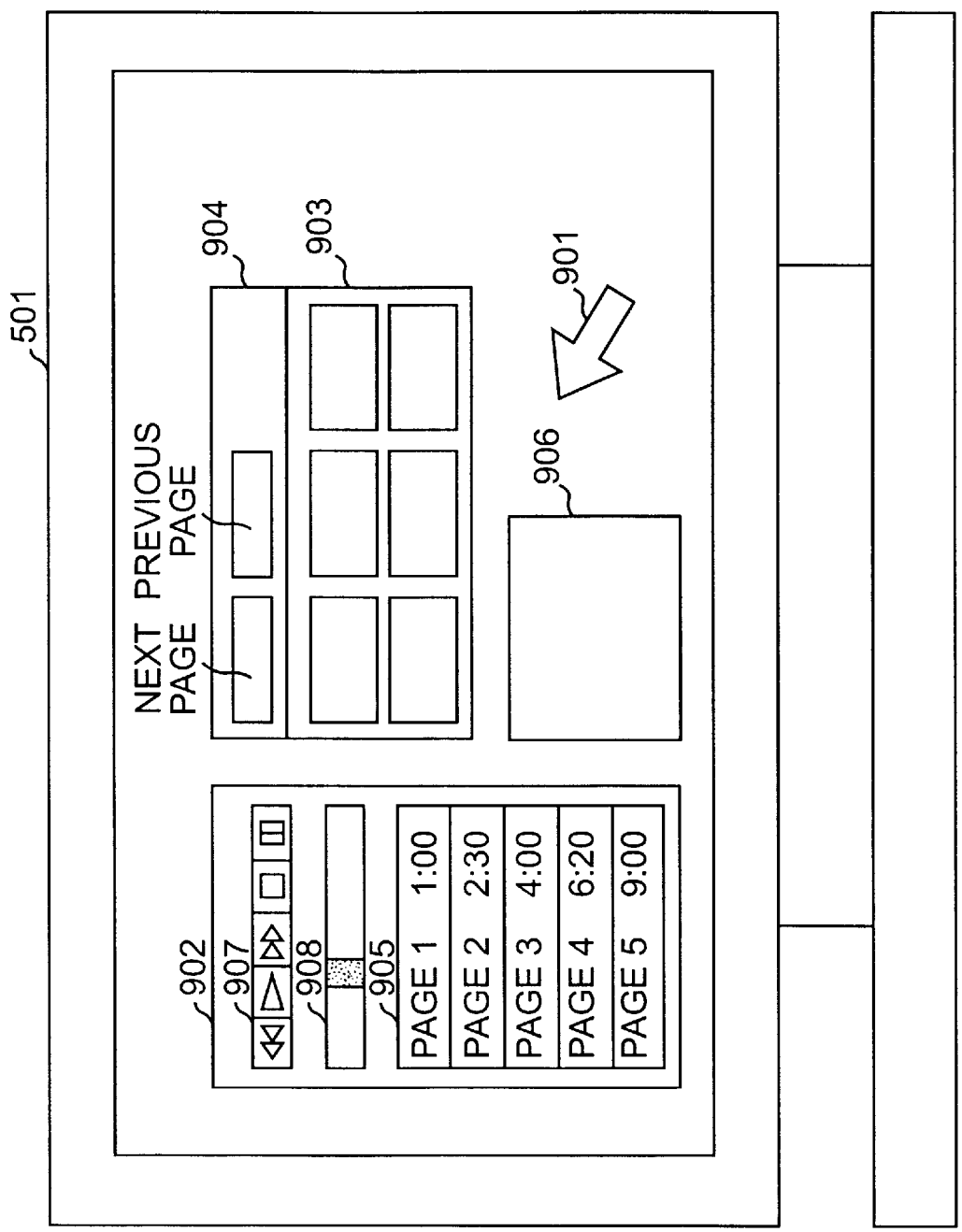
FIG. 27 is a diagram of a search picture indicated on a display in FIG. 18.

FIG. 27 shows an example of the search picture on the display 501. With reference to FIG. 27, the search picture includes a mouse cursor 901 which can be moved by operating the pointing device 505 (see FIG. 18). Also, the search picture includes a control window 902, a caption-related frame window 903, a page window 904, and a video window 906. The control window 902 has page designation buttons 905, an indicator 908, and control buttons 907. The caption-related frame window 903 has separate segments for different frames respectively. The page window 904 has two buttons corresponding to a next page and a preceding page respectively.

When the mouse cursor 901 is moved to the next-page button in the page window 904 and the pointing device 505 is actuated to click the next-page button, the computer 504 transmits information of caption-added frames on a next page to the display 501. Then, the computer 504 controls the display 501 so that the caption-added frames on the next page will be indicated as a list on the respective segments in the caption-related frame window 903 on the display 501.

When the mouse cursor 901 is moved to the preceding-page button in the page window 904 and the pointing device 505 is actuated to click the preceding-page button, the computer 504 transmits information of caption-added frames in a preceding page to the display 501. Then, the computer 504 controls the display 501 so that the caption-added frames in the preceding page will be indicated as a list on the respective segments in the caption-related frame window 903 on the display 501.

When the mouse cursor 901 is moved to one of the page designation buttons 905 and the pointing device 505 is actuated to click the page designation button 905 to designate a page, the computer 504 transmits information of caption-added frames in the designated page to the display 501. Then, the computer 504 controls the display 501 so that the caption-added frames in the designated page will be indicated as a list on the respective segments in the caption-related frame window 903 on the display 501.

When the mouse cursor 901 is moved to one of the caption-added frames indicated in the caption-related frame window 903 and the pointing device 505 is actuated to click the caption-added frame, the computer 504 controls the moving-picture reproducing device 510 so that the reproduction of the video signal by the moving-picture reproducing device 510 will be started from the clicked caption-added frame. The computer 504 transmits the output signal of the A/D converter 503 to the display 501. The computer 504 controls the display 501 so that the clicked caption-added frame and later frames will be successively indicated in the video window 906 on the display 501 as a moving picture. In addition, the computer 504 controls the display 501 so that the indicator 908 thereon will show the time lapse since the start of the reproduction of the video signal.

The indication of the moving picture in the video window 906 can be controlled by clicking the control buttons 907 in the control window 903 on the display 501.

Seventeenth Embodiment

A seventeenth embodiment of this invention is similar to the sixteenth embodiment thereof except for the video-data processing program related to the computer 504 (see FIG. 18).

Figure 21:
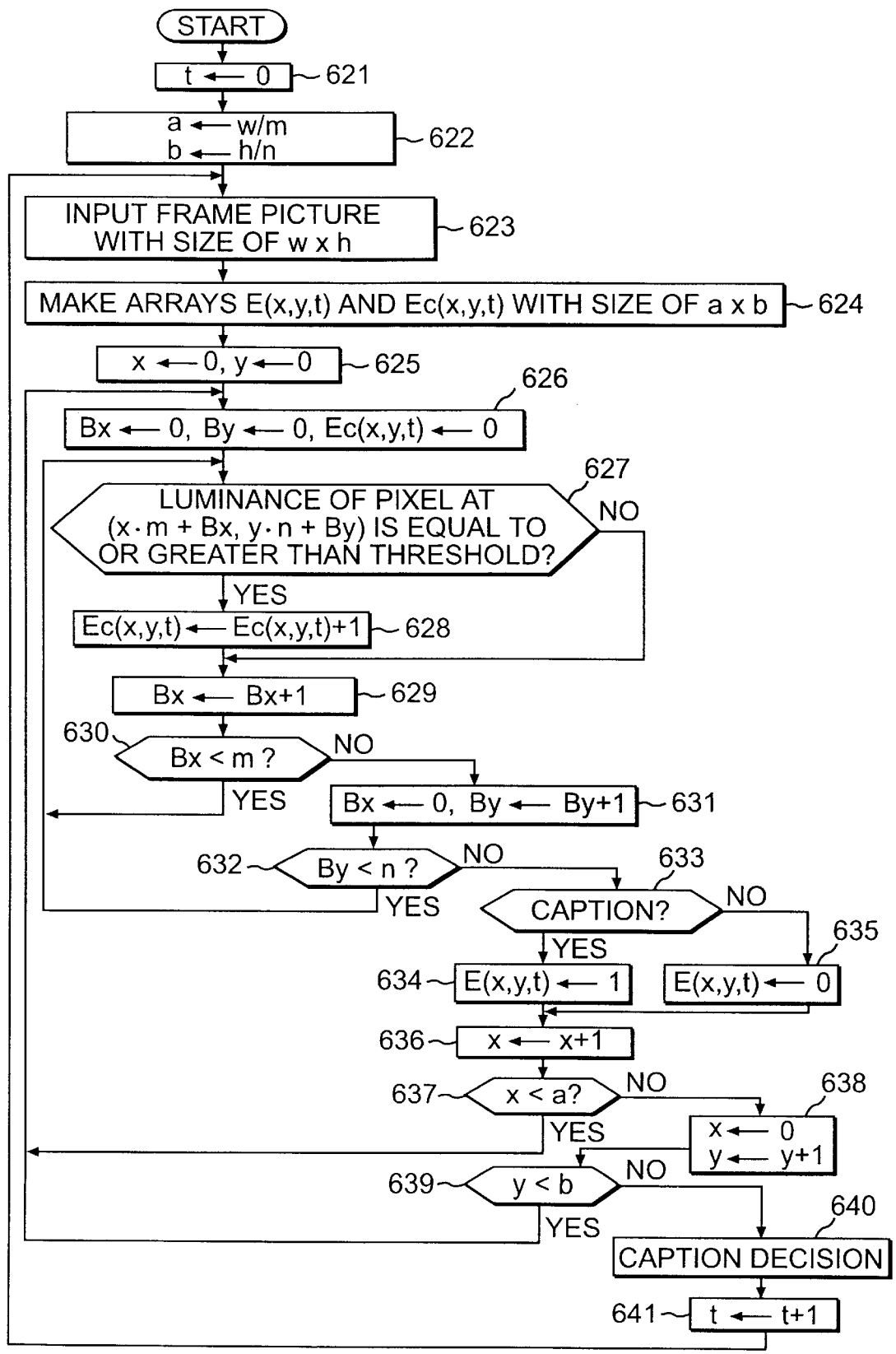
FIG. 21 is a flowchart of a video-data processing program in a seventeenth embodiment of this invention.

FIG. 21 is a flowchart of the video-data processing program in the seventeenth embodiment of this invention. As shown in FIG. 21, a first step 621 of the program initializes a variable "t" to "0". The variable "t" indicates time. The time "t" is substantially equivalent to a frame order number.

A step 622 following the step 621 initializes values "a" and "b" to "w/m" and "h/n" respectively. Every frame is divided into equal-size blocks each having "m" by "n" pixels. The character "w" indicates the total number of pixels in a horizontal direction with respect to one frame. The character "h" indicates the total number of pixels in a vertical direction with respect to one frame. Accordingly, the value "a" represents the total number of blocks in a horizontal direction with respect to one frame. The value "b" represents the total number of blocks in a vertical direction with respect to one frame. After the step 622, the program advances to a step 623.

The step 623 controls the moving-picture reproducing device 510 (see FIG. 18) to reproduce a moving-picture signal. The step 623 stores a 1-frame-corresponding segment of the output signal of the A/D converter 503 (see FIG. 18) into the memory 509 (see FIG. 18) as a digital picture having a size of w×h and relating to the time point "t". In other words, the step 623 samples a 1-frame-corresponding segment of the digital moving-picture signal (the output signal of the A/D converter 503) which corresponds to the frame order number "t".

A step 624 following the step 623 prepares a three-dimensional array E(x, y, t) having a size of a×b with respect to the time point "t". Also, the step 624 prepares a three-dimensional array Ec(x, y, t) having a size of a×b with respect to the time point "t".

A step 625 subsequent to the step 624 resets or initializes variables "x" and "y" to "0". The variable "x" indicates a horizontal position of a block of interest. The variable "y" indicates a vertical position of the block of interest. After the step 625, the program advances to a step 626.

The step 626 resets or initializes variables "Bx" and "By" to "0".

In addition, the step 626 resets or initializes the value Ec(x, y, t) to "0". The variable "Bx" indicates a horizontal position of a pixel of interest within a block. The variable "By" indicates a vertical position of the pixel of interest within a block. The value Ec(x, y, t) is used to count pixels forming parts of a caption in a block. After the step 626, the program advances to a step 627.

The step 627 compares the luminance level (the tone level) of a pixel of interest with a first threshold value. The location of the pixel of interest is expressed as "(x·m+Bx, y·n+By)". When the luminance level of the pixel of interest is equal to or higher than the first threshold value, it is decided that the pixel of interest forms a part of a caption. In this case, the program advances from the step 627 to a step 628. When the luminance level of the pixel of interest is lower than the first threshold value, it is decided that the pixel of interest does not relate to a caption. In this case, the program jumps from the step 627 to a step 629.

The step 628 increments the value Ec(x, y, t) by "1". After the step 628, the program advances to the step 629. The step 629 increments the value "Bx" by "1". After the step 629, the program advances to a step 630.

The step 630 compares the value "Bx" with the value "m". When the value "Bx" is smaller than the value "m", the program returns from the step 630 to the step 627. Otherwise, the program advances from the step 630 to a step 631.

The step 631 resets the value "Bx" to "0". In addition, the step 631 increments the value "By" by "1". After the step 631, the program advances to a step 632.

The step 632 compares the value "By" with the value "n". When the value "By" is smaller than the value "n", the program returns from the step 632 to the step 627. Otherwise, the program advances from the step 632 to a step 633.

The step 633 refers to the value Sc(x, y, t) which indicates the total number of pixels forming parts of a caption in a block in the present frame having an order number of "t". The step 633 retrieves the value Ec(x, y, t−1) related to a block in the previous frame having an order number of "t−1". The step 633 compares the values Ec(x, y, t) and Ec(x, y, t−1) with a second threshold value. The step 633 calculates the absolute value of the difference between the values Ec(x, y, t) and Ec(x, y, t−1). The step 633 compares the calculated absolute value of the difference with a third threshold value. In the case where both the values Ec(x, y, t) and Ec(x, y, t−1) are equal to or greater than the second threshold value while the absolute value of the difference is equal to or smaller than the third threshold value, it is decided that the block of interest contains at least a part of a caption. In this case, the program advances from the step 633 to a step 634. Otherwise, it is decided that the block of interest does not relate to a caption, and the program advances from the step 633 to a step 635.

The step 634 sets the value E(x, y, t) to "1" as an indication of the presence of a caption in the block of interest. On the other hand, the step 635 sets the value E(x, y, t) to "0" as an indication of the absence of a caption from the block of interest.

A step 636 following the steps 634 and 635 increments the value "x" by "1". After the step 636, the program advances to a step 637.

The step 637 compares the value "x" with the value "a". When the value "x" is smaller than the value "a", the program returns from the step 637 to the step 626. Otherwise, the program advances from the step 637 to a step 638.

The step 638 resets the value "x" to "0". In addition, the step 538 increments the value "y" by "1". After the step 638, the program advances to a step 639.

The step 639 compares the value "y" with the value "b". When the value "y" is smaller than the value "b", the program returns from the step 639 to the step 626. Otherwise, the program advances from the step 639 to a block 640.

The block 640 implements a decision as to the appearance and the disappearance of a caption. The block 640 is similar to the block 540 in FIGS. 19 and 20. After the block 640, the program advances to a step 641.

The step 641 increments the value "t" by "1". After the step 641, the program returns to the step 623.

Eighteenth Embodiment

An eighteenth embodiment of this invention is similar to the seventeenth embodiment thereof except for the contents of the block 640.

Figure 22:
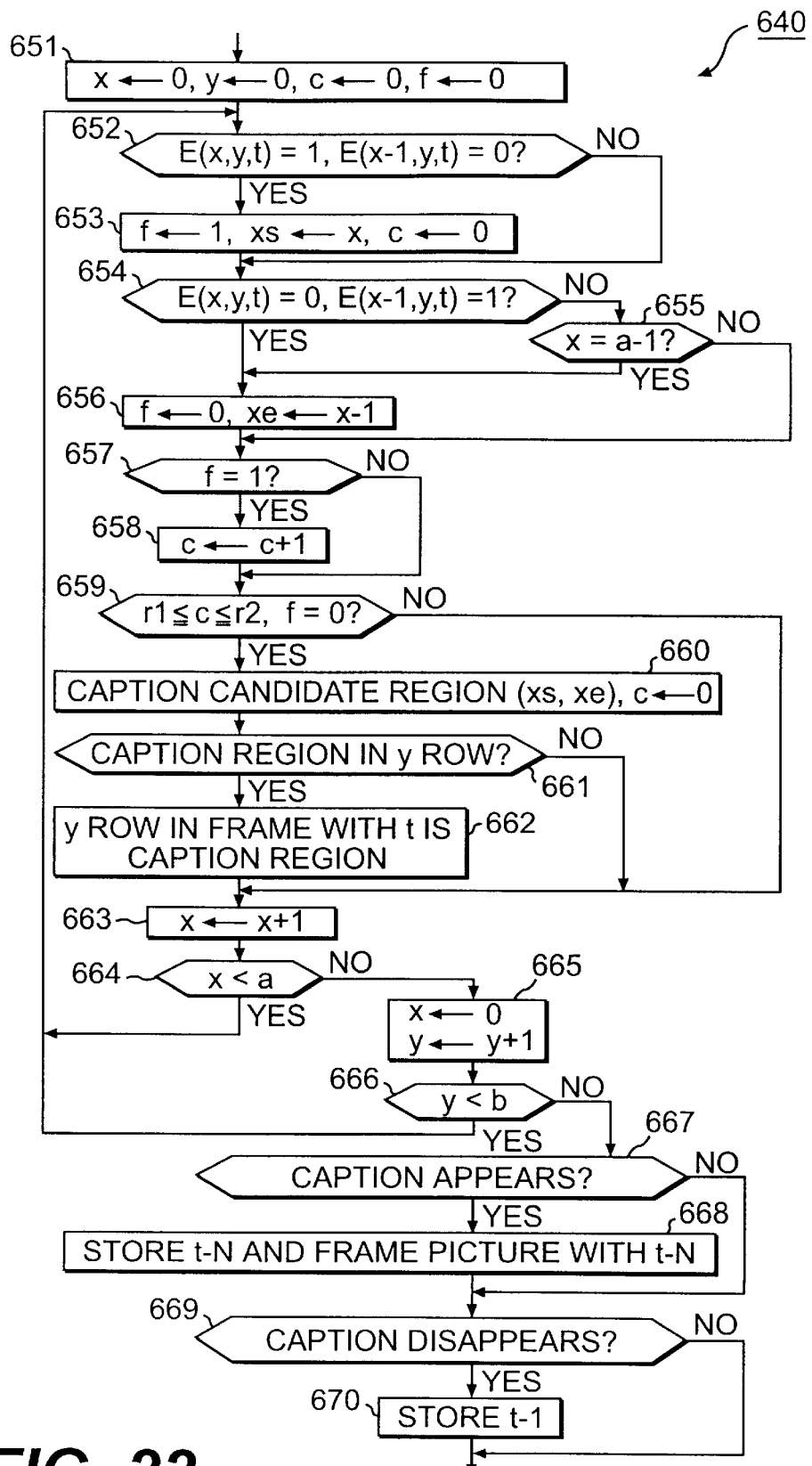
FIG. 22 is a flowchart of a caption decision block in an eighteenth embodiment.

FIG. 22 shows the details of the caption decision block 640 in the eighteenth embodiment. As shown in FIG. 22, a first step 651 in the block 640 resets the values "x" and "y" to "0". In addition, the step 651 initializes a flag "f" to "0". Furthermore, the step 651 initializes a variable "c" to "0". The variable "c" is used as a counter. After the step 651, the program advances to a step 652.

The step 652 decides whether or not the values E(x, y, t) and E(x−1, y, t) are equal to "1" and "0" respectively. The values E(x, y, t) and E(x−1, y, t) correspond to blocks which neighbor each other in the horizontal direction. In other words, the step 652 decides whether or not a caption starts at the horizontal position "x". When the values E(x, y, t) and E(x−1, y, t) are equal to "1" and "0" respectively, that is, when a caption starts at the horizontal position "x", the program advances from the step 652 to a step 653. Otherwise, the program jumps from the step 652 to a step 654.

The step 653 sets the flag "f" to "1" as an indication of the presence of a caption. In addition, the step 653 sets a value "xs" to "x". The value "xs" indicates the horizontal position at which the caption starts. Furthermore, the step 653 resets the value "c" to "0". After the step 653, the program advances to the step 654.

The step 654 decides whether or not the values E(x, y, t) and E(x−1, y, t) are equal to "0" and "1" respectively. In other words, the step 654 decides whether or not a caption ends at the horizontal position "x−1". When the values E(x, y, t) and E(x−1, y, t) are equal to "0" and "1" respectively, that is, when a caption ends at the horizontal position "x−1", the program advances from the step 654 to a step 655. Otherwise, the program jumps from the step 654 to a step 656.

The step 655 decides whether or not the value "x" is equal to the value "a" minus "1". The decision by the step 655 is to determine whether or not the position of the block of interest reaches the right-hand end in the horizontal direction. When the value "x" is equal to the value "a" minus "1", that is, when the position of the block of interest reaches the right-hand end in the horizontal direction, the program advances from the step 655 to the step 656. Otherwise, the program jumps from the step 655 to a step 657.

The step 656 resets the flag "f" to "0" as an indication of the absence of a caption. In addition, the step 656 sets a value "xe" to "x−1". The value "xe" indicates the horizontal position at which the caption ends. After the step 656 the program advances to the step 657.

The step 657 decides whether or not the flag "f" is equal to "1". When the flag "f" is equal to "1", the program advances from the step 657 to a step 658. Otherwise, the program jumps from the step 657 to a step 659.

The step 658 increments the value "c" by "1". The value "c" is used to count blocks containing captions. After the step 658, the program advances to the step 659.

The step 659 decides whether or not the value "c" is in a given range between predetermined integers "r1" and "r2". In addition, the step 659 decides whether or not the flag "f" is equal to "0". In the case where the value "c" is in the given range while the flag "f" is equal to "0", the program advances from the step 659 to a step 660. Otherwise, the program jumps from the step 659 to a step 663.

The step 660 defines the region between the horizontal positions "xs" and "xe" as a caption-containing candidate region in the horizontal block line (the row) "y". In addition. the step 660 resets the value "c" to "0". After the step 660, the program advances to a step 661.

The step 661 decides whether or not the region between the horizontal positions "xs" and "xe" is a caption-containing candidate region in the horizontal block line (the row) "y" regarding each of successive frames having order numbers of "t−N", "t−N+1", "t−N+1", . . . , and "t". Here, "N" denotes a predetermined natural number. When the result of the decision by the step 661 is positive, the program advances from the step 661 to a step 662. Otherwise, the program jumps from the step 661 to the step 663, The step 662 decides that the horizontal block line (the row) "y" related to the frame having an order number of "t" is a region containing a caption. After the step 662, the program advances to the step 663.

The step 663 increments the value "x" by "1". After the step 663, the program advances to a step 664.

The step 664 compares the value "x" with the value "a". When the value "x" is smaller than the value "a", the program returns from the step 664 to the step 652. Otherwise. the program advances from the step 664 to a step 665.

The step 665 resets the value "x" to "0". In addition, the step 665 increments the value "y" by "1". After the step 665, the program advances to a step 666.

The step 666 compares the value "y" with the value "b". When the value "y" is smaller than the value "b", the program returns from the step 666 to the step 652. Otherwise, the program advances from the step 666 to a step 667.

The step 667 decides whether or not the frame with an order number of "t" has a horizontal block line judged to be a caption-containing region while the frame with an order number of "t−1" does not have any horizontal block line judged to be a caption-containing region. When the result of the decision by the step 667 is positive, the program advances from the step 667 to a step 668. Otherwise, the program jumps from the step 667 to a step 669.

The step 668 decides that a caption appears at a frame which precedes the present frame by N frames, The step 668 stores the 1-frame-corresponding segment of the digital moving-picture signal which corresponds to the frame order number "t−N" into the external storage unit 506 (see FIG. 18). In addition, the step 561 stores information of the frame order number "t−N" into the external storage unit 506 (see FIG. 18) as an indication of the time position of the appearance of the related caption, that is, as an indication of a caption-starting frame. Accordingly, 1-frame-corresponding segments of the digital moving-picture signal which have time positions equal to respective moments of appearances of captions are stored into the external storage unit 506 (see FIG. 18). After the step 668, the program advances to the step 669.

The step 669 decides whether or not the frame with an order number of "t" does not have any horizontal block line judged to be a caption-containing region while the frame with an order number of "t−1" has a horizontal block line judged to be a caption-containing region. When the result of the decision by the step 669 is positive, the program advances from the step 669 to a step 670. Otherwise, the program jumps from the step 669 to the step 641 (see FIG. 21).

The step 670 stores information of the frame order number "t−1" into the external storage unit 506 (see FIG. 18) as an indication of a caption-ending frame. After the step 670, the program advances to the step 641 (see FIG. 21).

Nineteenth Embodiment

A nineteenth embodiment of this invention is similar to the sixteenth embodiment thereof except for the video-data processing program related to the computer 504 (see FIG. 18).

Figure 23:
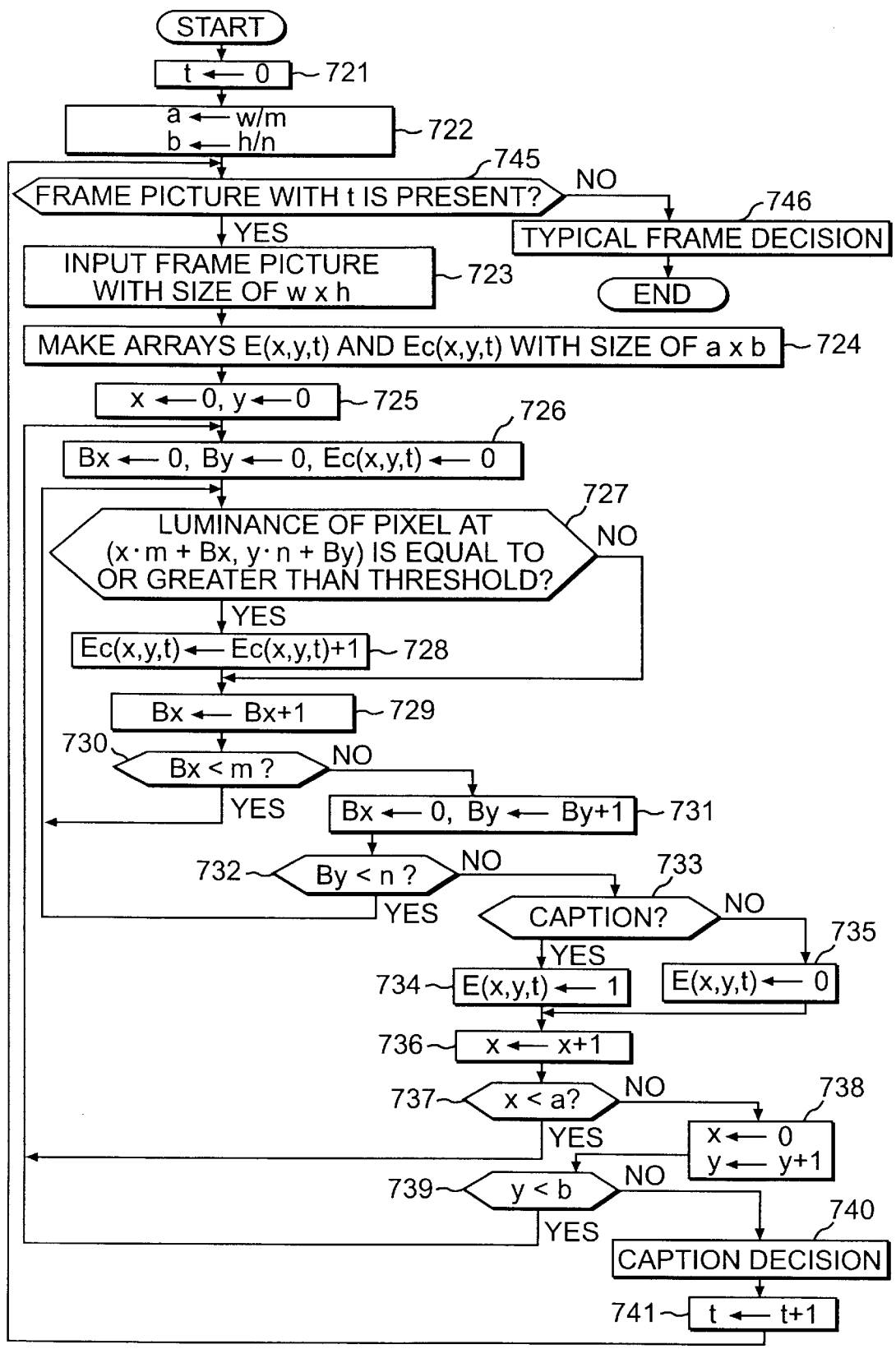
FIG. 23 is a flowchart of a video-data processing program in a nineteenth embodiment of this invention.

FIG. 23 is a flowchart of the video-data processing program in the nineteenth embodiment of this invention. As shown in FIG. 23, a first step 721 of the program initializes a variable "t" to "0". The variable "t" indicates time. The time "t" is substantially equivalent to a frame order number.

A step 722 following the step 721 initializes values "a" and "b" to "w/m" and "h/n" respectively. Every frame is divided into equal-size blocks each having "m" by "n" pixels. The character "w" indicates the total number of pixels in a horizontal direction with respect to one frame. The character "h" indicates the total number of pixels in a vertical direction with respect to one frame. Accordingly, the value "a" represents the total number of blocks in a horizontal direction with respect to one frame. The value "b" represents the total number of blocks in a vertical direction with respect to one frame. After the step 722, the program advances to a step 745.

The step 745 implements a decision as to the presence or the absence of a 1-frame-corresponding segment of a moving-picture signal which corresponds to the frame order number "t". The decision by the step 745 is to determine whether or not detection of all captions has been completed. When it is decided that the 1-frame-corresponding segment of the moving-picture signal is present, that is, when detection of captions has not yet been completed, the program advances from the step 745 to a step 723. Otherwise, the program advances from the step 745 to a block 746.

The block 746 implements a decision as to a typical frame. After the block 746, the current execution cycle of the program ends.

The step 723 controls the moving-picture reproducing device 510 (see FIG. 18) to reproduce a moving-picture signal. The step 723 stores a 1-frame-corresponding segment of the output signal of the A/D converter 503 (see FIG. 18) into the memory 509 (see FIG. 18) as a digital picture having a size of w×h and relating to the time point "t". In other words, the step 723 samples a 1-frame-corresponding segment of the digital moving-picture signal (the output signal of the A/D converter 503) which corresponds to the frame order number "t".

A step 724 following the step 723 prepares a three-dimensional array E(x, y, t) having a size of a×b with respect to the time point "t". Also, the step 724 prepares a three-dimensional array Ec(x, y, t) having a size of a×b with respect to the time point "t".

A step 725 subsequent to the step 724 resets or initializes variables "x" and "y" to "0". The variable "x" indicates a horizontal position of a block of interest. The variable "y" indicates a vertical position of the block of interest. After the step 725, the program advances to a step 726.

The step 726 resets or initializes variables "Bx" and "By" to "0". In addition, the step 726 resets or initializes the value Ec(x, y, t) to "0". The variable "Bx" indicates a horizontal position of a pixel of interest within a block. The variable "By" indicates a vertical position of the pixel of interest within a block. The value Ec(x, y, t) is used to count pixels forming parts of a caption in a block. After the step 726, the program advances to a step 727.

The step 727 compares the luminance level (the tone level) of a pixel of interest with a first threshold value. The location of the pixel of interest is expressed as "(x·m+Bx, y·n+By)". When the luminance level of the pixel of interest is equal to or higher than the first threshold value, it is decided that the pixel of interest forms a part of a caption. In this case, the program advances from the step 727 to a step 728. When the luminance level of the pixel of interest is lower than the first threshold value, it is decided that the pixel of interest does not relate to a caption. In this case, the program jumps from the step 727 to a step 729.

The step 728 increments the value Ec(x, y, t) by "1". After the step 728, the program advances to the step 729. The step 729 increments the value "Bx" by "1". After the step 729, the program advances to a step 730.

The step 730 compares the value "Bx" with the value "m". When the value "Bx" is smaller than the value "m", the program returns from the step 730 to the step 727. Otherwise, the program advances from the step 730 to a step 731.

The step 731 resets the value "Bx" to "0". In addition, the step 731 increments the value "By" by "1". After the step 731, the program advances to a step 732.

The step 732 compares the value "By" with the value "n". When the value "By" is smaller than the value "n", the program returns from the step 732 to the step 727. Otherwise, the program advances from the step 732 to a step 733.

The step 733 refers to the value Ec(x, y, t) which indicates the total number of pixels forming parts of a caption in a block in the present frame having an order number of "t". The step 733 retrieves the value Ec(x, y, t−1) related to a block in the previous frame having an order number of "t−1". The step 733 compares the values Ec(x, y, t) and Ec(x, y, t−1) with a second threshold value.

The step 733 calculates the absolute value of the difference between the values Ec(x, y, t) and Ec(x, y, t−1). The step 733 compares the calculated absolute value of the difference with a third threshold value. In the case where both the values Ec(x, y, t) and Ec(x, y, t−1) are equal to or greater than the second threshold value while the absolute value of the difference is equal to or smaller than the third threshold value, it is decided that the block of interest contains at least a part of a caption. In this case, the program advances from the step 733 to a step 734. Otherwise, it is decided that the block of interest does not relate to a caption, and the program advances from the step 733 to a step 735.

The step 734 sets the value E(x, y, t) to "1" as an indication of the presence of a caption in the block of interest. On the other hand, the step 735 sets the value E(x, y, t) to "0" as an indication of the absence of a caption from the block of interest.

A step 736 following the steps 734 and 735 increments the value "x" by "1". After the step 736, the program advances to a step 737.

The step 737 compares the value "x" with the value "a". When the value "x" is smaller than the value "a", the program returns from the step 737 to the step 726. Otherwise, the program advances from the step 737 to a step 738.

The step 738 resets the value "x" to "0". In addition, the step 738 increments the value "y" by "1". After the step 738, the program advances to a step 739.

The step 739 compares the value "y" with the value "b". When the value "y" is smaller than the value "b", the program returns from the step 739 to the step 726. Otherwise, the program advances from the step 739 to a block 740.

The block 740 implements a decision as to the appearance and the disappearance of a caption. The block 740 is similar to the block 640 in FIG. 22. After the block 740, the program advances to a step 741.

The step 741 increments the value "t" by "1". After the step 741, the program returns to the step 745.

Figure 24:
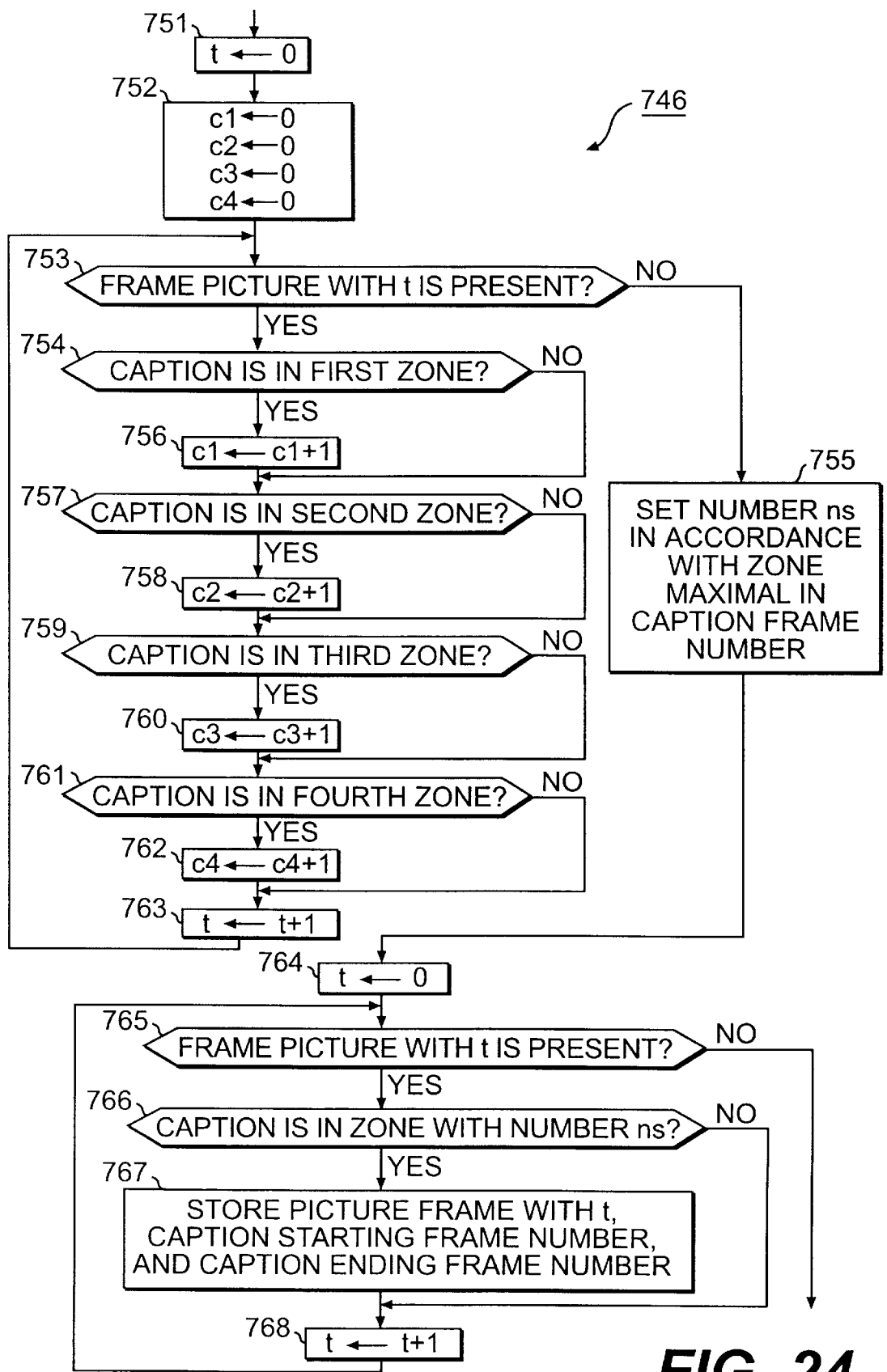
FIG. 24 is a flowchart of a typical-frame decision block in FIG. 23.

FIG. 24 shows the details of the typical-frame decision block 746 in FIG. 23. As shown in FIG. 24, a first step 751 of the block 746 resets the frame order number "t" to "0".

Figure 25:
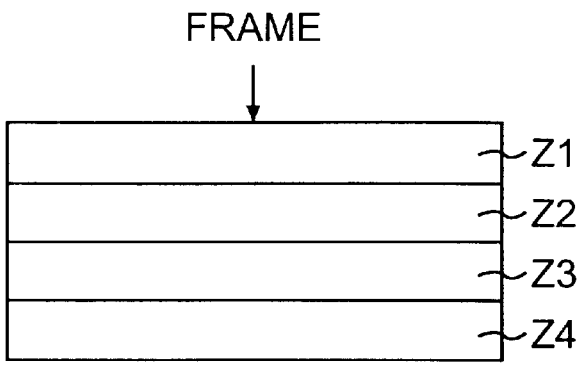
FIG. 25 is a diagram of a frame divided into equal-size zones.

A step 752 following the step 751 initializes or resets variables "c1", "c2", "c3", and "c4" to "0". As shown in FIG. 25, every frame composed of blocks is divided into equal-size horizontally-extending zones Z1, Z2, Z3, and Z4. The variables "c1", "c2", "c3", and "c4" are assigned to the zones Z1, Z2, Z3, and Z4, respectively. After the step 752, the program advances to a step 753.

The step 753 implements a decision as to the presence or the absence of a 1-frame-corresponding segment of a moving-picture signal which corresponds to the frame order number "t". When it is decided that the 1-frame-corresponding segment of the moving-picture signal is present, the program advances from the step 753 to a step 754. Otherwise, the program advances from the step 753 to a step 755. The step 753 enables investigations of all frames in connection with captions and the zones Z1, Z2, Z3, and Z4.

The step 754 decides whether or not the zone Z1 of the frame with an order number of "t" has a caption-containing region by referring to the information given by the block 740 in FIG. 23.

When the result of the decision by the step 754 is positive, the program advances from the step 754 to a step 756. Otherwise, the program jumps from the step 754 to a step 757.

The step 756 increments the value "c1" by "1". The value "c1" indicates the number of frames in which the zones Z1 have caption-containing regions respectively. After the step 756, the program advances to the step 757.

The step 757 decides whether or not the zone Z2 of the frame with an order number of "t" has a caption-containing region by referring to the information given by the block 740 in FIG. 23. When the result of the decision by the step 757 is positive, the program advances from the step 757 to a step 758. Otherwise, the program jumps from the step 757 to a step 759.

The step 758 increments the value "c2" by "1". The value "c2" indicates the number of frames in which the zones Z2 have caption-containing regions respectively. After the step 758, the program advances to the step 759.

The step 759 decides whether or not the zone Z3 of the frame with an order number of "t" has a caption-containing region by referring to the information given by the block 740 in FIG. 23.

When the result of the decision by the step 759 is positive, the program advances from the step 759 to a step 760. Otherwise, the program jumps from the step 759 to a step 761.

The step 760 increments the value "c3" by "1". The value "c3" indicates the number of frames in which the zones Z3 have caption-containing regions respectively. After the step 760, the program advances to the step 761.

The step 761 decides whether or not the zone Z4 of the frame with an order number of "t" has a caption-containing region by referring to the information given by the block 740 in FIG. 23. When the result of the decision by the step 761 is positive, the program advances from the step 761 to a step 762. Otherwise, the program jumps from the step 761 to a step 763.

The step 762 increments the value "c4" by "1". The value "c4" indicates the number of frames in which the zones Z4 have caption-containing regions respectively. After the step 762, the program advances to the step 763.

The step 763 increments the frame order number "t" by "1". After the step 763, the program returns to the step 753.

The step 755 selects the maximum value from among the values "c1", "c2", "c3", and "c4". When the maximum value is the value "c1", the step 755 sets a zone identification number "ns" to "1". When the maximum value is the value "c2", the step 755 sets the zone identification number "ns" to "2". When the maximum value is the value "c3", the step 755 sets the zone identification number "ns" to "3". When the maximum value is the value "c4", the step 755 sets the zone identification number "ns" to "4".

A step 764 following the step 755 resets the frame order number "t" to "0". After the step 764, the program advances to a step 765.

The step 765 implements a decision as to the presence or the absence of a 1-frame-corresponding segment of a moving-picture signal which corresponds to the frame order number "t". When it is decided that the 1-frame-corresponding segment of the moving-picture signal is present, the program advances from the step 765 to a step 766. Otherwise, the program exits from the step 765 and the block 746, and then the current execution cycle of the program ends. The step 765 enables investigations of all frames in connection with captions and the zone having the identification number "ns".

Regarding the frame having an order number of "t", the step 766 decides whether or not the zone designated by the zone identification number "ns" has a caption-containing region. When the result of the decision by the step 766 is positive, the program advances from the step 766 to a step 767. Otherwise, the program advances from the step 766 to a step 768.

The step 767 stores the 1-frame-corresponding segment of the digital moving-picture signal which corresponds to the frame order number "t" into the external storage unit 506 (see FIG. 18) as a typical frame having a caption. In addition, the step 767 stores information (time-position information) of the caption-starting frame into the external storage unit 506 (see FIG. 18). Furthermore, the step 767 stores information (time-position information) of the caption-ending frame into the external storage unit 506 (see FIG. 18). After the step 767, the program advances to the step 768.

The step 768 increments the frame order number "t" by "1". After the step 768, the program returns to the step 765.

Twentieth Embodiment

A twentieth embodiment of this invention is similar to the nineteenth embodiment thereof except for design changes indicated hereinafter.

In the twentieth embodiment of this invention, the user designates one of the zones Z1, Z2, Z3, and Z4 (see FIG. 25) by operating the pointing device 505 (see FIG. 18) before the video-data processing program is started.

Figure 26:
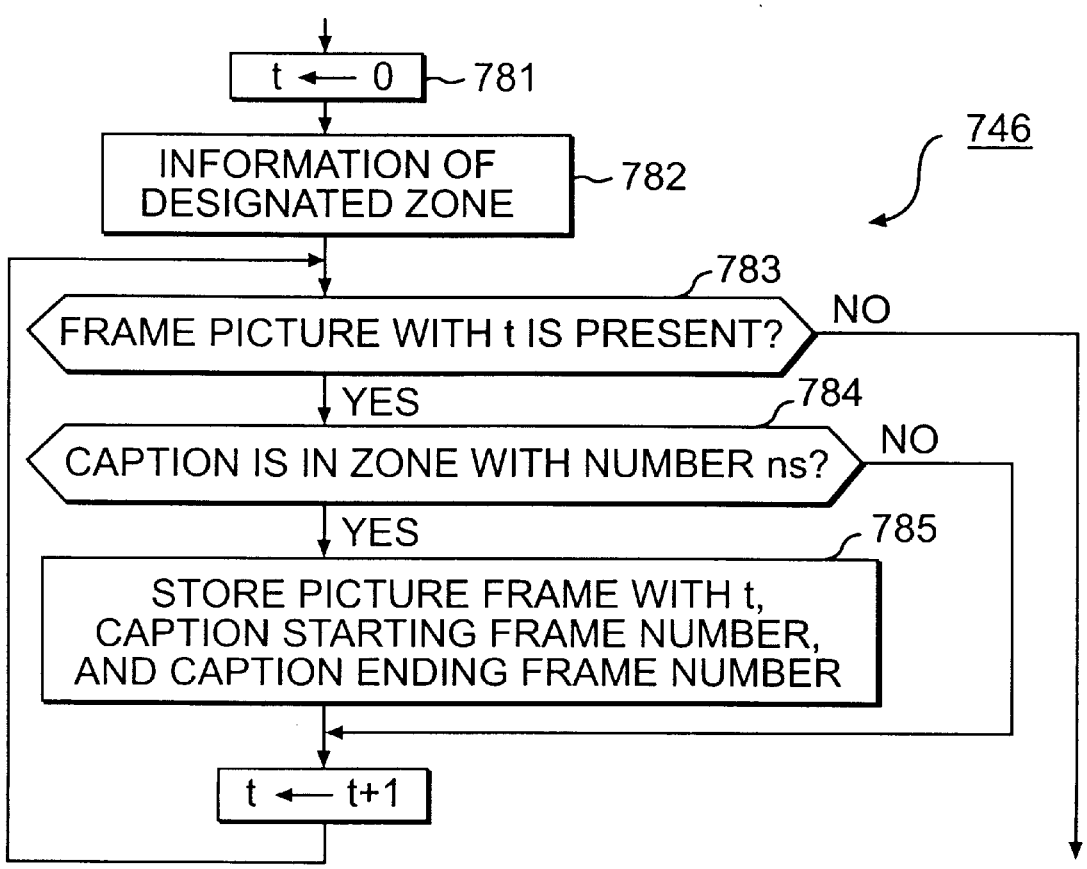
FIG. 26 is a flowchart of a typical-frame decision block in a twentieth embodiment of this invention.

FIG. 26 shows the details of the typical-frame decision block 746 (see FIG. 23) in the twentieth embodiment of this invention. As shown in FIG. 26, a first step 781 of the block 746 resets the frame order number "t" to "0".

A step 782 following the step 781 retrieves information of the designated zone. After the step 782, the program advances to a step 783.

The step 783 implements a decision as to the presence or the absence of a 1-frame-corresponding segment of a moving-picture signal which corresponds to the frame order number "t". When it is decided that the 1-frame-corresponding segment of the moving-picture signal is present, the program advances from the step 783 to a step 784. Otherwise, the program exits from the step 783 and the block 746, and then the current execution cycle of the program ends.

Regarding the frame having an order number of "t", the step 784 decides whether or not the designated zone has a caption-containing region. When the result of the decision by the step 784 is positive, the program advances from the step 784 to a step 785. Otherwise, the program jumps from the step 784 to a step 786.

The step 785 stores the 1-frame-corresponding segment of the digital moving-picture signal which corresponds to the frame order number "t" into the external storage unit 506 (see FIG. 18) as a typical frame having a caption. In addition, the step 767 stores information (time-position information) of the caption-starting frame into the external storage unit 506 (see FIG. 18). Furthermore, the step 767 stores information (time-position information) of the caption-ending frame into the external storage unit 506 (see FIG. 18). After the step 785, the program advances to step 786.

The step 786 increments the frame order number "t" by "1". After the step 786, the program returns to the step 783.

Twenty-first Embodiment

Figure 28:
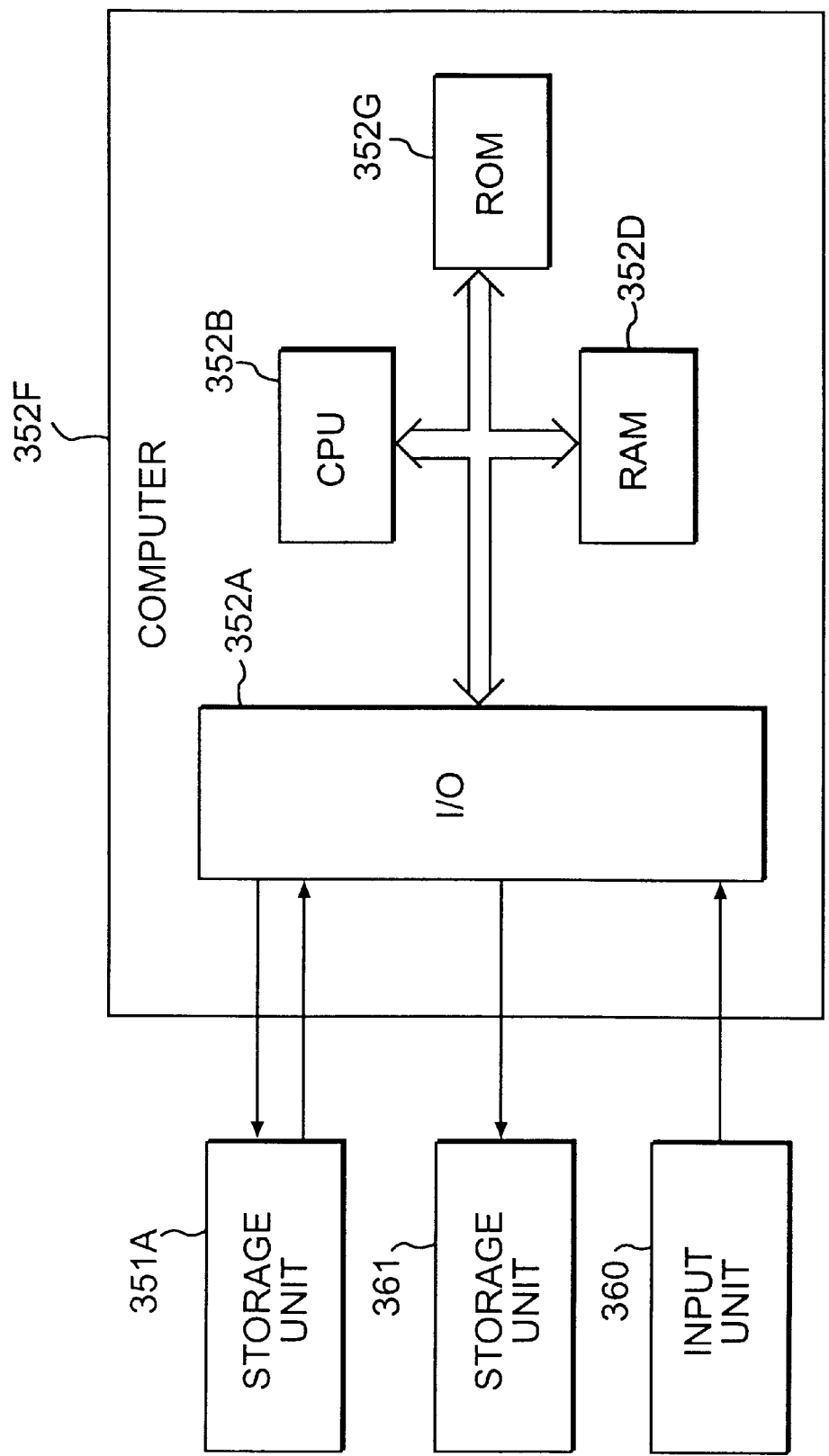
FIG. 28 is a block diagram of a scene-change detection system according to a twenty-first embodiment of this invention.

With reference to FIG. 28, a scene-change detection system includes a storage unit 351A such as the combination of a hard disc and its drive or the combination of a DVD-RAM and its drive. The storage unit 351A stores a compression-resultant digital video signal. The storage unit 351A is connected to a computer 352F. The storage unit 351A outputs the compression-resultant digital video signal to the computer 352F.

The computer 352F includes a combination of an input/output port (an interface) 352A, a CPU 352B, a ROM 352G, and a RAM 352D. The input/output port 352A receives the output signal of the storage unit 351A. The computer 352F processes the output signal of the storage unit 351A according to a video-signal processing program and a video-signal decoding program (a video signal expanding program) stored in the ROM 352G. In addition, the computer 352F controls the storage unit 351A according to the video signal processing program.

The input/output port 352A of the computer 352F is connected to a storage unit 361. The computer 352F stores a processing-resultant signal into the storage unit 361. The storage unit 361 includes, for example, the combination of a hard disc and its drive or the combination of a floppy disc and its drive.

The input/output port 352A of the computer 352F is connected to a manually-operated input unit 360. When a start signal is inputted into the computer 352F by operating the input unit 360, the computer 352F starts operation of the storage unit 351A.

Figure 29:
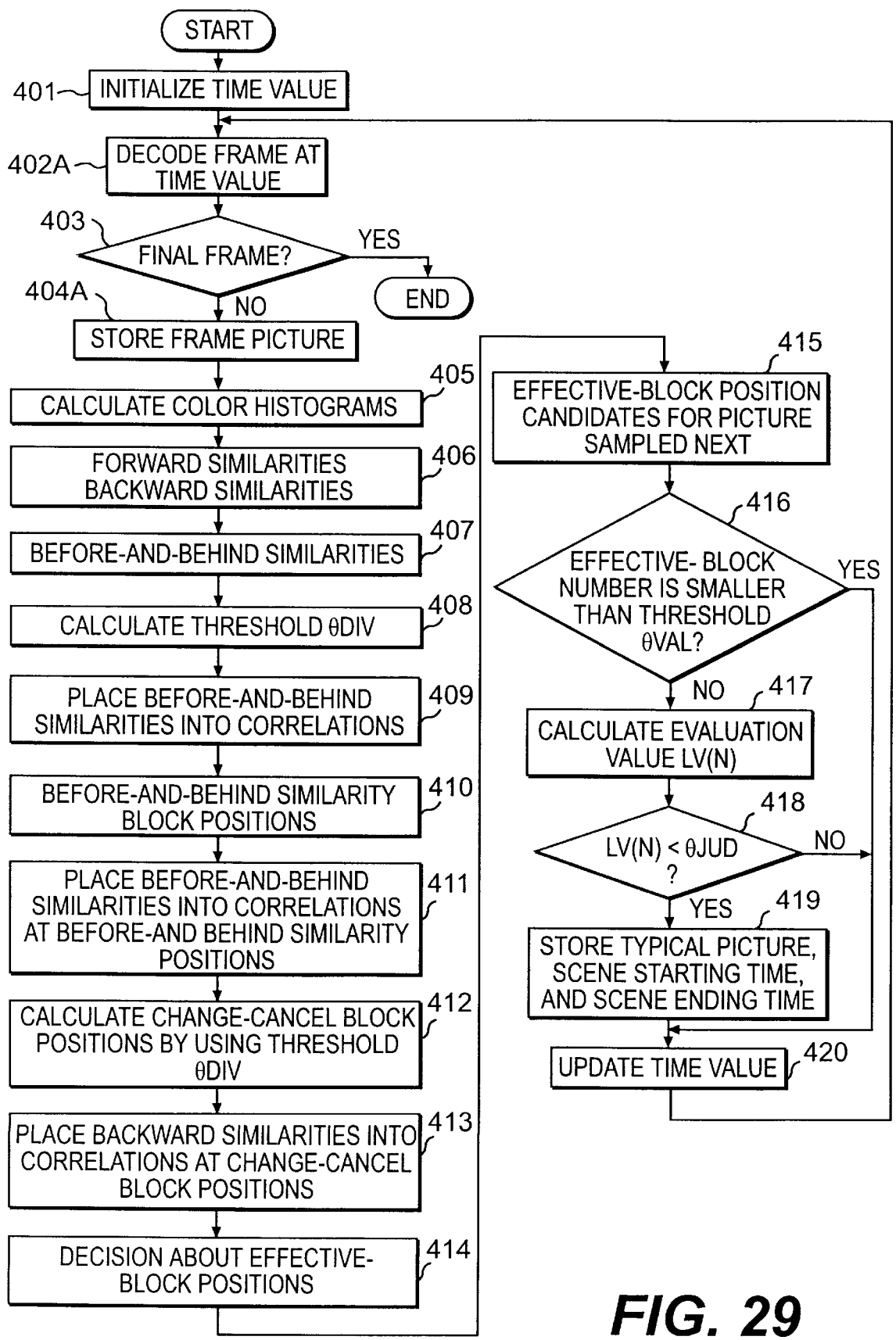
FIG. 29 is a flowchart of a video-signal processing program related to a computer in FIG. 28.

As previously indicated, the computer 352F operates in accordance with a video-signal processing program. FIG. 29 is a flowchart of the program. The program in FIG. 29 is started in response to a start signal inputted via the input unit 360.

As shown in FIG. 29, a first step 401 of the program initializes a time-representing value to "0". The time-representing value indicates a designated time point corresponding to a designated frame represented by the compression-resultant signal outputted from the storage unit 351A. The time-representing value being "0" corresponds to a first frame represented by the compression-resultant signal. After the step 401, the program advances to a step 402A.

The step 402A controls the storage unit 351A in response to the information of the time-representing value so that the storage unit 351A will output a segment of the compression-resultant video signal which represents a frame designated by the time-representing value. The step 402A decodes the output signal of the storage unit 351A (the compression-resultant signal) into the original video signal by referring to the video-signal decoding program in the ROM 352G.

A step 403 following the step 402A compares the time-representing value with a given value corresponding to a final frame represented by the decoding-resultant video signal. When the time-representing value is greater than the given value, the program exits from the step 403 and then the current execution cycle of the program ends. Otherwise, the program advances from the step 403 to a step 404A.

The step 404A stores the 1-frame-corresponding segment IN of the decoding-resultant video signal into the RAM 352D, where "N" denotes a natural number representative of a frame order number (a frame identification number) assigned to the present 1-frame-corresponding signal segment IN. In this way, the video signal segment IN representing the frame designated by the time-representing value is stored in the RAM 352D.

A step 405 following the step 404A divides the 1-frame-corresponding signal segment IN into portions corresponding to equal-size blocks composing one frame. The step 405 processes 1-pixel-corresponding sections of the portions of the signal segment IN, and thereby calculates color histograms H(c, N, k) for the respective blocks in a known way. Here, "c" denotes a natural number equal to or smaller than 64 which indicates a color number, and "N" denotes the frame order number and "k" denotes a natural number which varies from 1 to 16 and which indicates a block-position number (or a block-identification number). Thus, k=1, 2, 3, ..., 16.

A step 406 subsequent to the step 405 compares the two preceding histograms H(c, N–1, k) and H(c, N–2, k), and thereby calculates similarities BVF(N, k) according to the following equation.

$$BVF(N, k) = 1.0 - \sum_{c=1}^{64} \frac{\{H(c, N-2, k) - H(c, N-1, k)\}^2}{H(c, N-1, k) \cdot A}$$

where "A" denotes a predetermined constant for similarity adjustment. The similarities BVF(N, k) are forward with respect to the frame N–1. In addition, the step 406 compares the present histogram H(c, N, k) and the immediately preceding histogram H(c, N–1, k), and thereby calculates similarities BVL(N, k) according to the following equation.

$$BVL(N, k) = 1.0 - \sum_{c=1}^{64} \frac{\{H(c, N-1, k) - H(c, N, k)\}^2}{H(c, N, k) \cdot A}$$

The similarities BVL(N, k) are backward with respect to the frame N–1.

A step 407 following the step 406 detects block positions (before-and-behind similarity block position candidates "km") related to froward similarities BVF(N, k) and backward similarities BVL(N, k) which satisfy the following conditions.

BVF(N, k)<θJUD

BVL(N, k)<θJUD where θJUD denotes a threshold value. For the before-and-behind similarity block position candidates "km", the step 407 compares the present histogram H(c, N, k) and the second immediately preceding histogram H(c, N–2, k), and thereby calculates similarities BVC(N, k) according to the following equation.

$$BVC(N, k) = 1.0 - \sum_{c=1}^{64} \frac{\{H(c, N-2, k) - H(c, N, k)\}^2}{H(c, N, k) \cdot A}$$

The similarities BVC(N, k) are before and behind (forward and backward) with respect to the frame N–1.

A step 408 subsequent to the step 407 calculates the sum of the forward similarities BVF(N, k) and the backward similarities BVL(N, k). Then, the step 408 divides the calculated sum by sixteen to calculate a mean value (an average value) among the forward similarities BVF(N, k) and the backward similarities BVL(N, k). The step 408 sets a threshold value θDIV to the calculated mean value. In other words, the step 408 calculates the threshold value θDIV according to the following equation.

$$\theta DIV = \left\{ \sum_{k=1}^{16} BVF(N, k) + \sum_{k=1}^{16} BVL(N, k) \right\} \bigg/ 32$$

A step 409 following the step 408 initializes correlation values (or typical similarities) CV(k) assigned to the respective block positions "k". Specifically, the step 409 sets the correlation values CV(k) to the forward similarities BVF(N, k) respectively.

A step 410 subsequent to the step 409 selects block positions (before-and-behind similarity block positions) from among block positions "k1m" contained in both the before-and-behind similarity block position candidates "km" and effective-block position candidates "k1". The selected block positions relate to before-and-behind similarities BVC(N, k1m) equal to or greater than the threshold value θJUD. The effective-block position candidates "k1" use block positions except before-and-behind similarity block positions regarding the 1-frame-corresponding signal segment IN-1 which has been previously sampled. The effective-block position candidates "k1" are decided by previous execution of a step 415 which will be explained later.

A step 411 following the step 410 corrects the correlation values CV(k) into correction-resultant correlation values CV1(k). Specifically, for the before-and-behind similarity block positions, the step 411 sets the related correlation values CV to the before-and-behind similarities BVC.

A step 412 subsequent to the step 411 selects backward similarity block positions from among block positions "k'1" in the effective-block position candidates "k1" except the before-and-behind similarity block positions. The backward similarity block positions relate to forward similarities BVF (N, k'1) and backward similarities BVL(N, k'1) which have the following relations with the threshold value θDIV.

BVF(N, k'1)<θDIV

BVL(N, k'1)≧θDIV

In addition, the step 412 selects forward similarity block positions from among the block positions "k'1" in the effective-block position candidates "k1" except the before-and-behind similarity block positions. The forward similarity block positions relate to forward similarities BVF(N, k'1) and backward similarities BVL(N, k'1) which have the following relations with the threshold value θDIV.

BVF(N, k'1)≧θDIV

BVL(N, k'1)<θDIV

Furthermore, the step 412 calculates the number of the forward similarity block positions and the number of the backward similarity block positions. The step 412 compares the two calculated numbers with each other. The step 412 selects a smaller number out of the two numbers as a change cancel block number. The step 412 arranges the backward similarity block positions according to the block position number. Then, the step 412 selects successive backward similarity block positions, which start from the backward similarity block position having the smallest block position number, out of the arrangement of the backward similarity block positions. The number of the selected backward similarity block positions is equal to the change cancel block number, The step 412 sets the selected backward similarity block positions as change cancel block positions.

A step 413 following the step 412 corrects the correlation values CV1 (k) into correction-resultant correlation values CV2(k). Specifically, for the change cancel block positions, the step 413 sets the related correlation values CV1 to the backward similarities BVL.

A step 414 subsequent to the step 413 selects block positions from among the effective-block position candidates "k1" as ineffective-block positions. The ineffective-block positions relate to forward similarities BVF(N, k), backward similarities BVL(N, k), and before-and-behind similarities BVC(N, k1) which have the following relations with the threshold values θDIV and θJUD.

BVF(N, k)<θDIV

BVL(N, k)<θDIV

BVC(N, k1)<θJUD

The step 414 sets the effective-block position candidates except the ineffective-block positions as effective-block positions. The step 414 sets block positions other than the effective-block position candidates as ineffective-block positions.

A step 415 following the step 414 sets block positions except the before-and-behind similarity block positions as effective-block position candidates for a 1-frame-corresponding signal segment IN+1 which will be sampled next.

A step 416 subsequent to the step 415 calculates the number of the effective-block positions. The step 416 compares the calculated number of the effective-block positions with a threshold value θVAL. When the number of the effective-block positions is smaller than the threshold value θVAL, the step 416 sets all the block positions as ineffective-block positions and then the program jumps from the step 416 to a step 420. When the number of the effective-block positions is equal to or greater than the threshold value θVAL, the program advances from the step 416 to a step 417.

The step 417 calculates the sum of the correlation values CV2 assigned to the effective-block positions. The step 417 divides the calculated sum by the number of the effective-block positions. The step 417 sets the result of the division as an evaluation value LV(N).

A step 418 following the step 417 compares the evaluation value LV(N) with the threshold value θJUD. When the evaluation value LV(N) is smaller than the threshold value θJUD, it is decided that a scene change occurs. In this case, the program advances from the step 418 to a step 419. When the evaluation value LV(N) is equal to or greater than the threshold value θJUD, it is decided that a scene change does not occur. In this case, the program jumps from the step 418 to the step 420.

The step 419 stores the 1-frame-corresponding segment IN of the video signal into the storage unit 361 as an indication of a typical picture of the present scene. The step 419 retrieves information of the immediately-preceding time-representing value which corresponds to the 1-frame-corresponding segment IN-1 of the video signal. The step 419 stores the information of the immediately-preceding time-representing value into the storage unit 361 as an indication of a starting moment of the present scene. The step 419 retrieves information of the second immediately-preceding time-representing value which corresponds to the 1-frame-corresponding segment IN-2 of the video signal. The step 419 stores the information of the second immediately-preceding time-representing value into the storage unit 361 as an indication of an ending moment of the immediately-preceding scene. After the step 419, the program advances to the step 420.

The step 420 updates the time-representing value. For example, the step 420 sets the time-representing value to the product of a predetermined reproduction speed and a time lapse from the start of the scene change detecting process. After the step 420, the program returns to the step 402A.

Final information stored in the storage unit 361 (final information stored in, for example, a hard disc or a floppy disc) represents typical pictures of different scenes respectively. In addition, the final information stored in the storage unit 361 represents the starting moment and the ending moment of each of the different scenes. Accordingly, the final information in the storage unit 361 can be used as a scene-search index with respect to the video signal stored in the storage unit 351A.

What is claimed is:

1. A method of detecting a change in scenes represented by a moving picture signal, comprising the steps of:

selecting first, second, and third frames from among frames represented by the moving picture signal;

dividing each of the first, second, and third frames into blocks;

detecting similarities in each of the blocks among the first, second, and third frames;

deciding typical similarities in response to the detected similarities;

deciding whether each of the blocks is effective or ineffective regarding a scene change in response to the typical similarities and the detected similarities;

calculating a mean similarity among the typical similarities in effective blocks; and detecting a scene change in response to the calculated mean similarity.

2. A method as recited in claim 1, wherein the similarities in each of the blocks between the first and second frames are used as the typical similarities, and the decision as to whether each of the blocks is effective or ineffective is implemented in response to the similarities in each of the blocks between the second and third frames.

3. A method as recited in claim 1, wherein the similarities in each of the blocks between the first and third frames are used as the typical similarities and it is decided that the related blocks are effective when the similarities in each of the blocks between the first and third frames are equal to or greater than a threshold value, and otherwise the similarities in each of the blocks between the first and second frames are used as the typical similarities.

4. A method as recited in claim 3, wherein a mean value is calculated which is among the similarities in each of the blocks between the first and second frames and the similarities in each of the blocks between the second and third frames, and the mean value is used as the threshold value.

5. A method as recited in claim 1, wherein the similarities in each of the blocks between the first and second frames are used as the typical similarities, and blocks related to motion of an object in a picture are detected in response to the typical similarities and the similarities in each of the blocks between the second and third frames, and wherein the typical similarities in the motion-related blocks are replaced by the similarities in each of the blocks between the second and third frames.

6. A method as recited in claim 1, wherein when a number of the effective blocks is smaller than a reference number, it is decided that the first and second frames relate to a same scene.

7. A method of detecting a change in scenes represented by a moving picture signal, comprising the steps of:

selecting first, second, third, and fourth frames from among frames represented by the moving picture signal;

dividing each of the first, second, third, and fourth frames into blocks;

detecting similarities in each of the blocks among the first, second, third, and fourth frames;

deciding typical similarities in response to the detected similarities;

deciding whether each of the blocks is effective or ineffective regarding a scene change in response to the typical similarities and the detected similarities;

calculating a mean similarity among the typical similarities in effective blocks; and detecting a scene change in response to the calculated mean similarity.

8. A method as recited in claim 7, wherein the similarities in each of the blocks between the second and third frames are used as the typical similarities, and the decision as to whether each of the blocks is effective or ineffective is implemented in response to the similarities in each of the blocks between the third and fourth frames.

9. A method as recited in claim 7, wherein when the similarities in each of the blocks between the first and third frames are equal to or greater than a threshold value or the similarities in each of the blocks between the second and fourth frames are equal to or greater than the threshold value, the similarities are used as the typical similarities and it is decided that the related blocks are effective, and wherein otherwise the similarities in each of the blocks between the second and third frames are used as the typical similarities.

10. An apparatus for detecting a change in scenes represented by a moving picture signal, comprising:

means for selecting first and second frames from among frames represented by the moving picture signal;

means for dividing each of the first and second frames into blocks;

means for calculating similarities in each of the blocks among the first and second frames;

means for detecting a scene change of the second frame from the first frame in response to the calculated similarities;

means for selecting a third frame from among the frames represented by the moving picture signal;

means for calculating similarities in each of the blocks among the second and third frames;

means for calculating similarities in each of the blocks among the first and third frames;

means for calculating correlations in each of the blocks among the first, second and third frames on the basis of the calculated similarities in each of the blocks among the first and second frames, the calculated similarities in each of the blocks among the second and third frames, and the calculated similarities in each of the blocks among the first and third frames;

means for deciding whether each of the blocks is effective or ineffective with respect to a scene change in response to the calculated similarities in each of the blocks among the first and second frames, the calculated similarities in each of the blocks among the second and third frames, and the calculated similarities in each of the blocks among the first and third frames;

means for calculating a sum of the correlations in the effective blocks;

means for calculating a total number of the effective blocks;

means for calculating an evaluation value equal to the sum of the correlations in the effective blocks which is divided by the total number of the effective blocks;

means for comparing the calculated evaluation value with a threshold value; and means for deciding that a scene change occurs when the calculated evaluation value is smaller than the threshold value.

11. A recording medium which stores a computer-related program including the steps of:

selecting first, second, third, and fourth frames from among frames represented by a moving picture signal;

dividing each of the first, second, third, and fourth frames into blocks;

detecting similarities in each of the blocks among the first, second, third, and fourth frames;

deciding typical similarities in response to the detected similarities;

deciding whether each of the blocks is effective or ineffective regarding a scene change in response to the typical similarities and the detected similarities;

calculating a mean similarity among the typical similarities in effective blocks; and detecting a scene change in response to the calculated mean similarity.

* * * * *